United States Patent [19]

Chack et al.

[11] Patent Number: 4,972,452
[45] Date of Patent: Nov. 20, 1990

[54] DIGITAL BYPASS FOR TELEPHONE SYSTEM

[75] Inventors: Michael A. Chack, Palo Alto; John D. Meyers, Campbell, both of Calif.

[73] Assignee: Aspect Telecommunications Corporation, San Jose, Calif.

[21] Appl. No.: 434,658

[22] Filed: Nov. 9, 1989

[51] Int. Cl.⁵ .................................................. H04M 3/12
[52] U.S. Cl. ............................................ 379/2; 379/32
[58] Field of Search ................... 379/15, 2, 32, 156; 370/16

[56] References Cited

U.S. PATENT DOCUMENTS 4,575,584  3/1986  Smith et al. ........................ 379/2

Primary Examiner—Stafford D. Schreyer
Attorney, Agent, or Firm—Skjerven, Morrill, MacPherson, Franklin and Friel

[57] ABSTRACT

A digital bypass unit for a PBX or ACD telephone system having T1 spans provides the capability to place and answer calls on a digital T1 span in the event of a system failure or power failure. The bypass unit permits the bypass of the failed system, connecting T1 channels directly to digital telephone sets, and is automatically activated in the event of power or system failure. Queueing and distribution of incoming calls are both provided when the system is in the bypass mode.

14 Claims, 51 Drawing Sheets

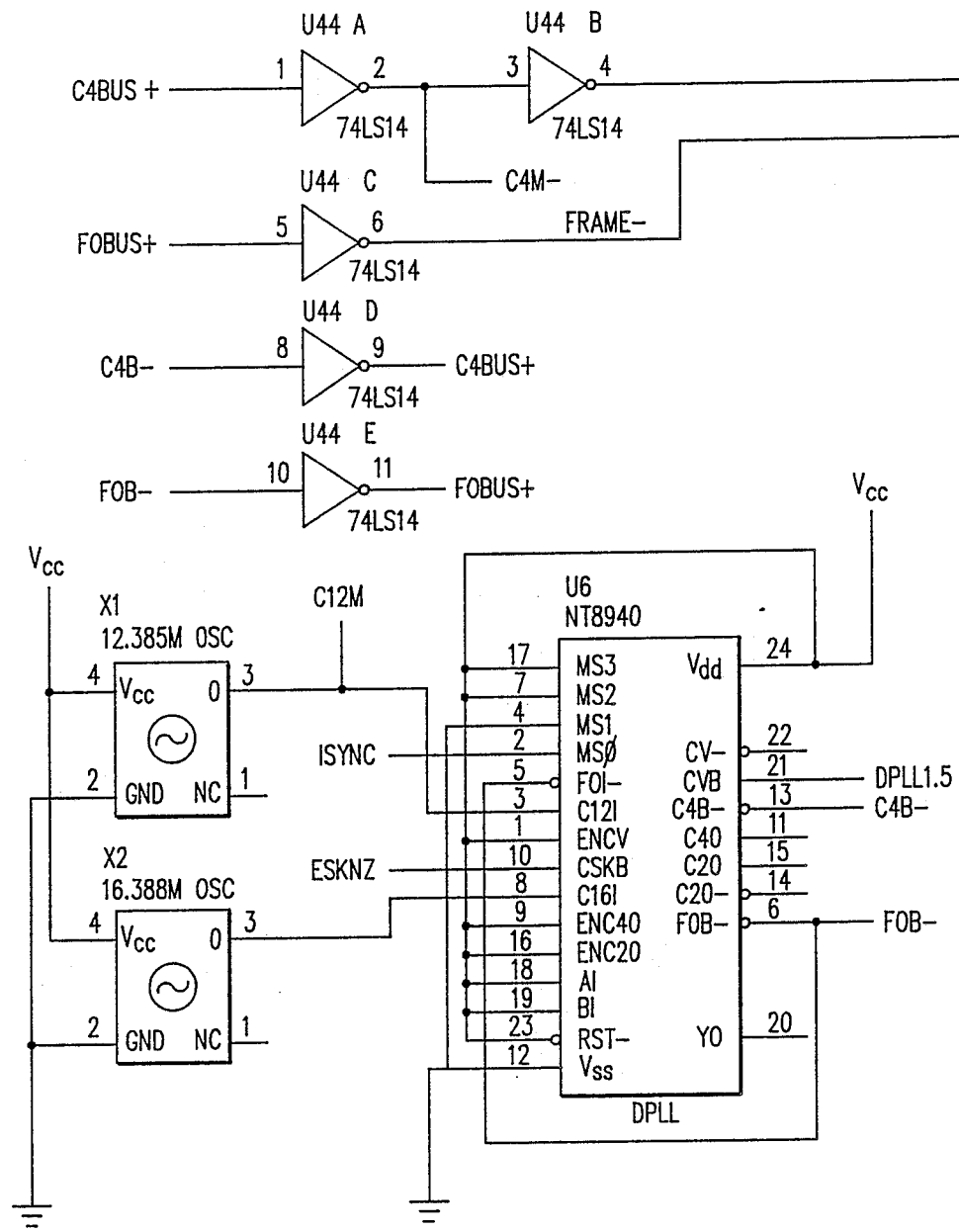
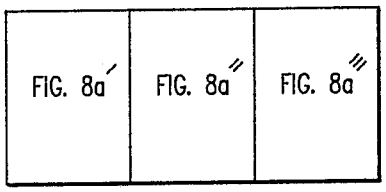
FIG. 8a'

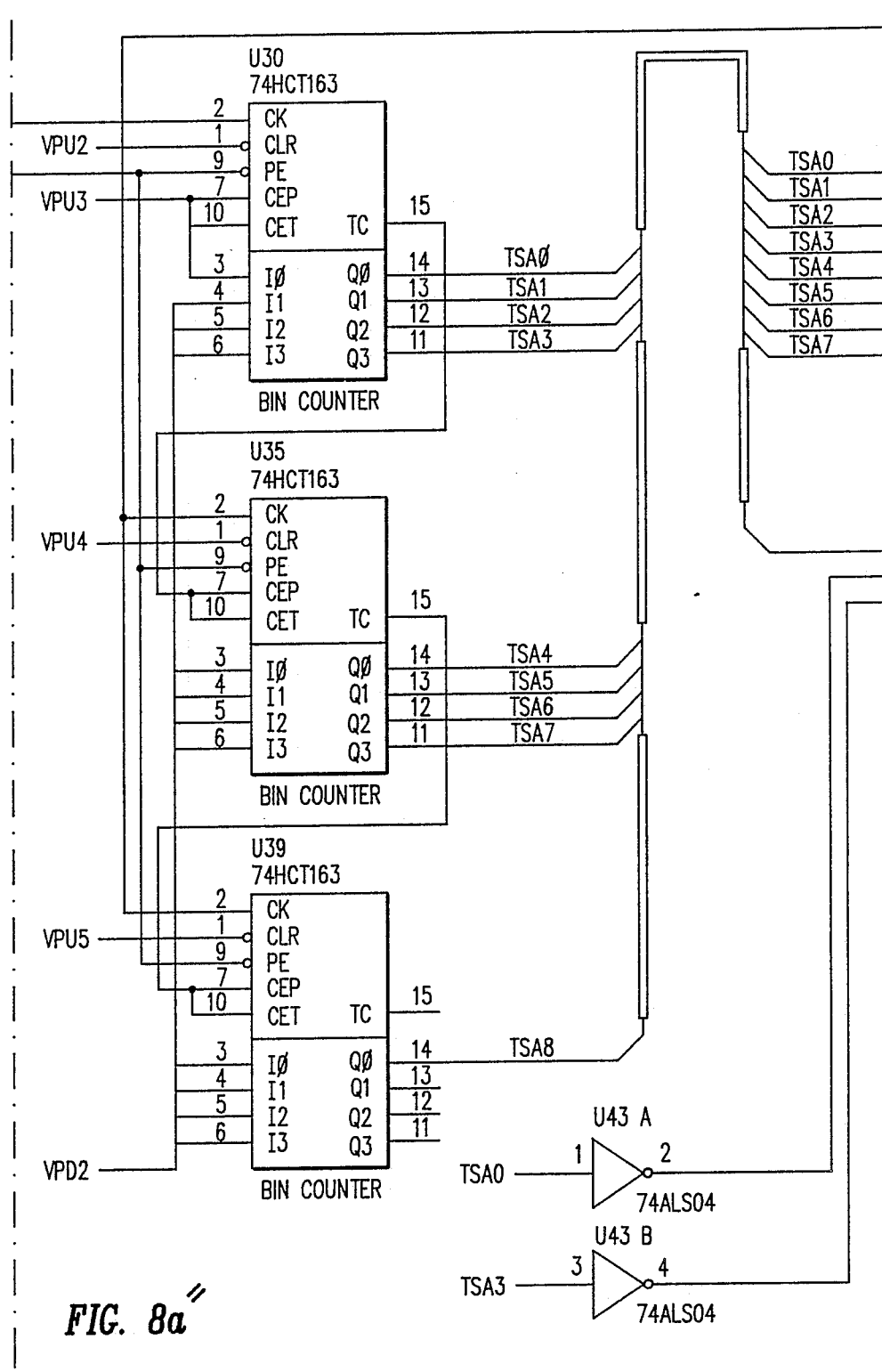
FIG. 8a″

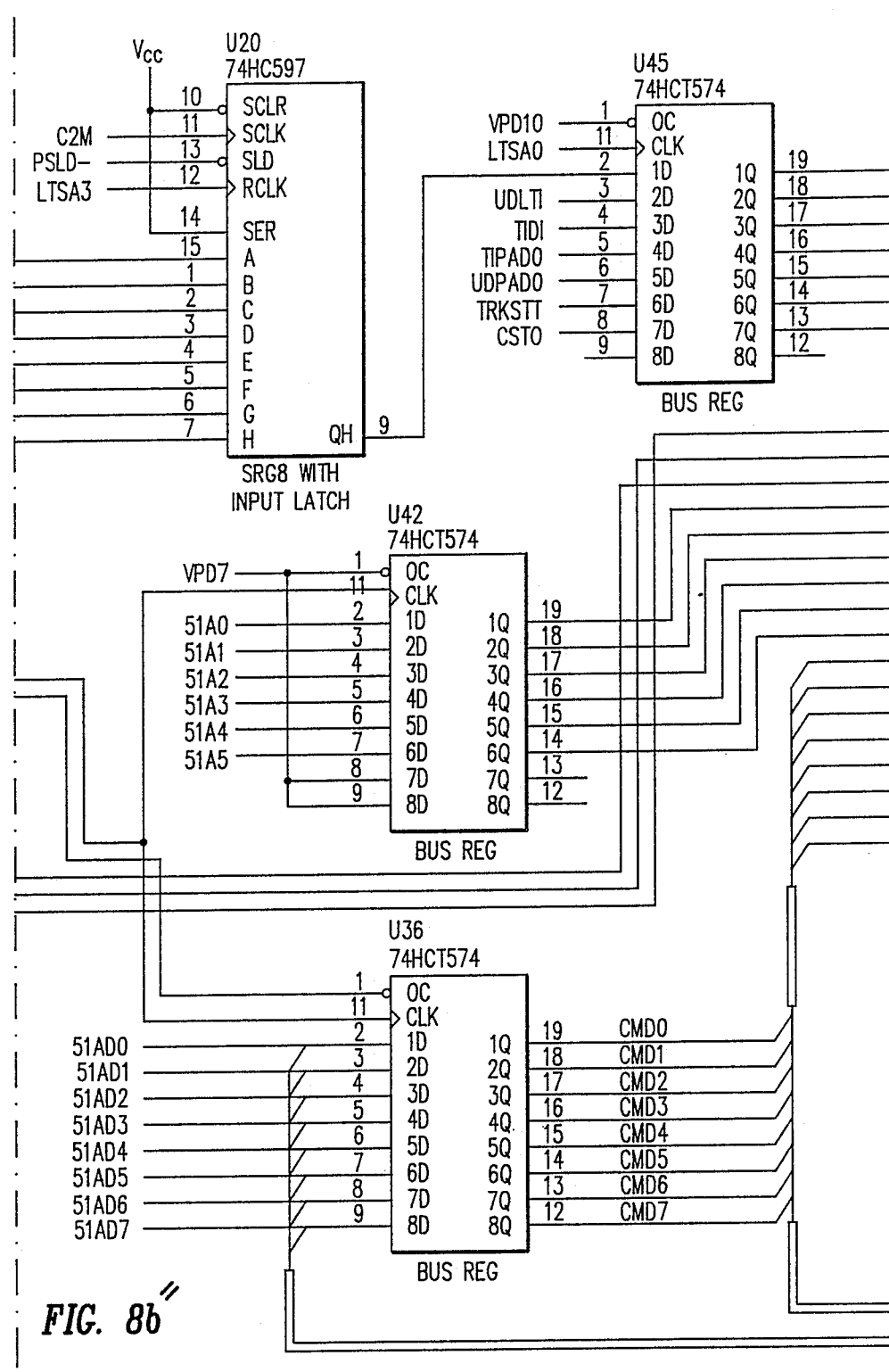
FIG. 8b"

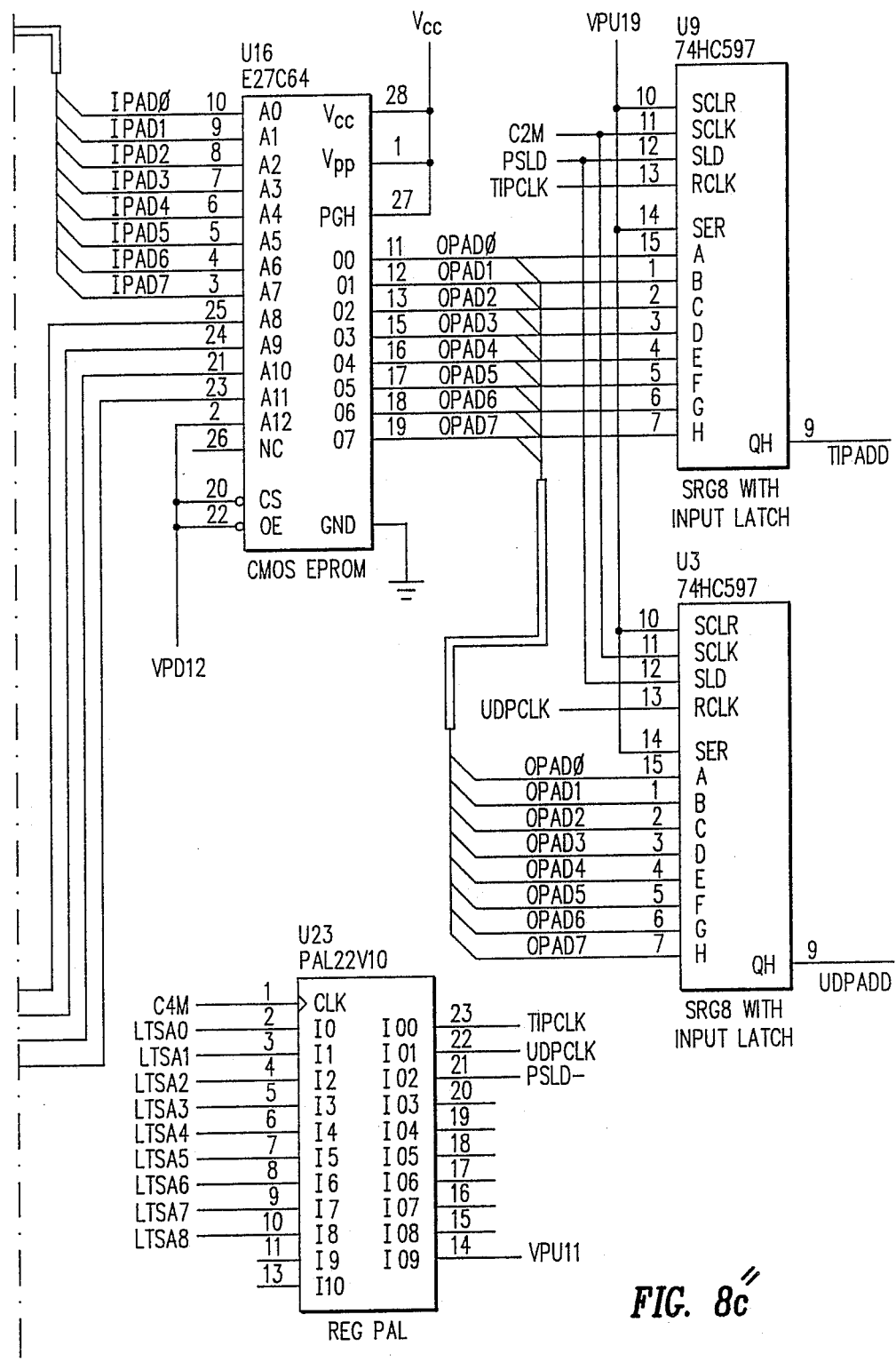
FIG. 8c"

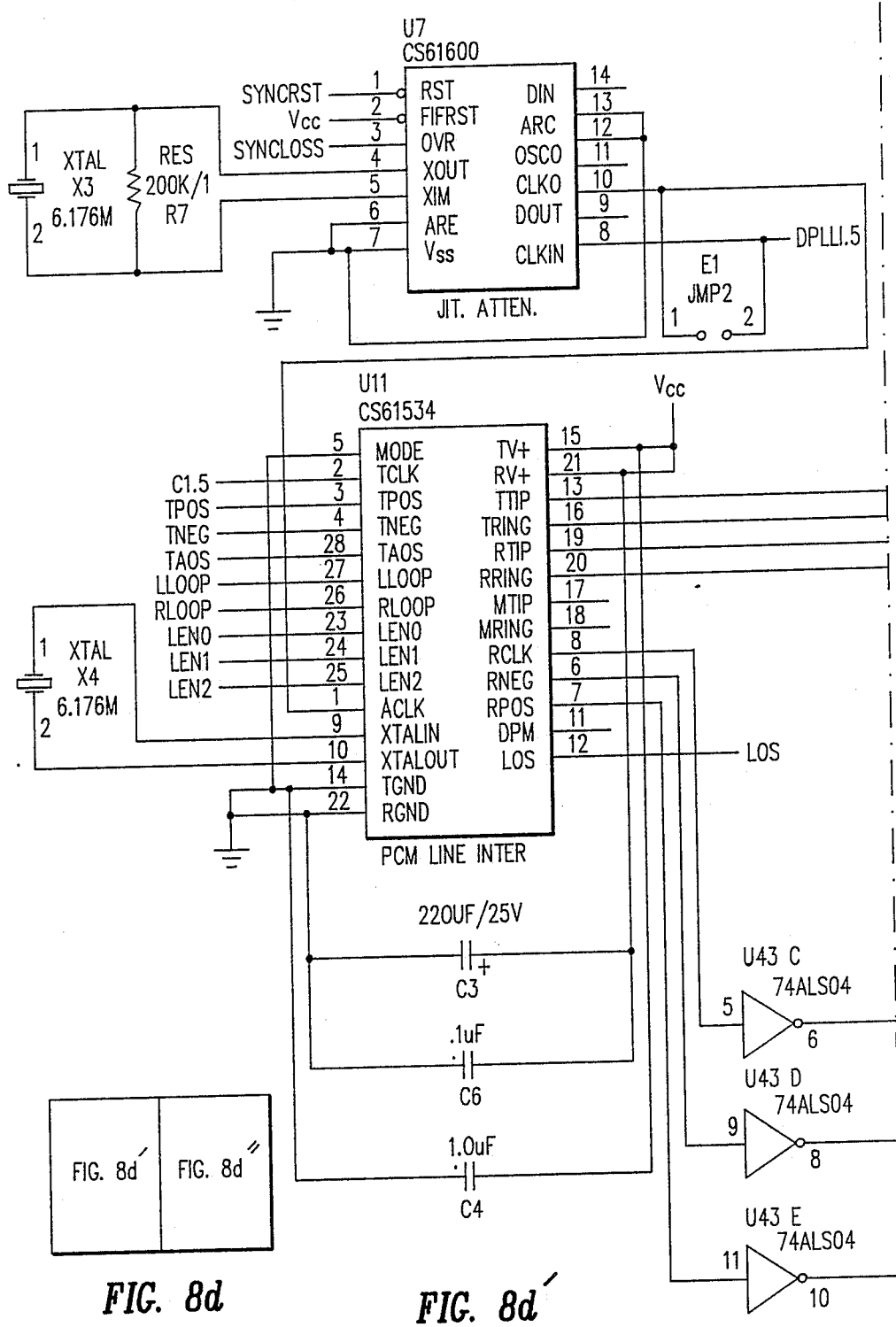
FIG. 8d'   FIG. 8d"
FIG. 8d                    FIG. 8d'

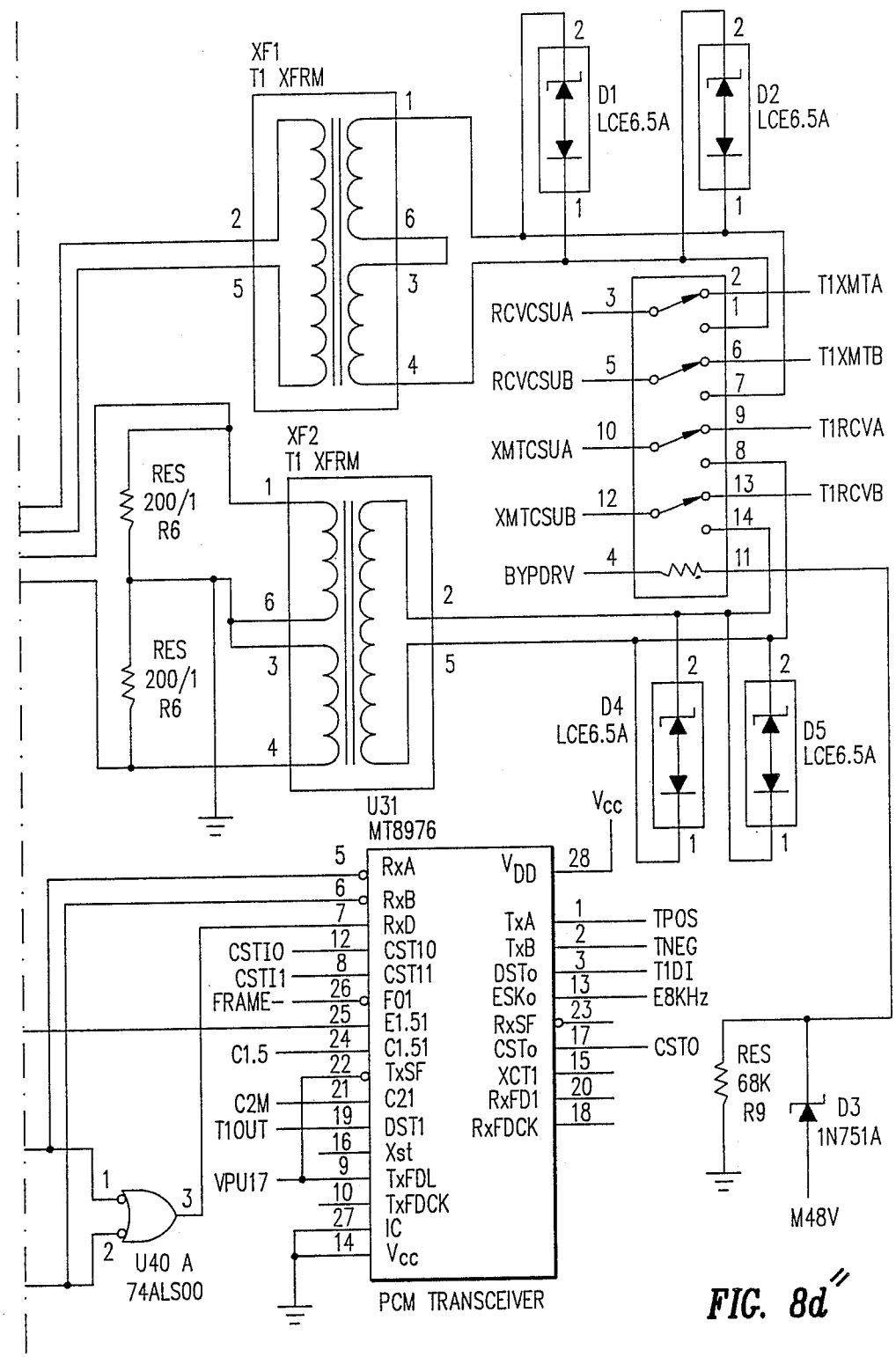
FIG. 8d″

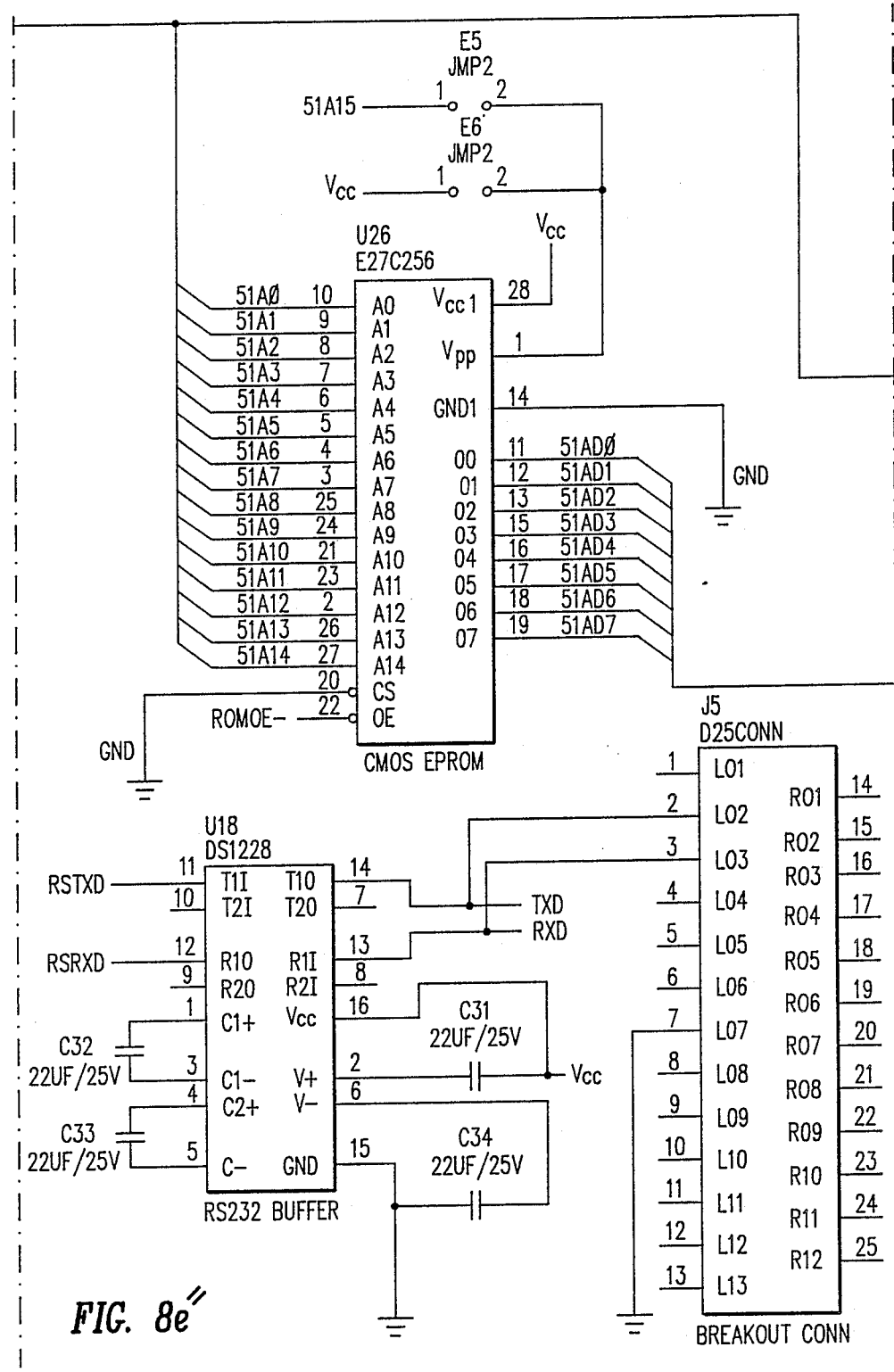
FIG. 8e″

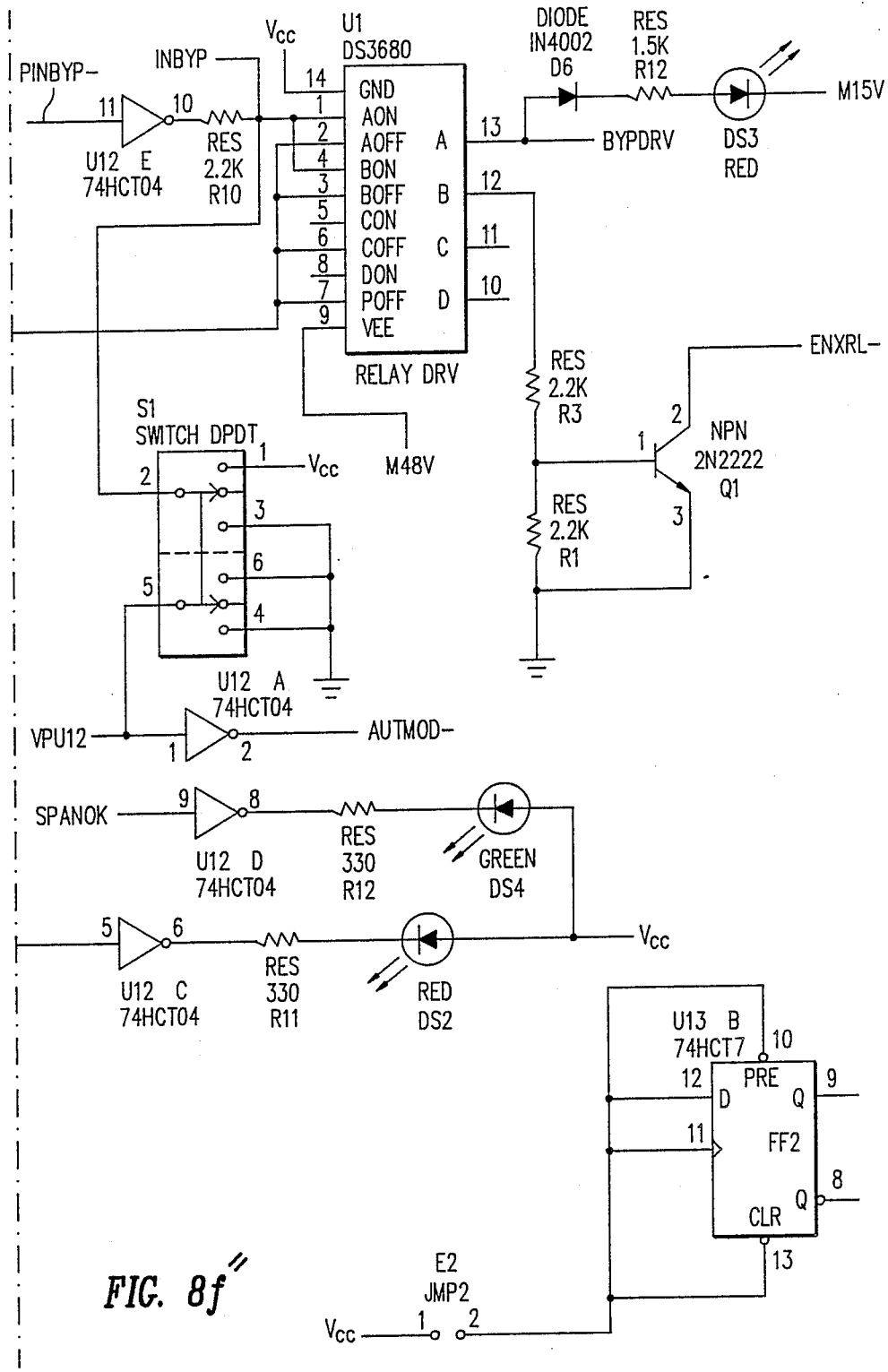
FIG. 8f″

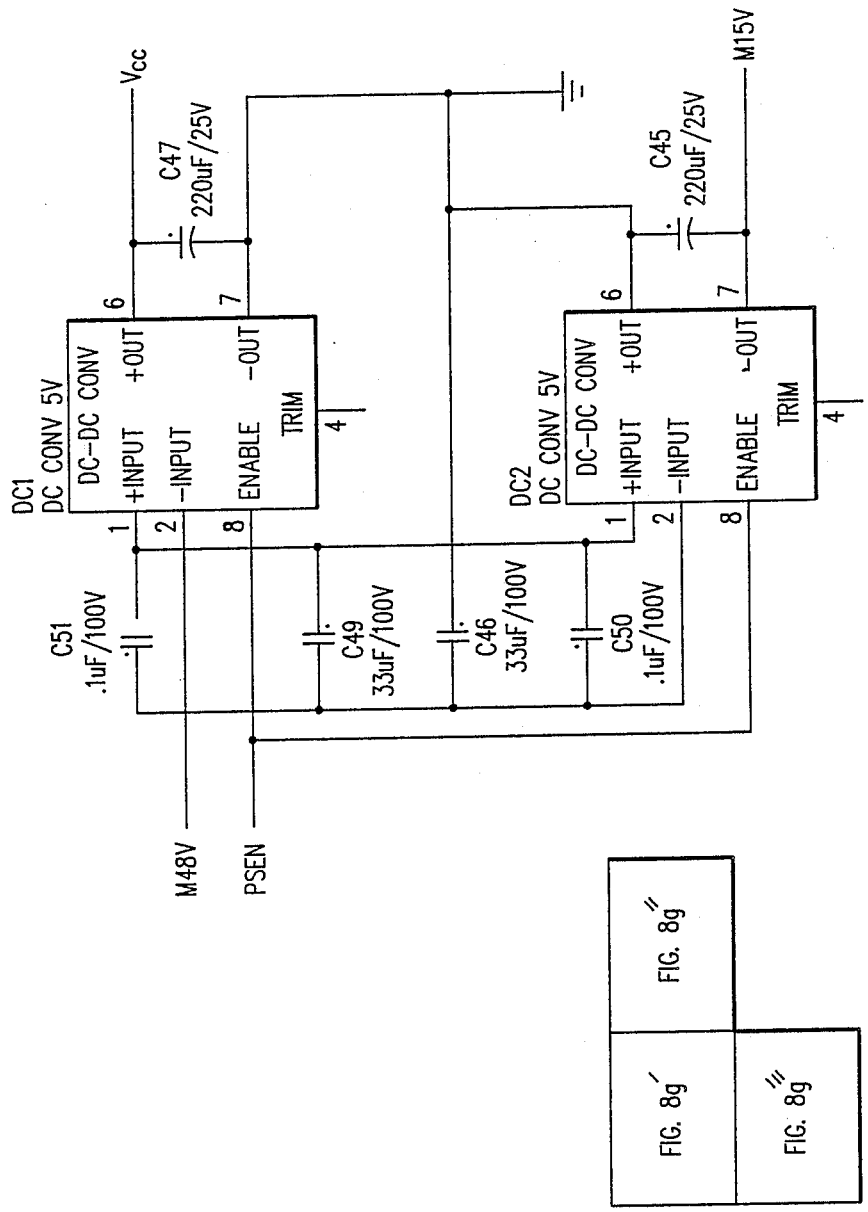

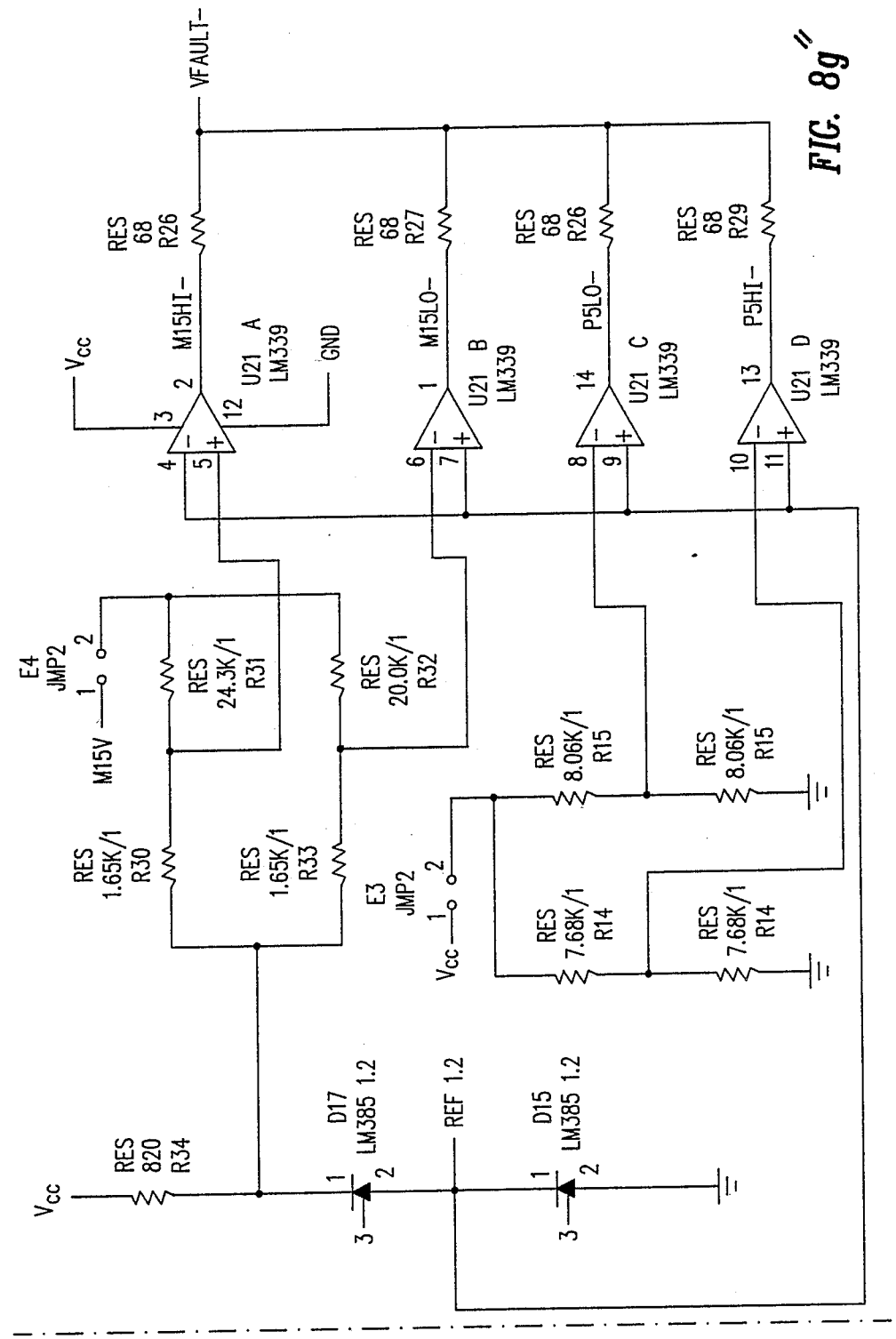
FIG. 8g"

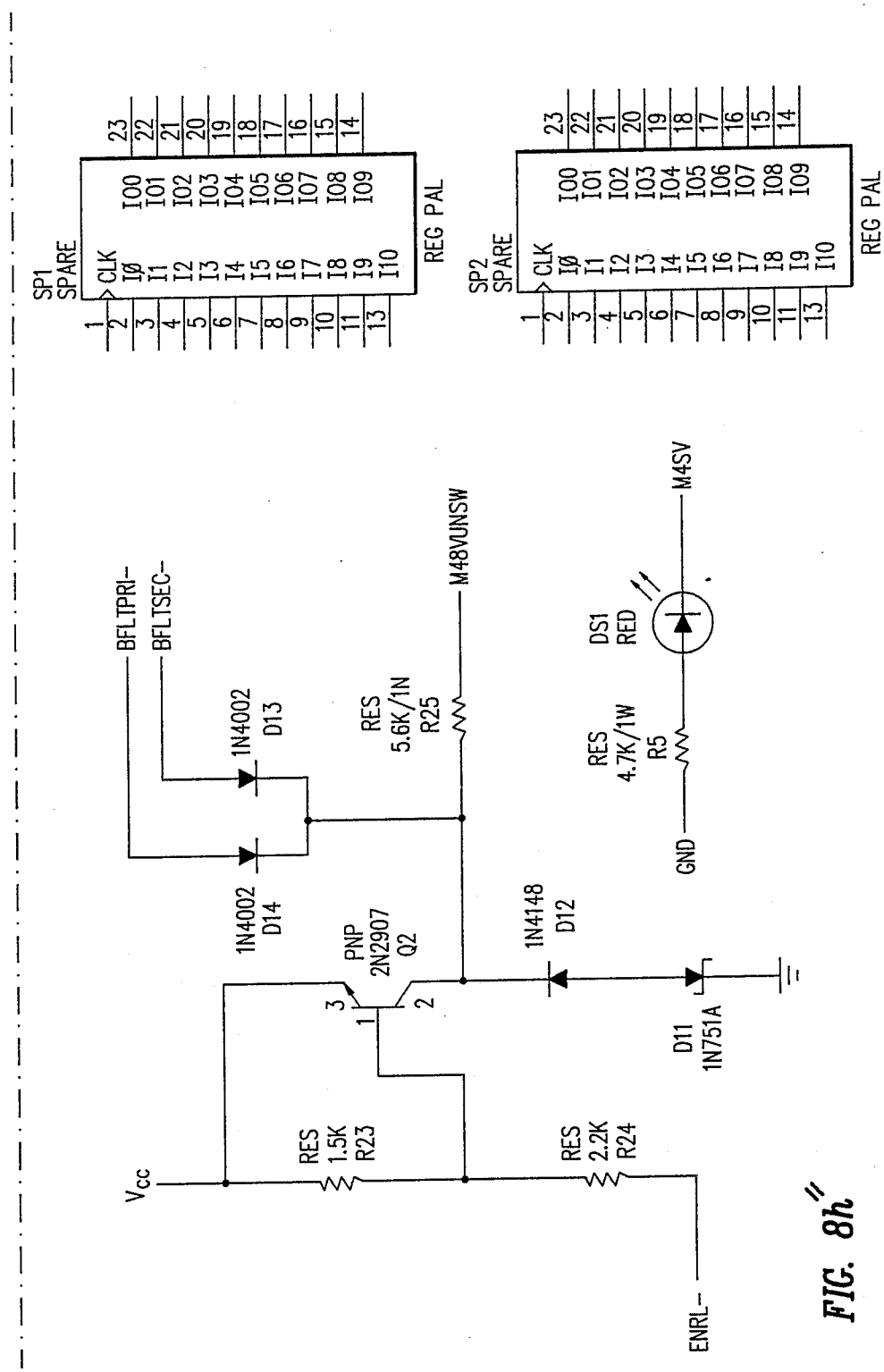
FIG. 8h"

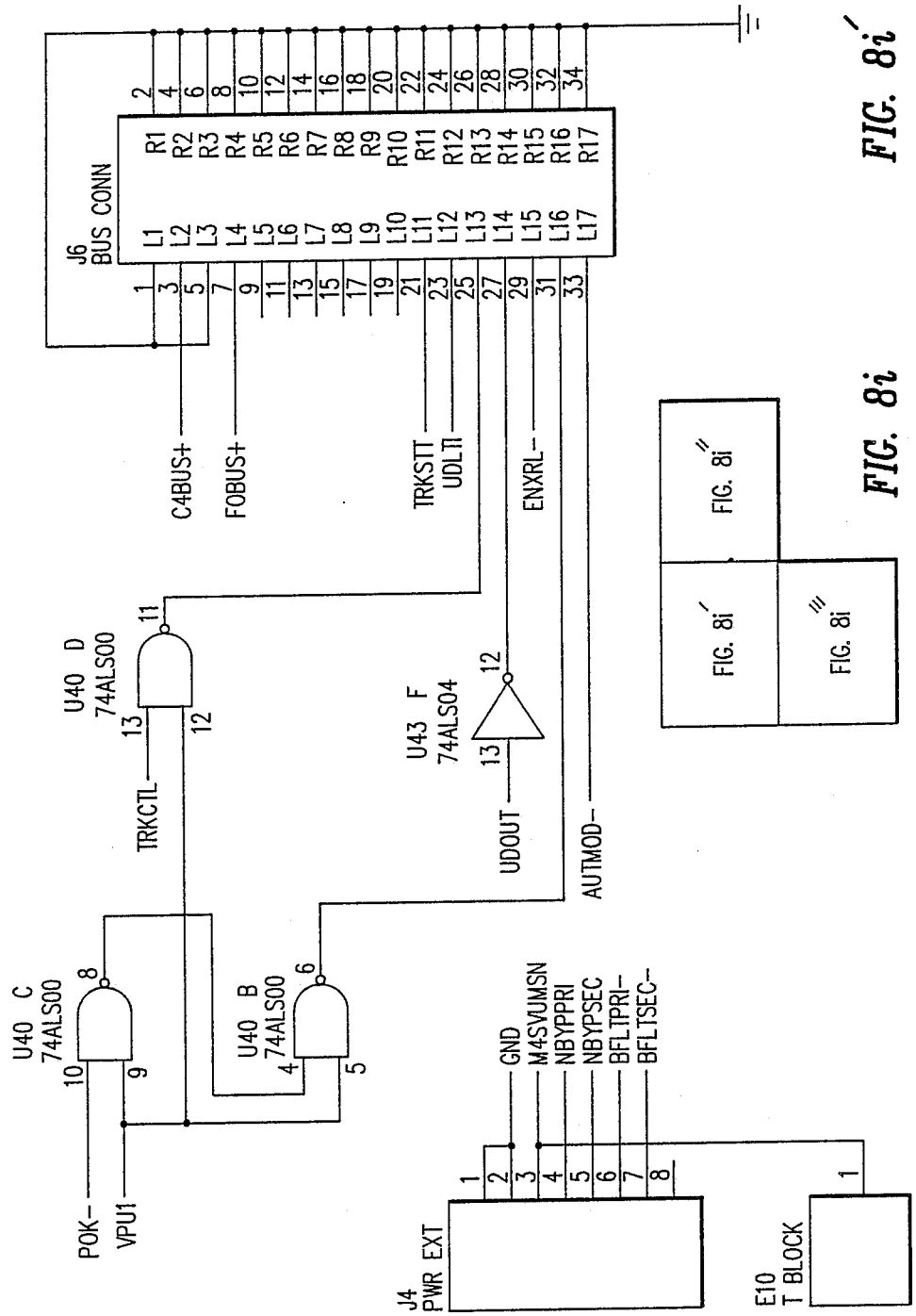

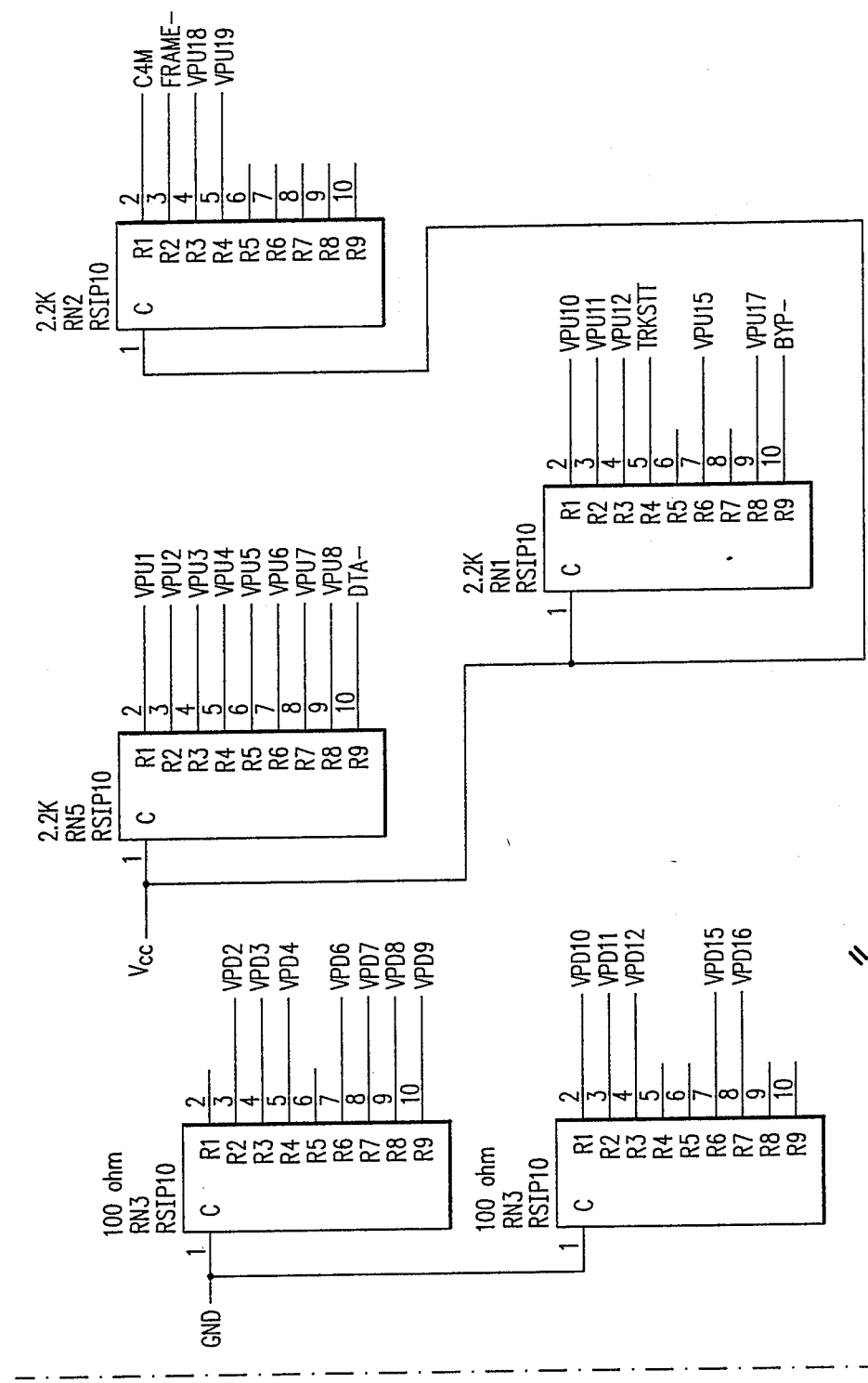
FIG. 8i"

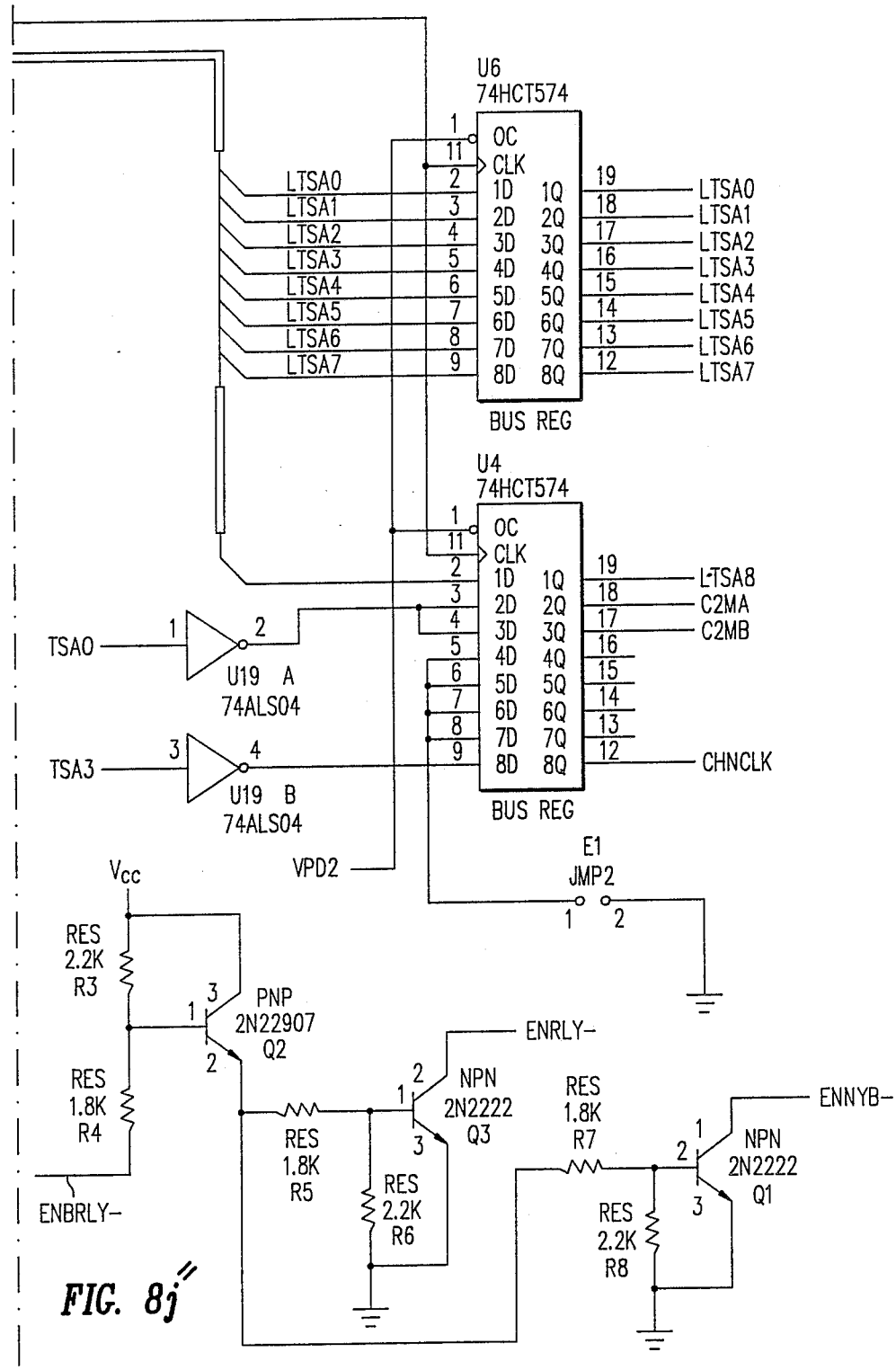
FIG. 8j"

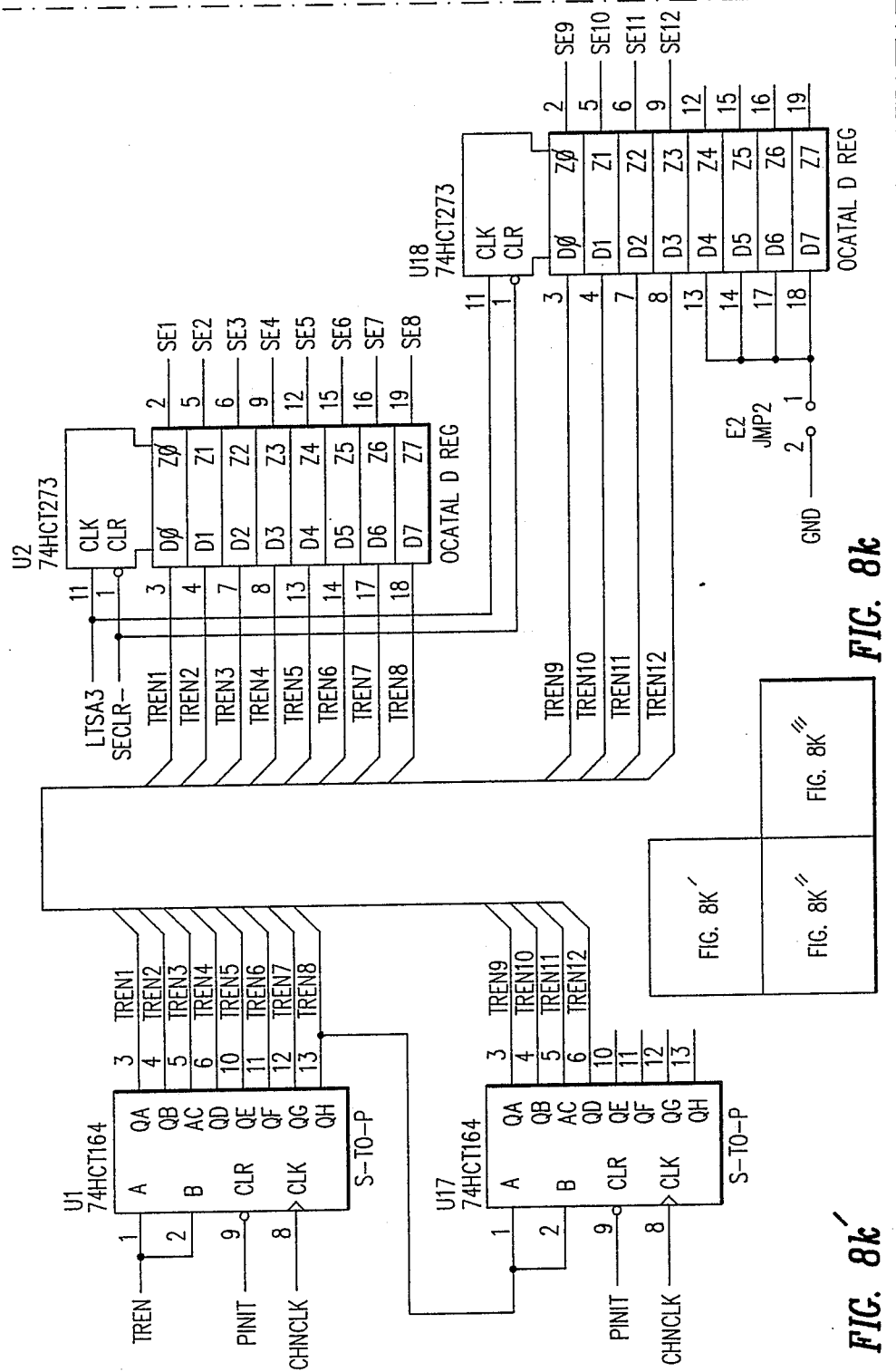

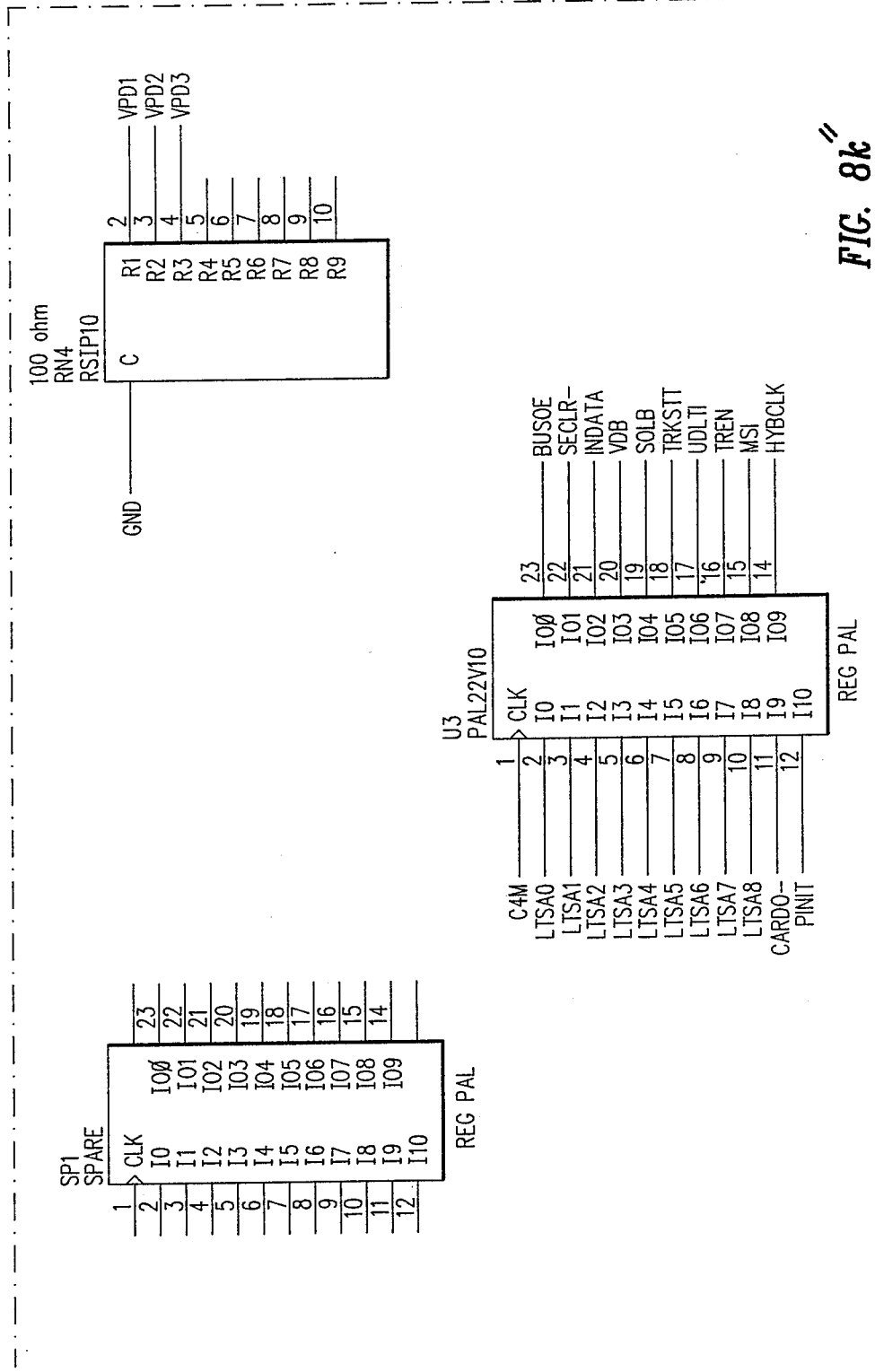
FIG. 8k"

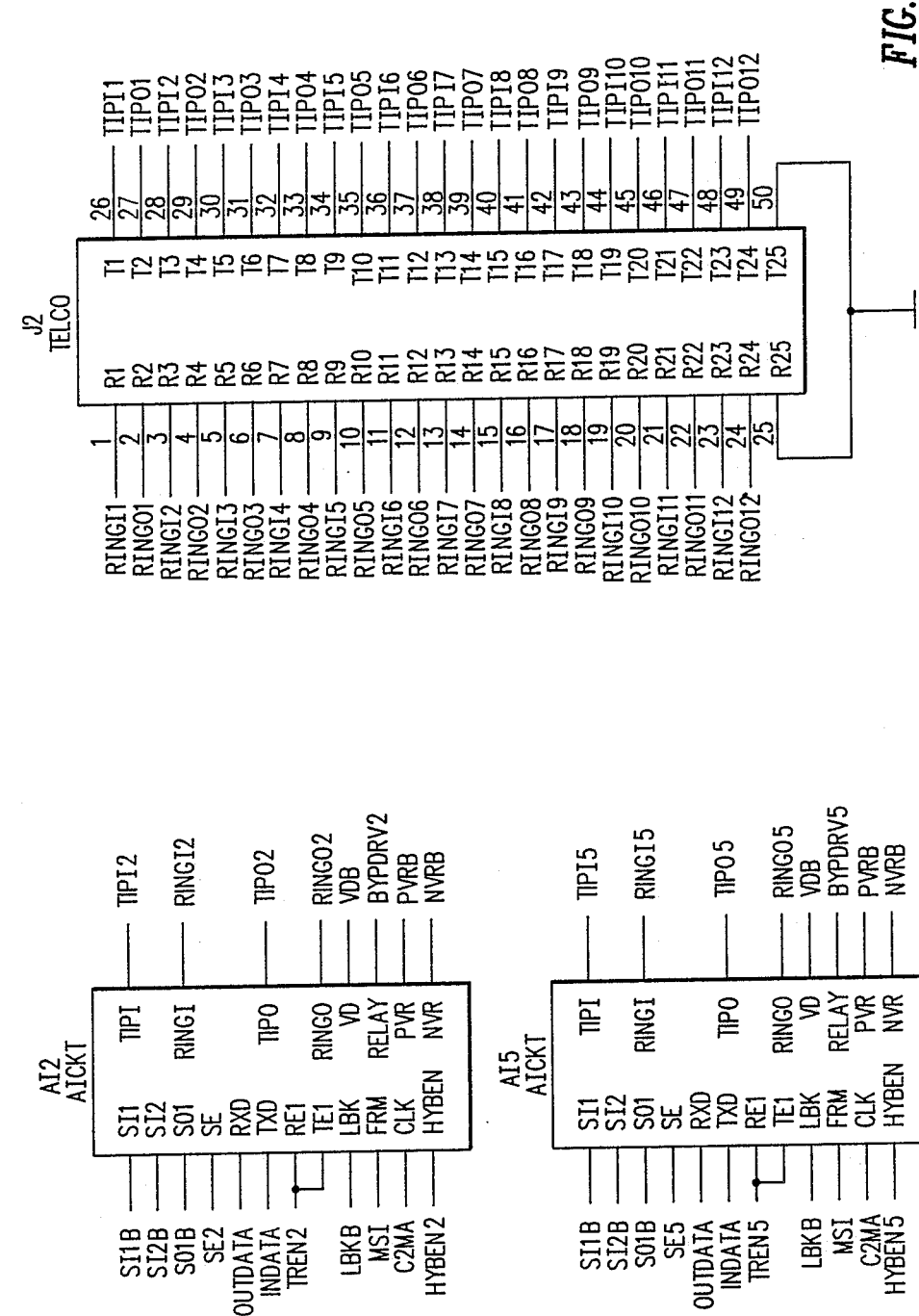
FIG. 8l"

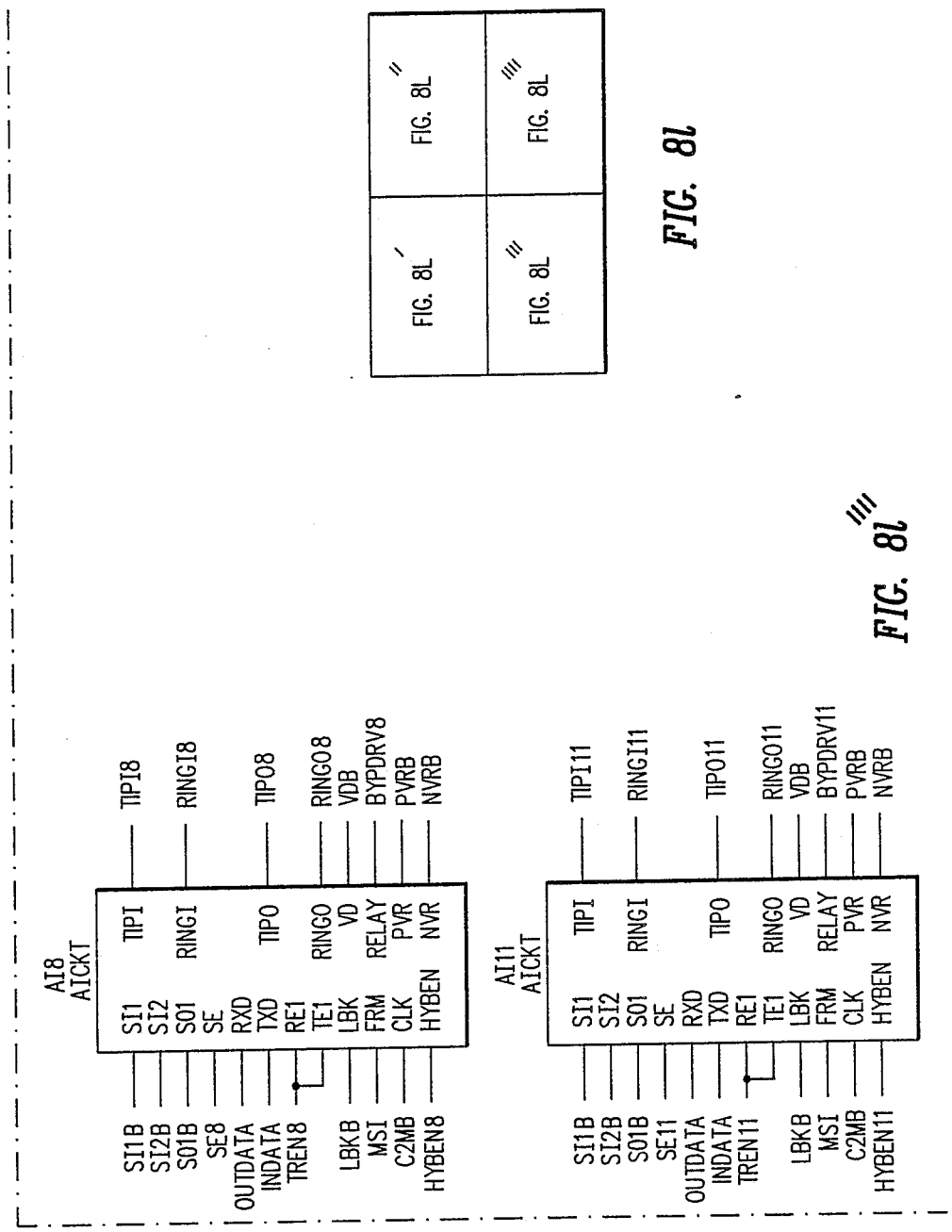

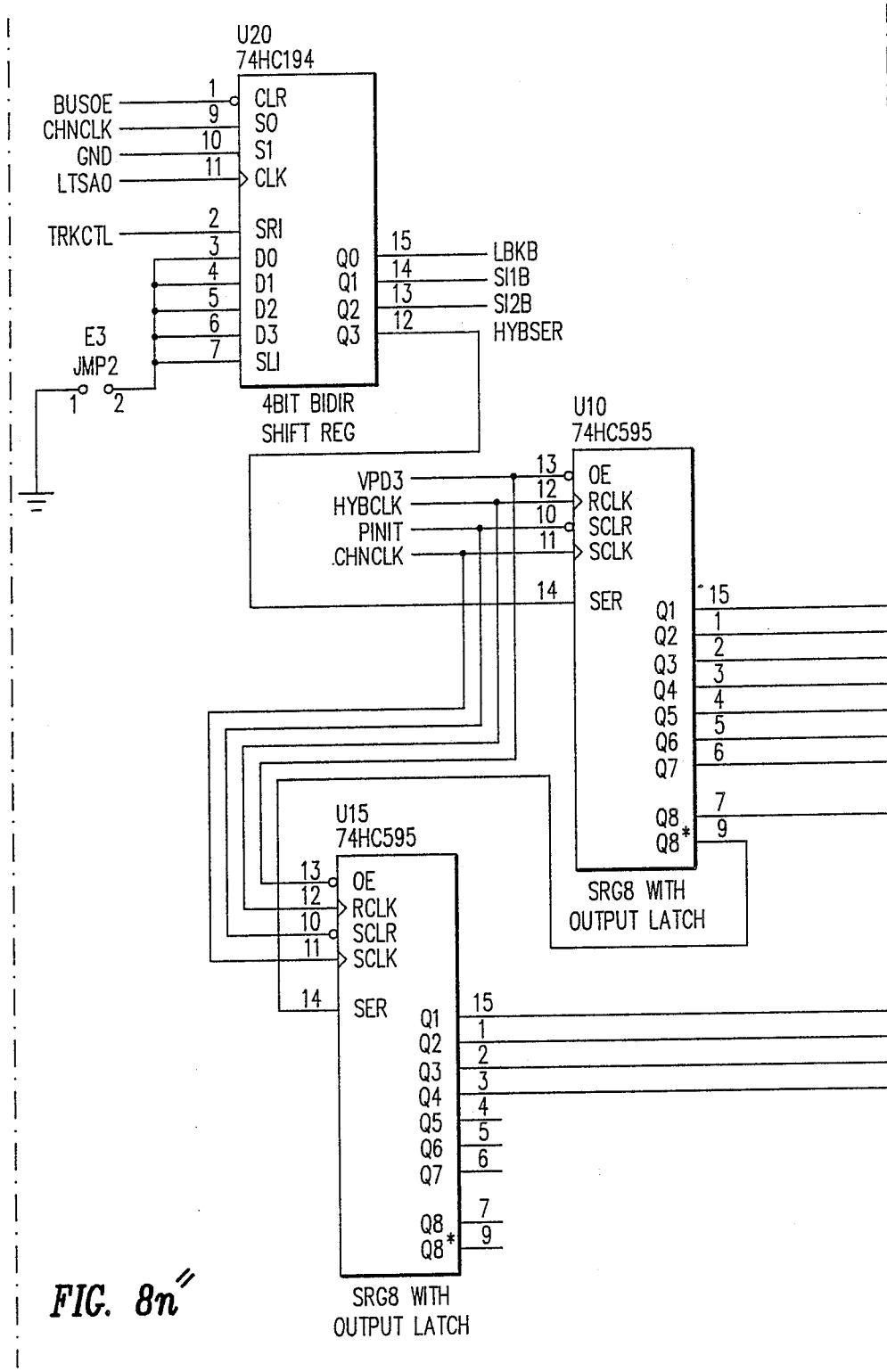
FIG. 8n″

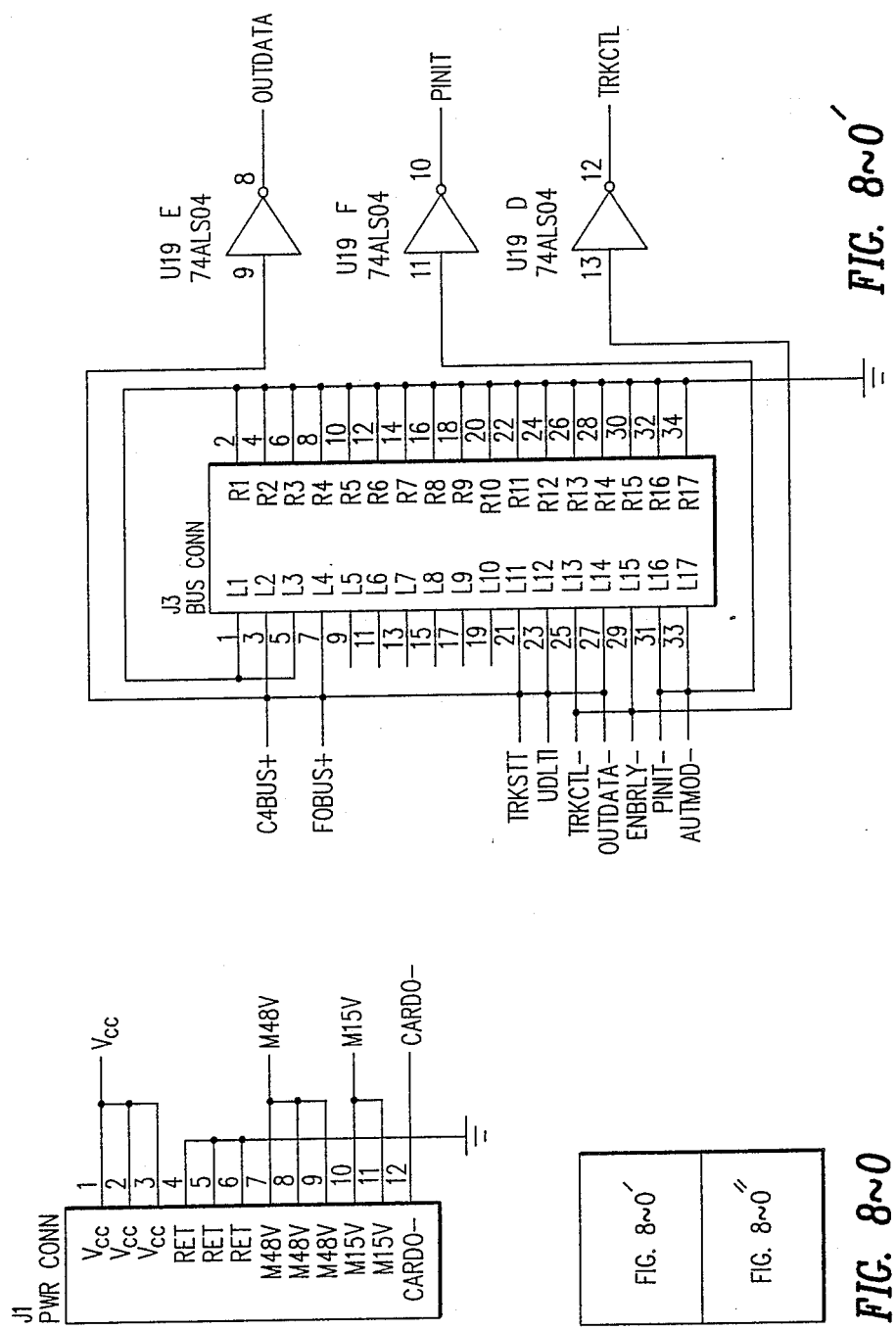

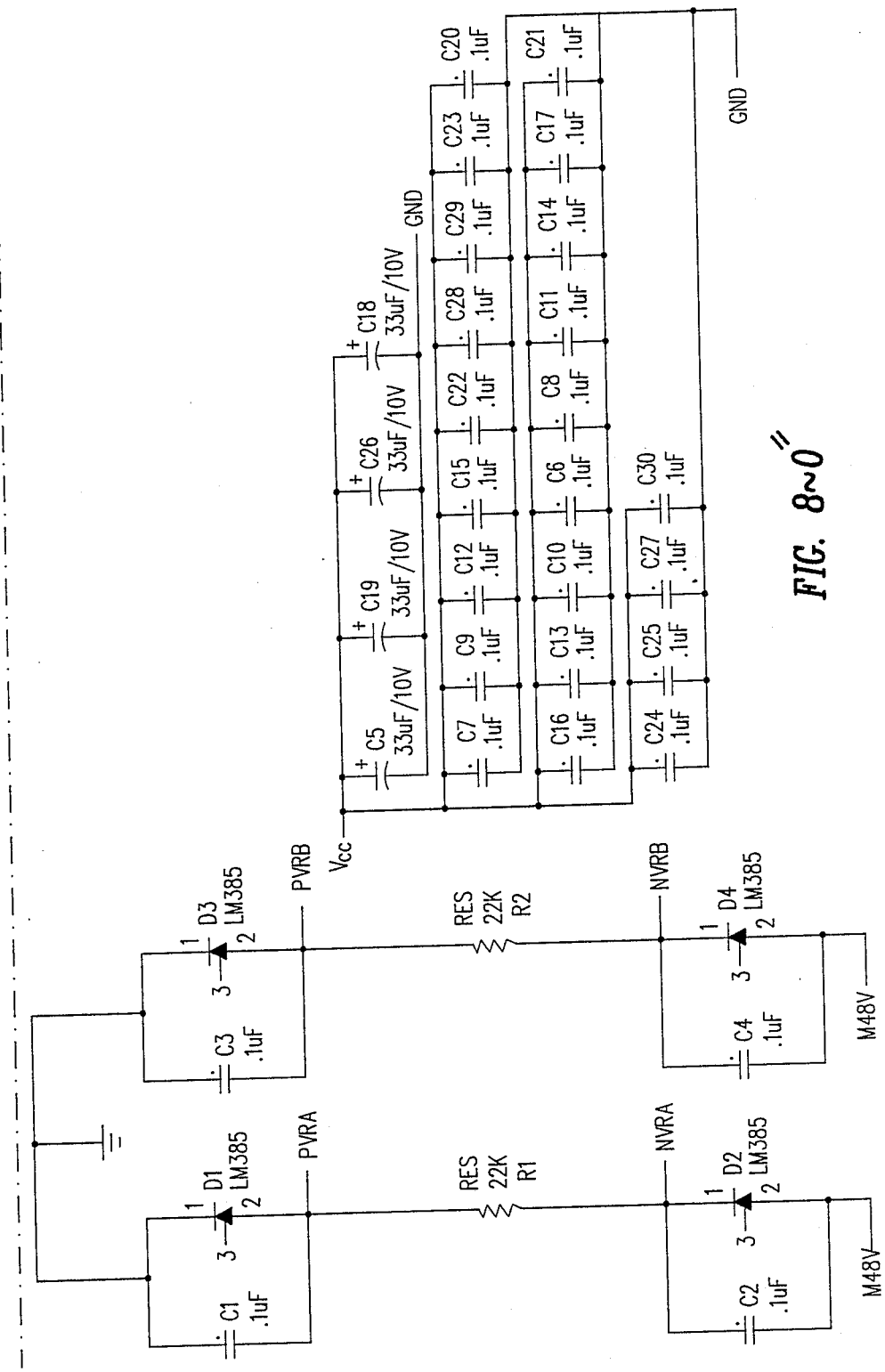
FIG. 8~O

DIGITAL BYPASS FOR TELEPHONE SYSTEM

MICROFICHE APPENDIX

This disclosure includes a microfiche appendix having 3 fiche and 216 frames total showing a listing of a computer program described below. This disclosure includes material subject to copyright protection; the copyright owner has no objection to the facsimile reproduction of the patent documents or the patent disclosure as it appears in the Patent and Trademark Office files, but otherwise reserves all copyright rights whatsoever.

BACKGROUND OF THE INVENTION

1. Field of the Invention

This invention relates to a device and method for bypassing a telephone system such as an ACD (automatic call distributor) or a PBX (private branch exchange) control unit in the event of a system failure or a power failure. The invention more specifically allows telephones connected to the ACD or PBX to be used for incoming and outgoing calls during a control unit or power failure by connecting the telephones to a T1 span trunk (or other digital telephone line) to the central office.

2. Description of the Prior Art

The T1 digital transmission system, carrying DS-1 signals, is the primary telephone digital communication system in North America. Providing full-duplex transmission at 1.544 megabits per second (Mbps), a single T1 facility (also called a T1 span) normally handles 24 multiplexed 64 Kilobytes per second (KBps) channels for the transmission of digitized voice, or as many as several hundred lower-speed data signals on an "un-channelized" basis by means of a T1 multiplexer.

The T1 signal is a bipolar pulse train with a 50% duty cycle. Each time slot may contain a single pulse of one-half the time slot duration. If a pulse is present, the time slot represents a 1 bit (binary digit); if no pulse is present, the time slot represents a 0 bit. Consecutive pulses are expected to be of opposite polarity; thus, consecutive pulses of the same polarity (called a "bipolar violation" or BPV) indicate a transmission error.

Common carriers such as AT&T and the regional Bell Operating Companies lease various T1 services, both terrestrial and satellite. Within a local telephone company, T1 signals are frequently transmitted over standard twisted-pair copper cable circuits. Repeaters regenerate the signal every mile or so, ensuring reliable transmission over long distances even if the transmission facilities themselves are poor. In addition, T1 signals may be transmitted using digital microwave radios, fiber optic systems, and coaxial cable modems.

PBX's and ACD's (see FIG. 1 depicting a conventional analog bypass unit) are well known in the art. A typical ACD 10 includes a system controller 12 (which may be for instance a multiprocessor computer) for performing call processing and administrative functions.

The system controller controls a switching subsystem 14 which is a digital switching matrix. The switching matrix supports analog trunks 26, T-1 digital trunks (not shown), and telephone sets 20a, 20b, 20c, and 20d through a telephone set interface card 16 (see solid line denoting normal ACD operation). The telephone sets 20a, 20b, 20c, and 20d connected to a typical ACD 10 may be called agent telephone sets, since the telephone users are often sales or reservation agents.

Given the critical nature of their operation, in the event of a failure, most high-volume call centers want to bypass the ACD 10 for as many trunks 26 (i.e. lines) as there are agents available tak calls. Critical component redundancy and uninterruptable power supplies are too costly for many call-center installations. Therefore, analog trunk bypass mode (dotted lines) by a trunk bypass unit 28 in the main distribution frame 24 has been the usual prior art method for failure backup. Analog trunk bypass connects analog telephone access trunk lines 26 directly to analog telephones 30a, 30b in the case of a system or power failure.

An alternative conventional bypass system (not shown) connects ground/loop start trunk lines at a ground/loop start card 31 to ordinary telephones via a manual or remotely activated relay transfer (not shown). There is a one-to-one association between incoming trunk lines and telephone sets, and this association is fixed.

Most ACD's and PBX's feature digital switch designs that offer direct trunk connection to digital T1 services. For most high-volume call centers, the cost of digital T1 trunks is significantly less than the cost of analog trunks, on both the ACD/PBX interface side and the outside telephone network side. One high-density 24-channel T1 phone set interface card often replaces three 8-channel analog cards in a digital ACD or PBX. New digital network technologies and increased competition among the long distance carriers are expected to result in even lower prices for digital network services.

Users of digital systems have heretofore employed analog bypass (denoted by dotted lines) by using a mixture of digital and analog trunks. All trunks are in service during normal operation, but only the analog trunks are operational during a power failure. Analog trunks must be terminated on analog-type telephones, often used solely for this back-up purpose. Thus in the prior art, providing back-up for digital telephone systems is expensive, and even then only limited back-up service is made available.

SUMMARY OF THE INVENTION

A bypass unit in accordance with the invention permits the bypass of all T1 (or other digital) lines directly to ACD telephone sets during an extended power outage or system failure. During normal ACD operation, the T1 span lines pass through the T1 by-pass unit, terminating on the conventional T1 trunk interface card installed as shown in the system cabinet. Digital telephone sets that are to be used when the system is in bypass mode are connected to both the bypass unit and the ACD.

In the event of a power failure, in accordance with the invention the ACD automatically goes to battery backup operation. Most ACD system functions (including all call processing functionality) are provided on battery backup, and the cutover to batteries is preferably invisible to the outside caller and to the agent. Operation of the entire system can be maintained for about an hour in one embodiment. In this mode, batteries power the entire system with no noticeable change in service or system functionality.

When the battery output falls below a particular voltage level, or if the ACD system itself fails, an indication is sent to the bypass unit and the ACD system goes through an orderly shutdown. The bypass unit then connects the T1 span and the designated digital agent telephone sets. Both the bypass unit and the digital agent telephone sets are powered from the remaining power output of the battery backup unit until the batteries are exhausted. This is the same battery unit that powers the entire system during the first hour of an extended power outage.

Unlike the prior art analog bypass, which requires that each trunk be connected to a specific telephone set, the bypass unit in accordance with the invention offers more flexibility due to its built-in intelligence. A number of digital agent telephone sets can receive bypassed calls for each T1 span.

Arriving calls are queued by the bypass unit and distributed to the next available agent. The size of the queue is preferably set as a percentage of available agent sets. Callers in the queue will hear ringing in queue until the call is answered. When the queue is full, additional callers hear a busy signal. Advantageously, a call center with 24 agents and two T1 spans need not dedicate the 24 agents to a single span for power-failure backup. Instead, the agents can be distributed across both spans.

In bypass mode, calls are directly connected to a telephone set, which is preferably a digital telephone instrument specifically designed for call center applications. There is thus no need to purchase separate analog-type telephones. Trunk bypass also permits calls to queue for agents and bypass an individual T1 card in the event of a T1 card failure.

Manual system bypass can be thus initiated at any time in accordance with the invention. Also, automatic unattended cut-in of the bypass capability occurs when the operation of the system controller is interrupted. Upon recognizing an interruption in the operation of the system controller, the bypass units automatically connect each configured two-wire analog loop/ground start trunk circuit or a T1 circuit channel to a telephone set.

During automatic bypass, the ACD system controller determines when the associated trunk and telephone set should be disconnected from the switching subsystem and connected together. When bypass is manually specified to be on, the associated trunk and telephone set are disconnected from the switching subsystem and connected to one another, regardless of the status of the rest of the system.

An incoming telephone call on a bypassed trunk causes a telephone set to ring. The agent answers the ringing incoming call preferably by pressing a key on the set. To terminate the call, the agent presses another key.

An agent wishing to place an outgoing call while in bypass simply presses an outside line key, drawing a dial tone from the serving central office. The dial pad of the telephone is then active.

The bypass unit provides the ability to place and answer calls on a T1 span in the event of a system failure or a T1 Interface Card (in the ACD) failure. Each bypass unit has the capability to terminate one T1 span on a group of, for instance, up to 24 telephone sets. In one embodiment, either one or two 12-port cards can be housed in each bypass unit to bypass up to either 12 or 24 telephone sets.

Operation of the bypass unit can either automatically depend on the state of the ACD or can be manually controlled as described above. If the bypass unit is in automatic mode and the ACD goes into bypass, calls arriving on the T1 span are handled by those telephone sets connected to the T1 bypass unit. Manual control of the bypass unit will override the state of the system bypass input. Selective operation will allow for the bypass of an individual T1 span while the ACD is still in normal operation.

When an incoming call is detected, the T1 bypass unit attempts to answer the call if there is an available telephone set. A limited form of call distribution is preferably provided. Calls will be directed to the first free telephone found by a top-down hunt of all the on-line telephone sets.

If no telephone sets are available, the call will not be immediately answered. In this case, either a ringing signal or a busy signal is supplied to the caller until the telephone company central office releases the line by the caller going back on-hook (i.e., hanging up). Preferably, the system can specify whether calls will queue and receive the ringing signal, or not queue and receive a busy signal.

The queuing threshold is a parameter that can be set at different levels depending on the needs of the system. The queuing threshold is preferably a percent of on-line telephone sets. For example, if ten telephone sets are on-line and the queuing threshold is set at 50%, if all ten on-line telephone sets are busy and cannot take any calls, then up to five additional calls can be queued and the sixth call will receive a fast busy tone.

During bypass operation an agent can initiate a call by depressing an outside line key on his telephone set. If no resources are available (no outgoing lines), the caller hears a busy signal. If an outbound line is available, the agents call proceeds and an audio path is established between the agent's telephone set and the outside telephone line network. The agent hears a dial tone and can then proceed to digits.

Each bypass unit preferably includes an RS-232 maintenance port. The maintenance port supports a menu-driven terminal interface, performing a variety of functions Primarily, it is used to configure the bypass unit for a particular T1 span.

The present disclosure describes one embodiment of the invention for use with an ACD and a T-1 span; this is an example, and is not limiting, since the invention is also applicable to PBX's and other types of telephone systems and to other types of digital telephone lines.

BRIEF DESCRIPTION OF THE DRAWINGS

Similar reference numbers in various figures denote similar or identical structures.

DETAILED DESCRIPTION OF THE INVENTION

Figure 1:
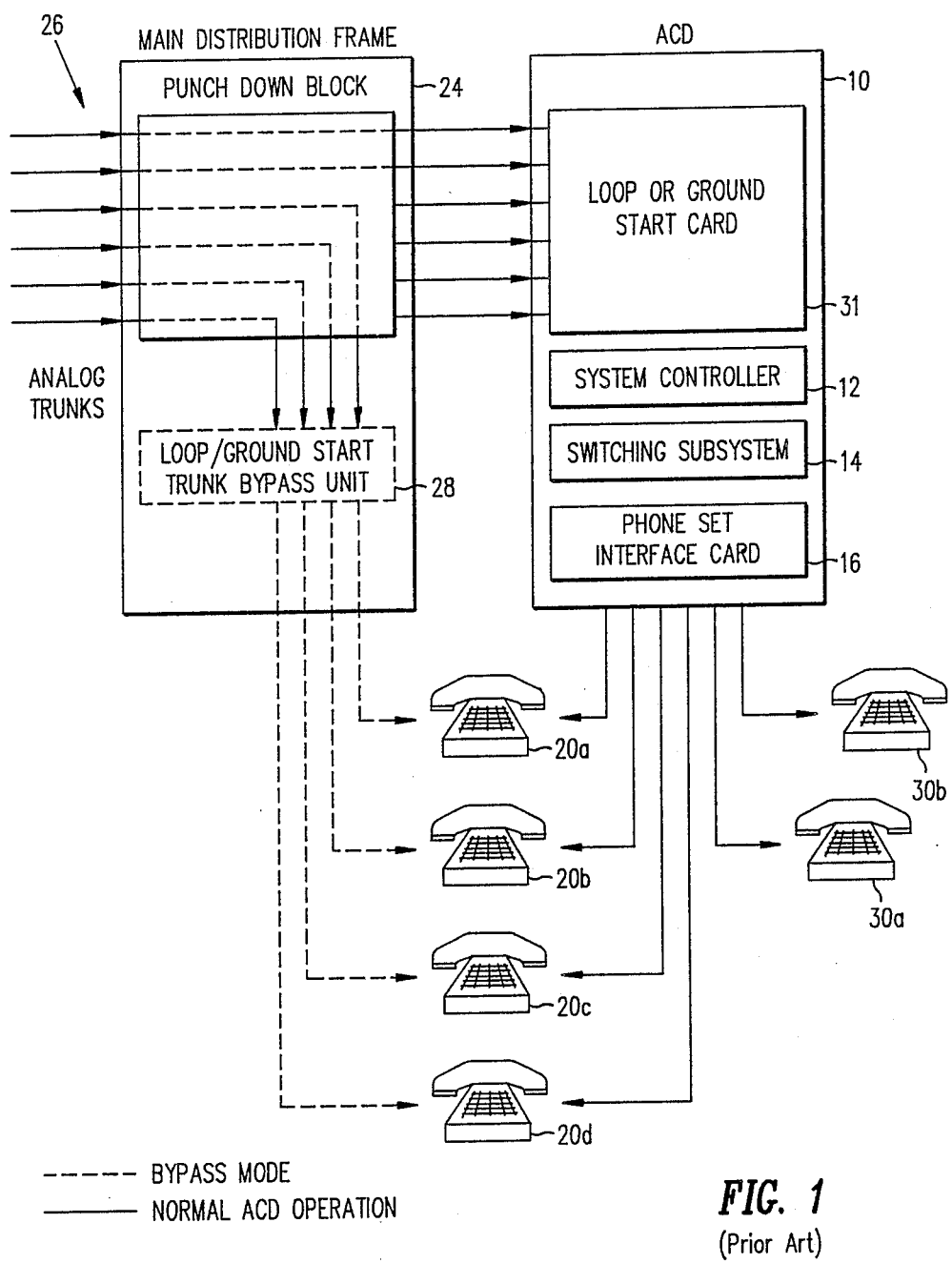
FIG. 1 shows a prior art analog bypass system.
Figure 2:
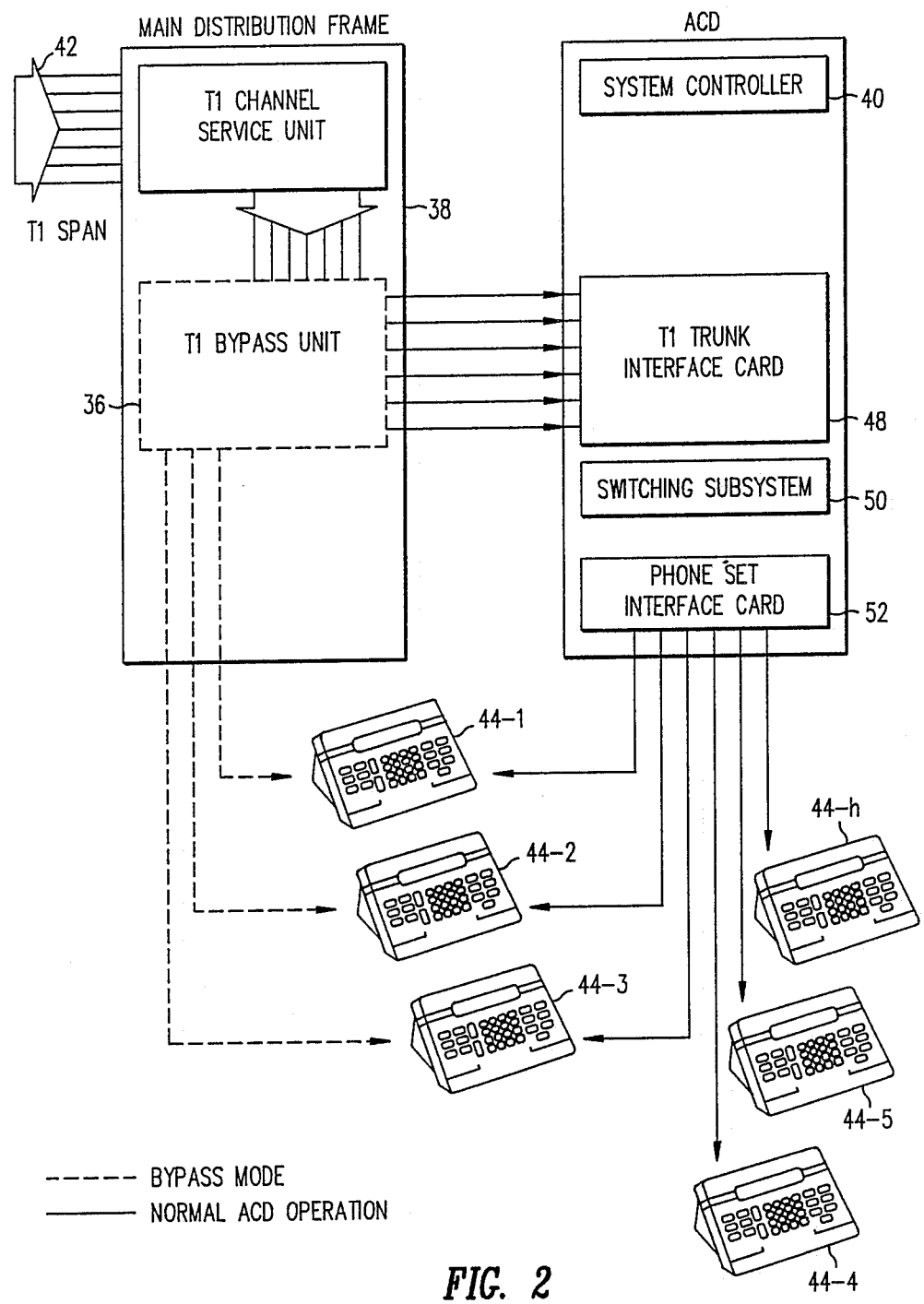
FIG. 2 shows a bypass unit in accordance with the invention.

A T1 bypass unit in accordance with the invention as shown in FIG. 2 provides the ability to place and answer calls on a T1 span (or other kind of digital telephone line) in the event of a system failure or failure of a T1 trunk interface card failure. Each T1 bypass unit 36 (T1BU) located in the main distribution frame 38 is connected by a T1 channel service unit (CSU) 39 to the T1 span 42 and has one T1 span termination and preferably up to twenty-four telephone set terminations. In addition, when bypass is not activated, T1BU operation is transparent to the ACD 40. In the preferred embodiment, ACD 40 is the Aspect CallCenter, which is commerically available from Aspect Telecommunications, San Jose, Calif.

When bypass is not activated (solid line), the T1 span 42 and any telephone sets (telesets) 44-1, 44-2, . . ., 44-k (where k is up to 24) connected to the T1BU 36 are controlled by the ACD 40. ACD 40 conventionally includes a system controller 46, T1 trunk interface card 48, switching system, and telephone set interface card 52. Normally the incoming T1 span 42 from the central office would terminate directly at a conventional T1 trunk interface card 48 in the ACD 40. Bypass activated (dotted line) requires that transmit and receive telephone wire pairs from both the incoming span 42 and the T1 card 48 are inputs to the T1BU 36. When bypass is not enabled, a conventional switched connection exists within the T1BU 36 between the transmit and receive pairs of the incoming span 42 and the T1 card 48.

Figure 3:
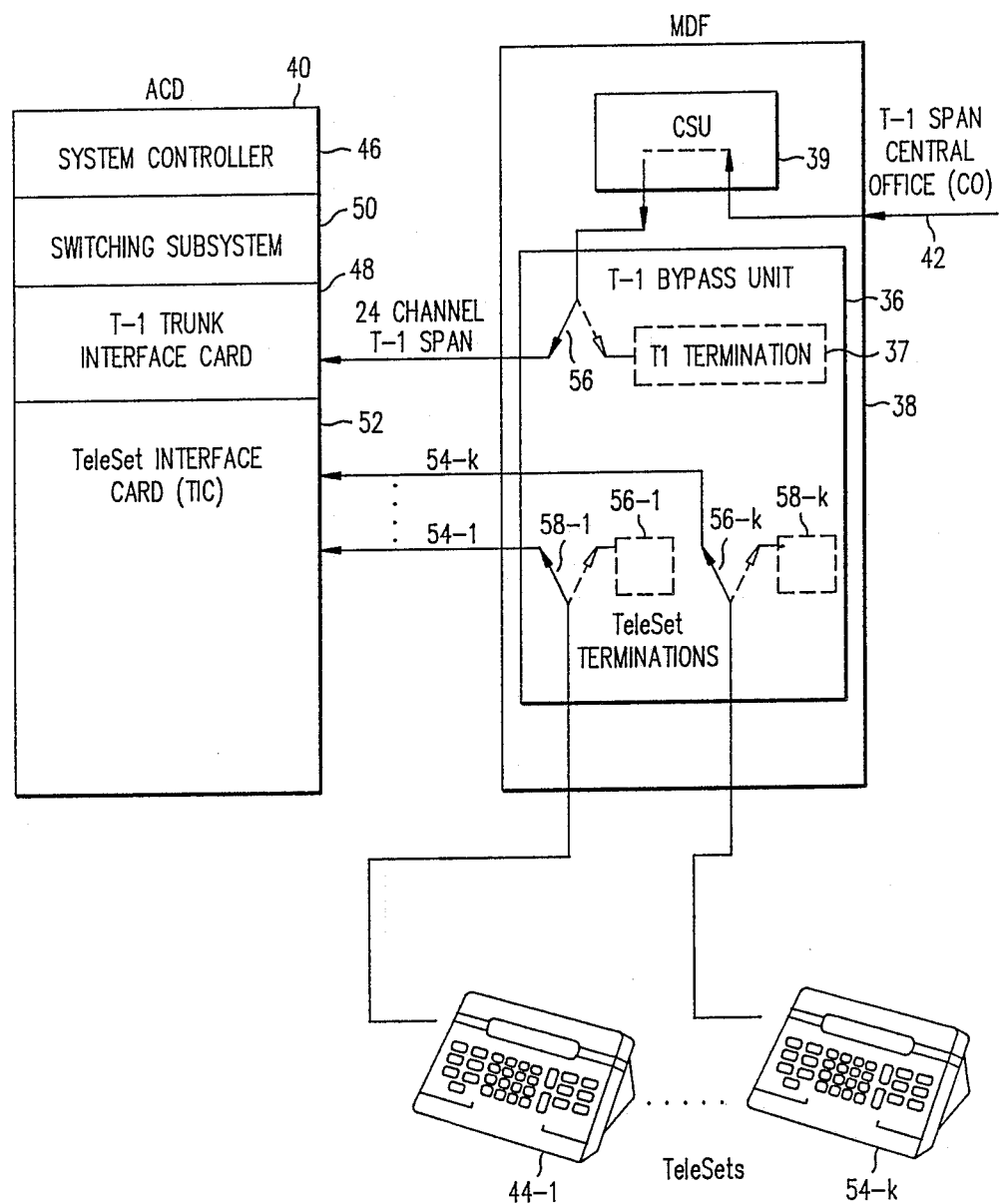
FIG. 3 shows a bypass disabled condition in accordance with, the invention.

FIG. 3 illustrates normal ACD operation. Telephone sets 44-1, . . ., 44-k are normally connected directly to a TIC (telephone set Interface Card) 52 by telephone set terminations 56-1, . . ., 56-k. Bypass requires that the telephone sets 44-1, . . ., 44-k, preferably up to 24, and the TIC connections 54-1, . . ., 54-k (also up to 24) terminate at the T1BU 36. When the bypass function is not enabled, a switched connection 58-1, . . ., 58-k exists respectively between each telephone set and TIC input pairs 54-1, . . ., 54-k. Relays 56 perform the switching function. The connection described above exists when the relay 56 is deactivated (has normally closed contacts). For the T1 span 42, the relay 56 is preferably a 2 form 2C (double pole, double throw) relay. Instead of one relay 56 as shown, preferably twenty-four 2 form 2C (double pole, double throw) relays are used. In normal operation, the ACD 40 handles all calls. As shown, these calls actually pass from the T-1 span 42 to the channel service unit 39 (CSU) in the main distribution frame 38 (MDF) and through the T1 bypass unit 36. Within the ACD 40, the T1 Trunk Interface Card 48 interfaces the ACD 40 with the bypass unit 36, and the teleset (telephone set) Interface Card 52 interfaces the ACD 40 with the telephone sets 44-1, . . ., 44-k.

In bypass mode (see FIG. 4), calls over the T1 span 42 can be connected directly to the telephone sets 44-1, . . ., 44-k. In one embodiment, the bypass unit 36 can provide call queuing and distribution to any one of up to 24 telephone sets 44-1,...,44-k per bypass unit 36. This is an important improvement over analog trunk bypass where hardwire connections limit the system to one trunk line per phone set. Calls can be connected to telephone sets, queued, or provided a busy signal. The number of calls which can be queued is determined by the system management.

As shown in FIG. 3, when the T1BU 36 is not activated it provides normal signal terminations to the ACD 40 for all associated circuits 54-1, . . ., 54-k. This is not the case when bypass is activated. Bypass is activated and circuit terminations are effected as described hereinafter.

Operation of the T1BU is the result of the combination of two inputs—the system bypass state, and a front panel switch on the T1BU. The switch bypass state (in/out of bypass) is an input to the T1BU. The bypass switch assumes one of the following three states:

1. Position 1—Bypass tracks system status.
2. Position 2—Forced into bypass.
3. Position 3—Forced out of bypass.

With the switch in position one, the T1BU tracks the state of the bypass input. If the system is in bypass, then the T1BU will go into bypass. This is referred to as Auto Mode.

Positions two and three allow manual control of the T1BU and override the state of the system bypass input. Position three, forced out of bypass, is a safeguard in the event of a T1BU failure or malfunction of the system bypass input.

Position two (forced into bypass) is used in two different situations. Failure of the system bypass input is one case. If the system bypass input does not reflect the true state of the system, then the T1BU can be forced into bypass operation by placing the switch in this position. Selective bypass operation is the other case. This will be the most common use of this switch setting. Selective operation will allow for the bypass of an individual T1 span while the ACD 40 is still in normal operation. This feature can be used in the event of a single card failure, maintenance condition, or similar problem.

Figure 4:
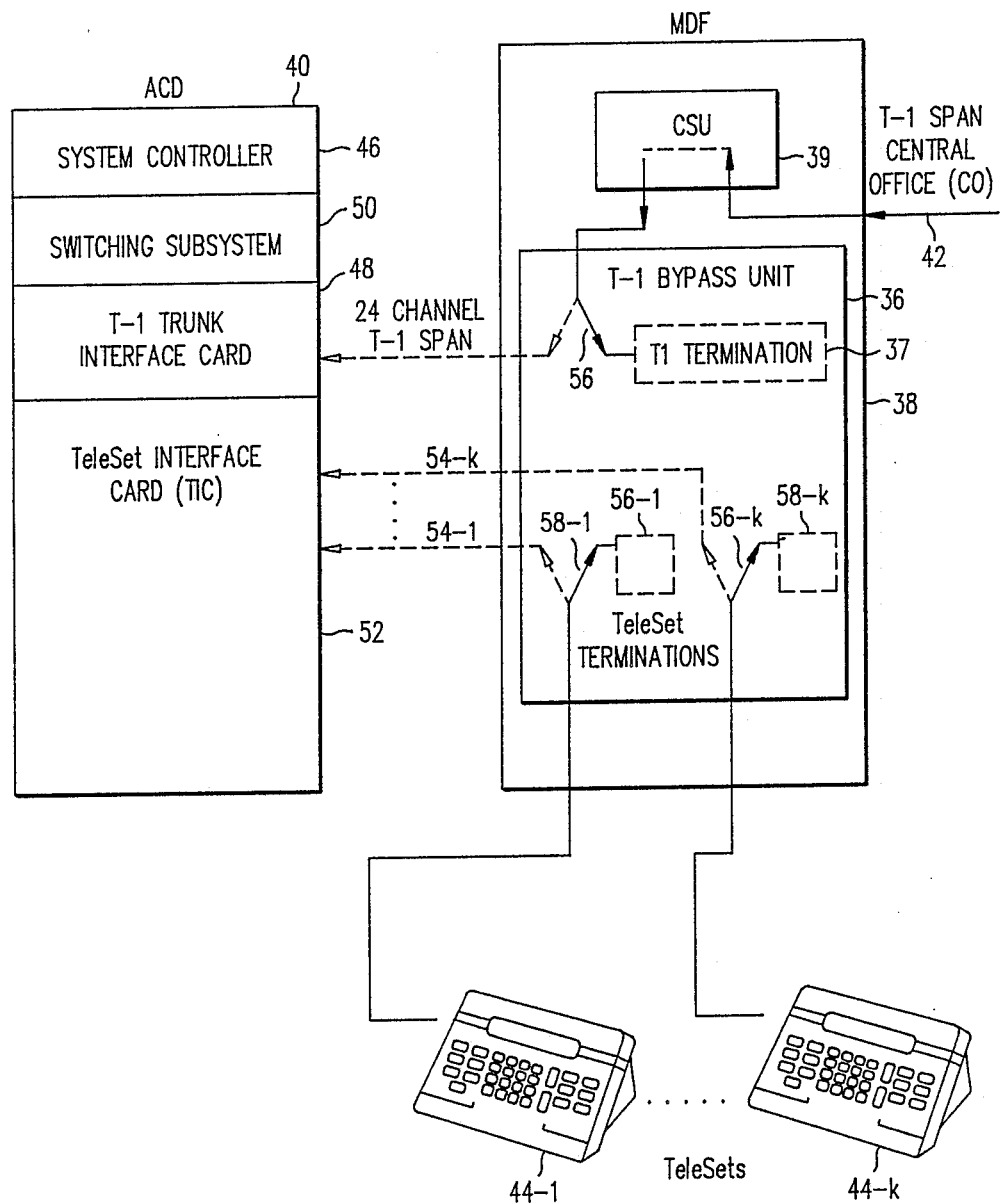
FIG. 4 shows a bypass enabled condition in accordance with the invention.

When the T1BU 36 is in bypass mode the normal system connections as shown in FIG. 3 are no longer in effect. The T1 span 42 will no longer terminate directly at a T1 card 48 in the ACD 40 but terminates at a T1 termination 37 in the T1 bypass unit 36 as shown in FIG. 4. Similarly, the telephone sets 44-1, . . ., 44-k will no longer directly be connected to a telephone set Interface Card 52 (TIC); instead the telephone sets 44-1, . . ., 44-k will terminate at the T1BU 36. Both the T1 span 42 and the telephone sets are now controlled by the T1BU 36.

There are two ways in which this T1 bypass mode can occur. The T1BU 36 can be in auto mode and go into bypass following ACD 40 signals indicating a system failure, or the T1BU 36 can be forced into bypass mode by manual switching.

If the T1BU 36 is forced into bypass, it is up to management to determine how to bring each individual telephone set down from normal processing, since the ACD 40 can still process calls. Each telephone will preferably have an associated T1BU switch (not shown) that indicates how it will behave when bypass is activated.

These telephone switches are preferably two-position switches, and affect both when bypass has been forced manually and when bypass occurs automatically. One switch setting will keep the associated telephone set from going into bypass, while the other setting will allow bypass to occur. This allows control of which telephone sets go into bypass and when they do so, minimizing any disruption of calls already in process in the case of forced bypass.

The following describes the call handling capabilities of the T1BU 36 with reference to FIG. 4. The T1BU manages two sets of available resources, the telephone sets 44-1, . . .,44-k in bypass and the T1 span 42. Depending on how the T1 span 42 is configured, it can be any combination, up to 24, of incoming, outgoing, incoming/outgoing only channels (not shown). These individual channels are conventionally referred to as DS0 (Digital Service, level 0, the worldwide standard for digitizing one voice connection) channels. Each individual DS0 channel may also assume an individual signaling type unrelated to the other channels. Both inbound and outbound E&M (ear and mouth) signaling are provided, with start dial signaling as explained below. Inbound signals conventionally refer to signals from the Central Office (CO) to the Customer Premise Equipment (CPE) such as the MDF 38 and ACD 40. Outbound signals conventionally refer to signals from the CPE to the CO. There are conventionally three types of start dial signals for both inbound and outbound, namely: Immediate, Wink Start, and Dial Tone.

Current configuration information relating to the T1 span 42 is maintained by a software configuration editor (not shown) and is stored in nonvolatile memory in the ACD 40. This feature is described below. The following describes how calls are initiated and answered at the telephone sets.

The circuitry in the T1BU 36 preferably allows for full crosspoint switching capabilities between each DS0 channel and each telephone set 44-1, . . .,44-k. Crosspoint switching means that there is a real time, programmable, full duplex audio path between any telephone set and any DS0 channel. Local tones can be generated including conventional call progress tones such as busy, fast busy, or audible ringing. Up to 16 tones can be directed to any telephone or DS0 channel. The controller will take care of cadence when necessary, as in the case of fast busy. Programmable attenuation by a PAD for transmit and receive paths is also possible. (As is known in the art, a PAD is a programmable attenuation device to achieve a loss by using digital control of the attenuation values.)

Figure 5A:
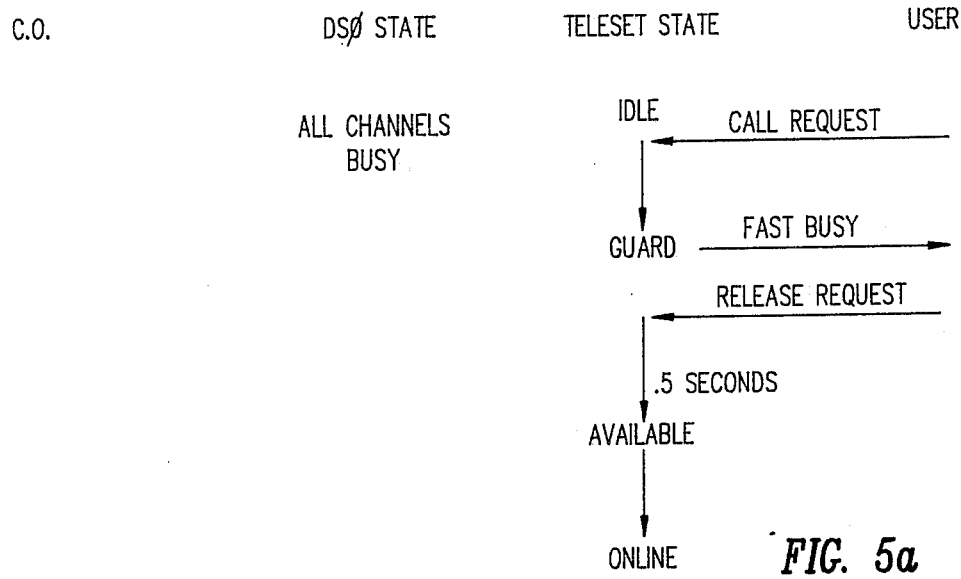
FIGS. 5a to 5f depict call event sequences in accordance with the invention.

During bypass operation a user of an idle telephone set (the "near end") may initiate a call by depressing the outside line key. (See FIG. 5a depicting this call sequence.) This alerts the T1BU control unit that a call initiation is being requested. At this point the caller's audio path is connected to silence.

If there are no resources available (either no outgoing DS0 channels, or they are all in use) the caller will be connected to the fast busy tone. This will alert the caller that there are no resources available. No further operations can take place from this telephone set until a release key is depressed on the telephone set. At this point the telephone set will receive silence and will be placed in the idle state by the bypass unit.

Figure 5B:
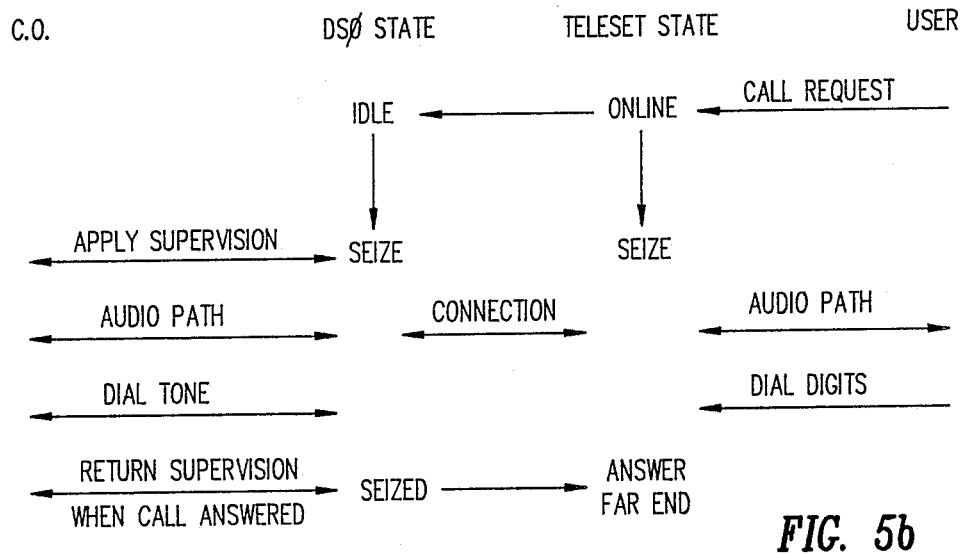

If an outbound DS0 is available (See FIG. 5b depicting this sequence), then call initiation can proceed. At this stage a DS0 channel will be allocated to the telephone set. The bypass unit will attempt to seize the outbound trunk via the signaling mode indicated in the stored database. Typically, when the trunk is seized a dial tone is provided. However not all circuits will provide a dial tone, in which case a local dial tone can be provided. Before establishing a two-way audio path, the telephone set preferably will receive one second of locally generated dial tone. A successful seizure will result in an audio path being established between the telephone set and the DS0 channel.

Figure 5C:
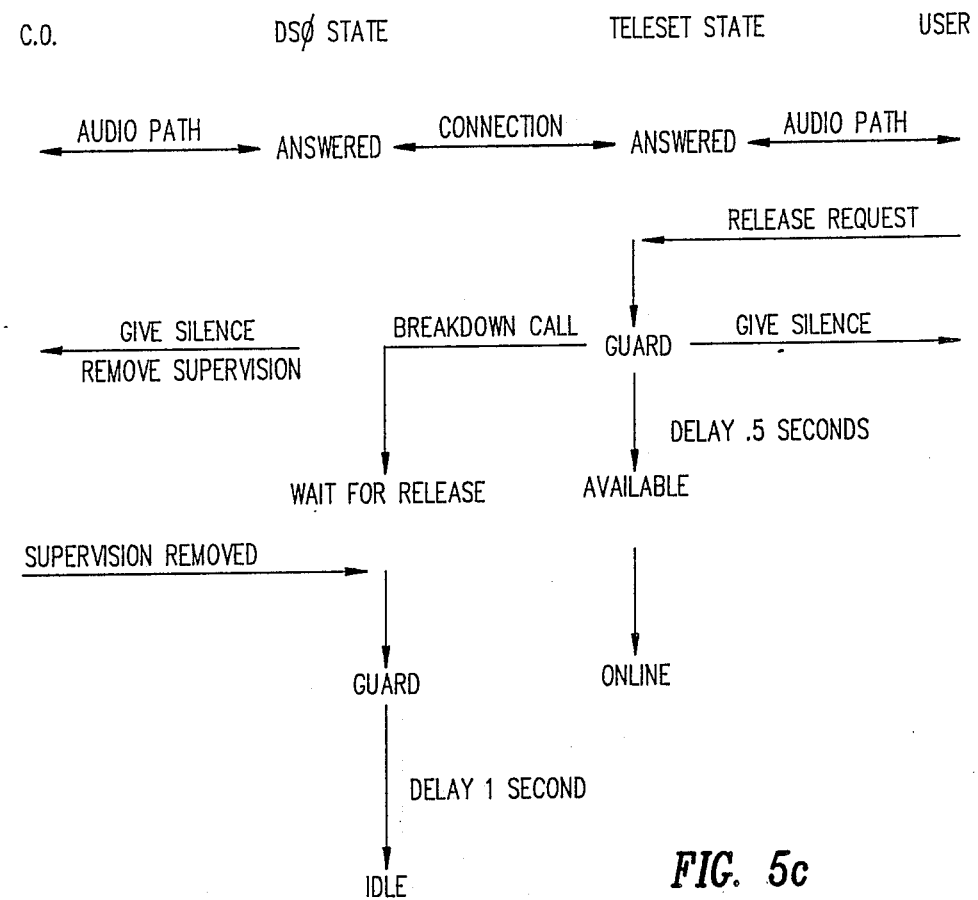
Figure 5D:
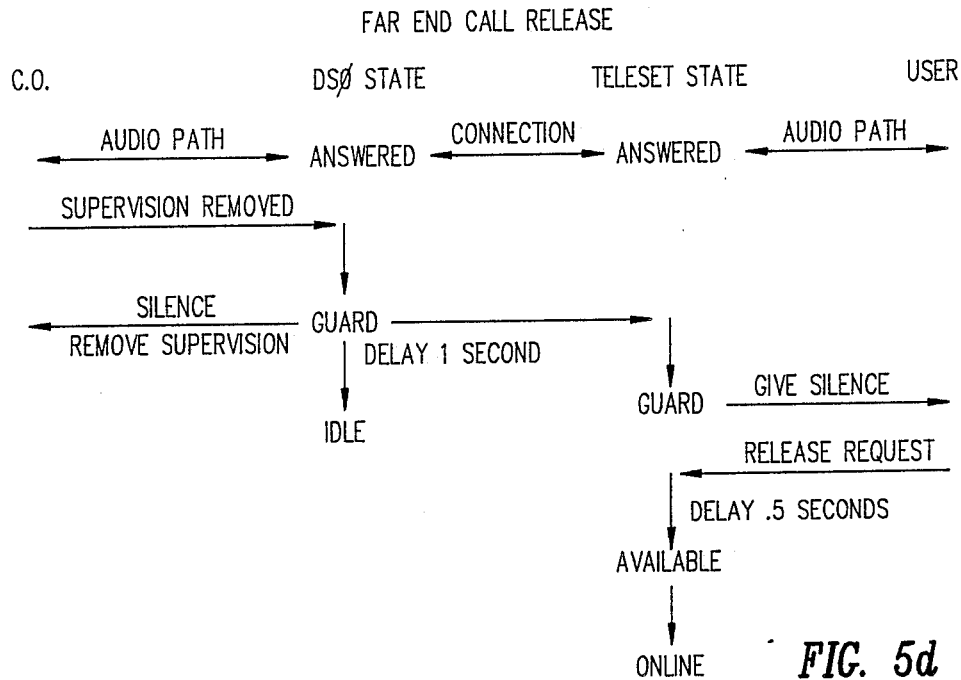

This path will exist between the telephone set and DS0 channel until one of two events occurs. The telephone set ("near end") or the DS0 controller ("far end") (such as the Central Office) may terminate the call. Termination by the telephone set (See FIG. 5c depicting this sequence) will occur if the release key is depressed. Far end termination such as by the Central Office (See FIG. 5d depicting this sequence) will result if the signaling bits for that associated DS0 channel indicate an on hook condition. In either case, termination of the call results in the telephone set receiving silence on the audio path. If the call is terminated by the far end, the telephone set will not assume the idle state until the release key is depressed. At this time the telephone set becomes available to place and answer new calls.

Figure 5E:
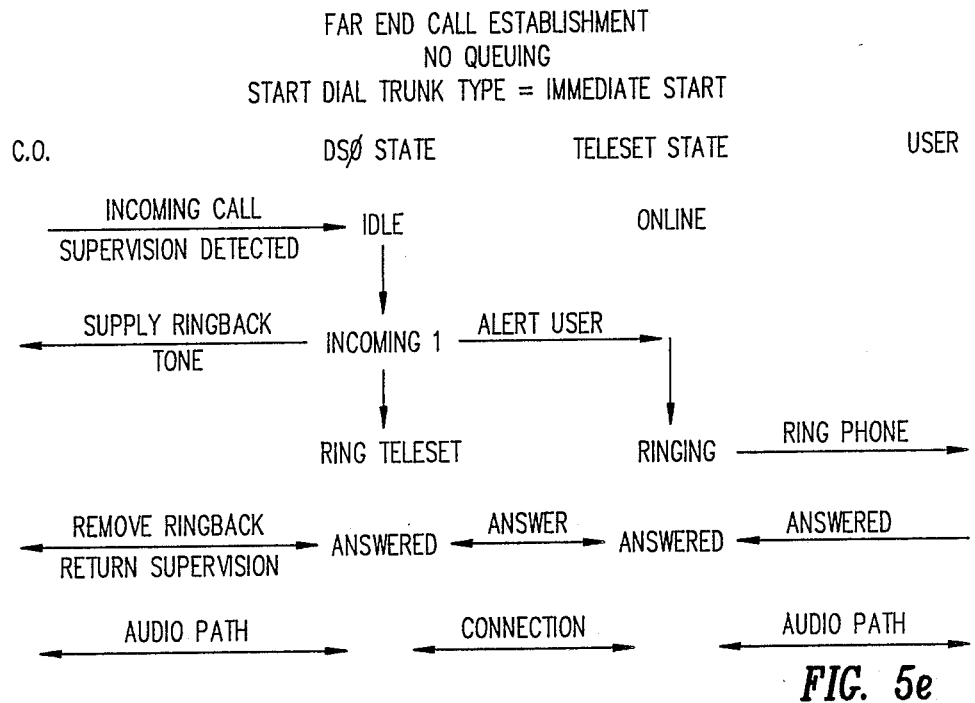

The T1BU manages calls initiated from the Central Office (the "far end") as follows. (See FIG. 5e depicting this sequence) If an incoming seizure is detected on a DS0 channel, the T1BU attempts to answer the call if there is an available (i.e., on-line and not in use) telephone set. If a telephone set is free, then the T1BU initiates ringing and supplies cadence ringback to the DS0. This feature allows for a limited form of automatic call distribution. Calls will be provided to the first free telephone set found in a top-down hunt (i.e., the highest priority being telephone set number 1 and the lowest being number 24 in a 24 channel T1 span) of all the on-line telephone sets. If the agent answers the call by depressing the outside line key, then a talk path will be established and the call will be answered. The talk state will be maintained until either the agent or the central office releases the call. Conditions for releasing the call are the same as those encountered during the outbound call initiation.

Figure 5F:
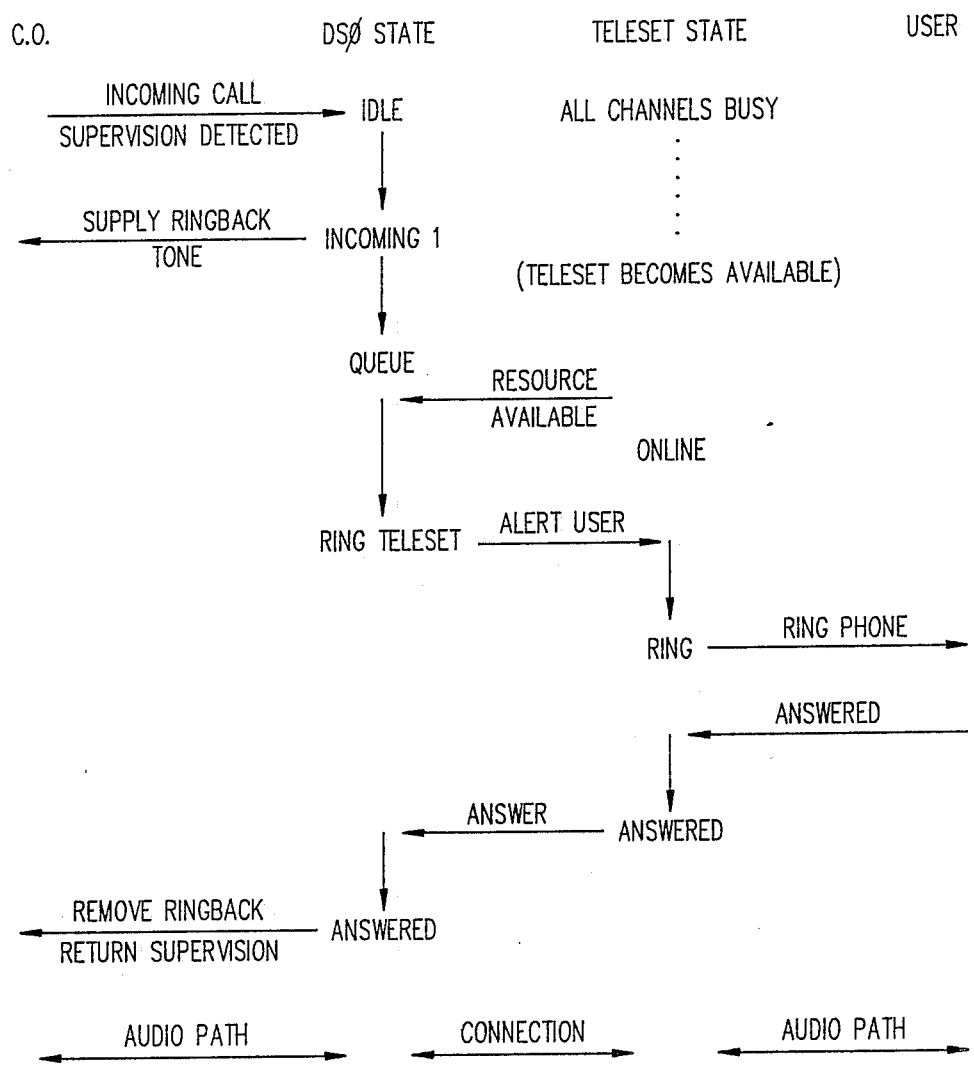

If no telephone sets are free (i.e., on-line and not in use) then the incoming call will queue if the queuing threshold (explained below) is not exceeded. (See FIG. 5f depicting this sequence) If the call is queued, an audible ringback tone is supplied to the trunk until either the call is answered or the far end releases. In the case where the call can not be queued because the queuing threshold is exceeded, a fast busy tone is supplied to the trunk until it is released.

The queuing threshold is preferably a parameter set at different levels depending on the needs of the system, and is preferably a predetermined fraction of on-line telephone sets. For example, assume ten telephone sets are online and the queuing threshold is set at 50%. If all ten online telephone sets are busy and cannot take any calls, then up to five calls can be queued. So the sixth call will receive a fast busy tone, while the fifth call will be placed in queue.

Each T1BU preferably includes an RS-232 maintenance port. The maintenance port supports a menu-driven terminal interface, performing a variety of functions. Primarily, the maintenance port (further described below) is used to configure the T1BU for a particular T1 span.

Internally, the T1 Bypass Unit preferably consists of one T1 Bypass Control Board and one or two T1 Bypass 12-Port Trunk Boards. If equipped with one 12-Port Trunk Board, the unit is capable of bypassing twelve telephone sets. Addition of a second 12-Port Trunk Board provides bypassing for the maximum 24 telephone sets. All 24 T1 span channels are available to the ACD for normal operation (in non-bypass mode) even if only one 12-Port Trunk Board is included.

Figure 6:
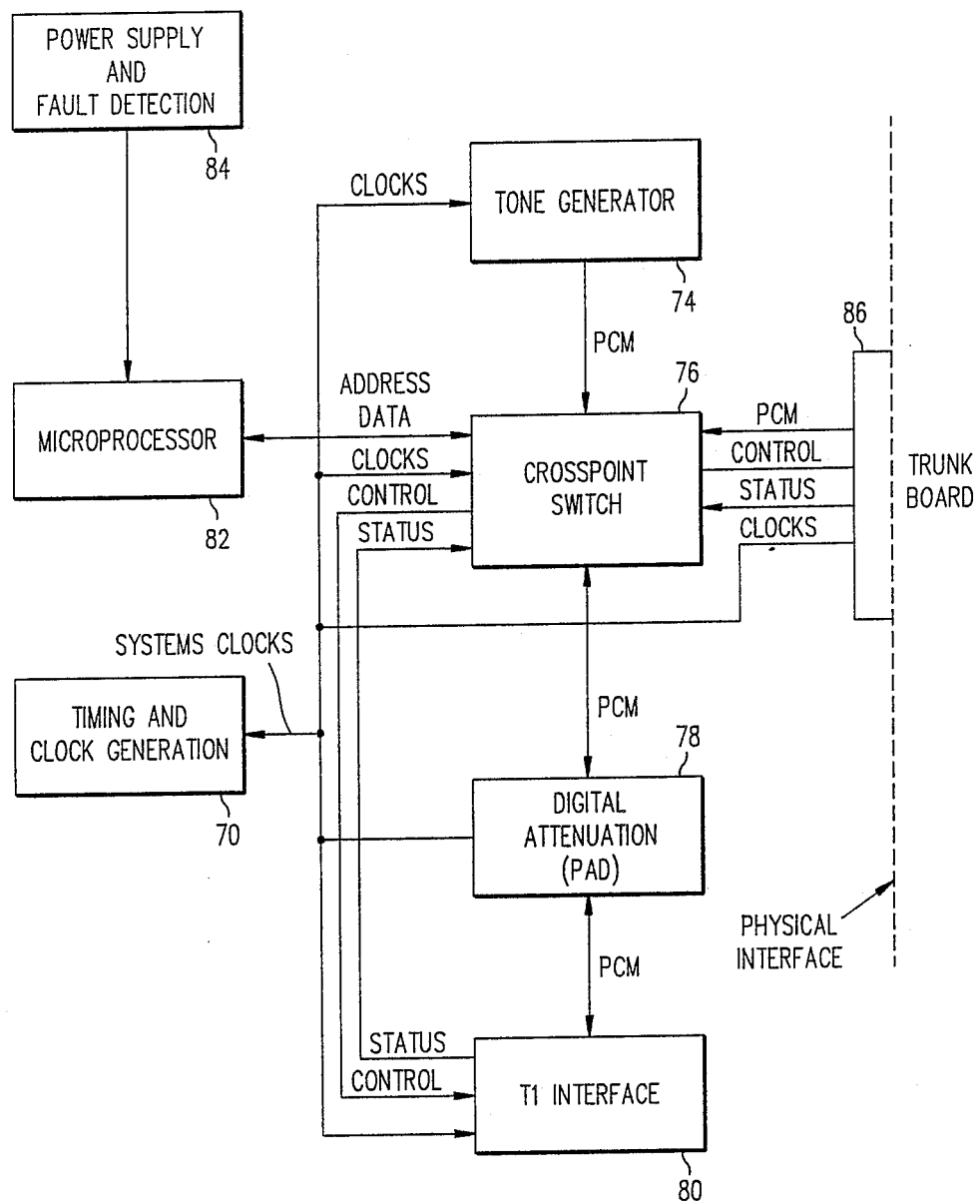
FIGS. 6 and 7 show a block diagram of one embodiment of the invention.
Figure 7:
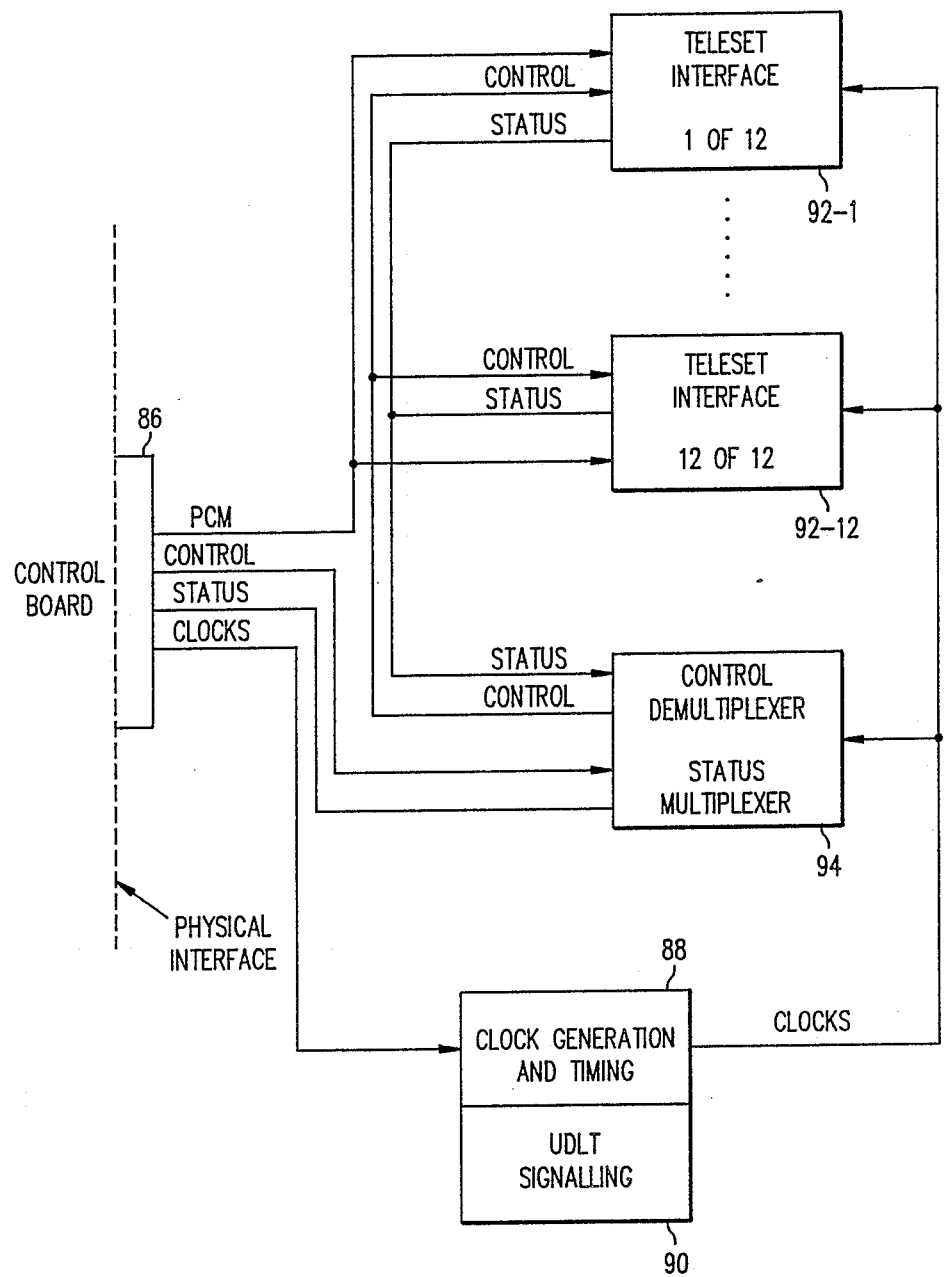

FIGS. 6 and 7 together show a block diagram of one embodiment of the present invention.

The T-1 Bypass Control Board described immediately below and shown in FIG. 6 is the controller for the T1BU (T-1 Bypass Unit). A control board is used in conjunction with one or two 12-Port Trunk Boards (see FIG. 7) supplying bypass for either twelve or twenty-four telesets.

Figure 8A:
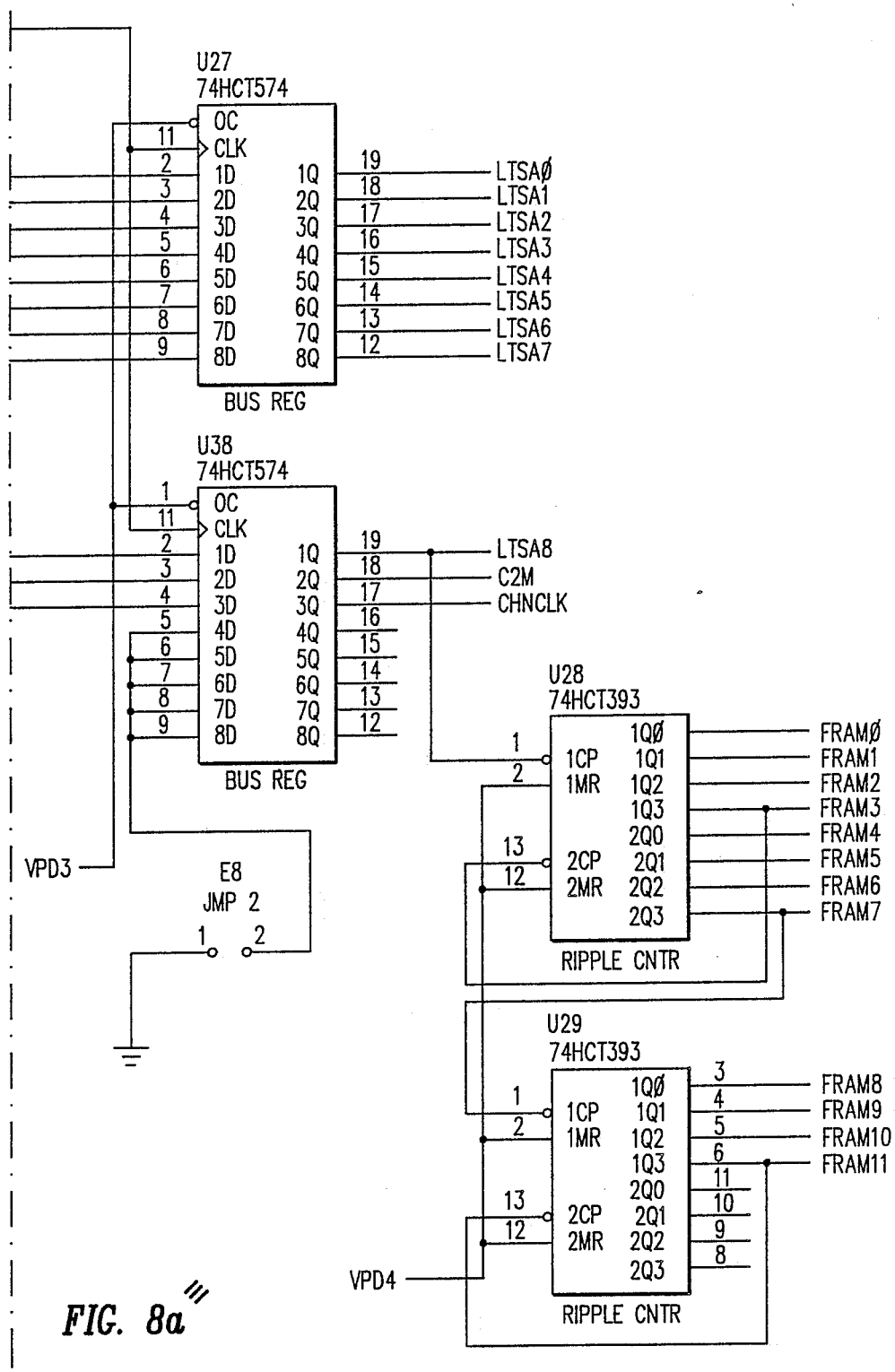
FIGS. 8a to 8o show schematically one embodiment of the invention.

Timing and Clock Generation 70. All timing for the T-1 Bypass Unit is generated via this logic circuitry 70 (shown schematically in detail in FIG. 8a). Central to the timing generation is a MITEL MT8940 (U6) digital phased lock loop. The MT8940 generates a 4.096 MHz clock and 8 kHz frame pulse used by most of the digital logic. In addition this chip generates a 1.544 MHz clock for use as the T-1 transmit clock signal. These clock signals can be frequency referenced to the internal sources, precision oscillators X1 and X2. In addition the clock can be referenced to the recovered T-1 clock signal. This is necessary because of the inherent frequency differences between this unit's internal clock signals and the T-1 span it interfaces to.

The 4 MHz clock signal and frame pulse are used to generate a 512 state counter. These counter bits are called the LTSA bits and are used to generate discrete states relative to the 8 kHz frame. These states are used for generating timing relative to the frame. There is another counter FRAM0→TO FRAM11 which is incremented at the 8 kHz frame rate. This counter is used primarily as a sequencer to the tone generation logic.

Figure 8B:
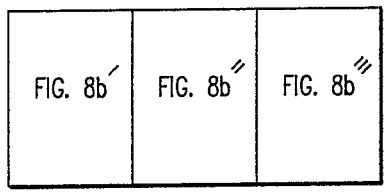
Figure 8B:
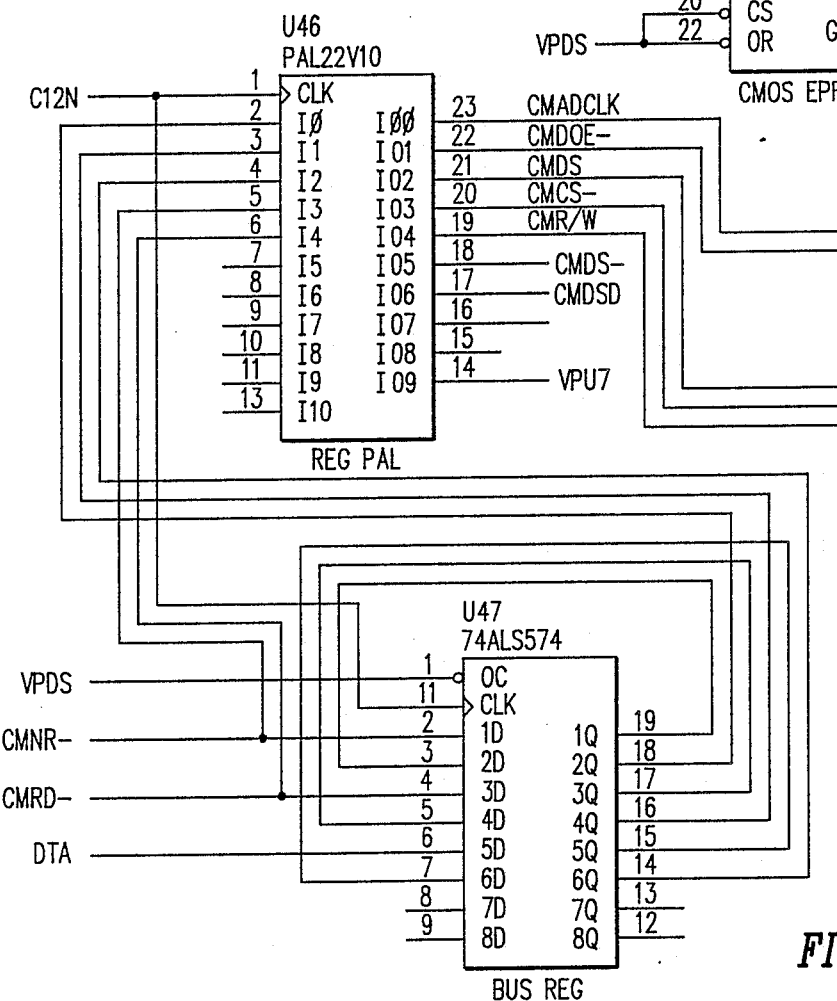
Figure 8B:
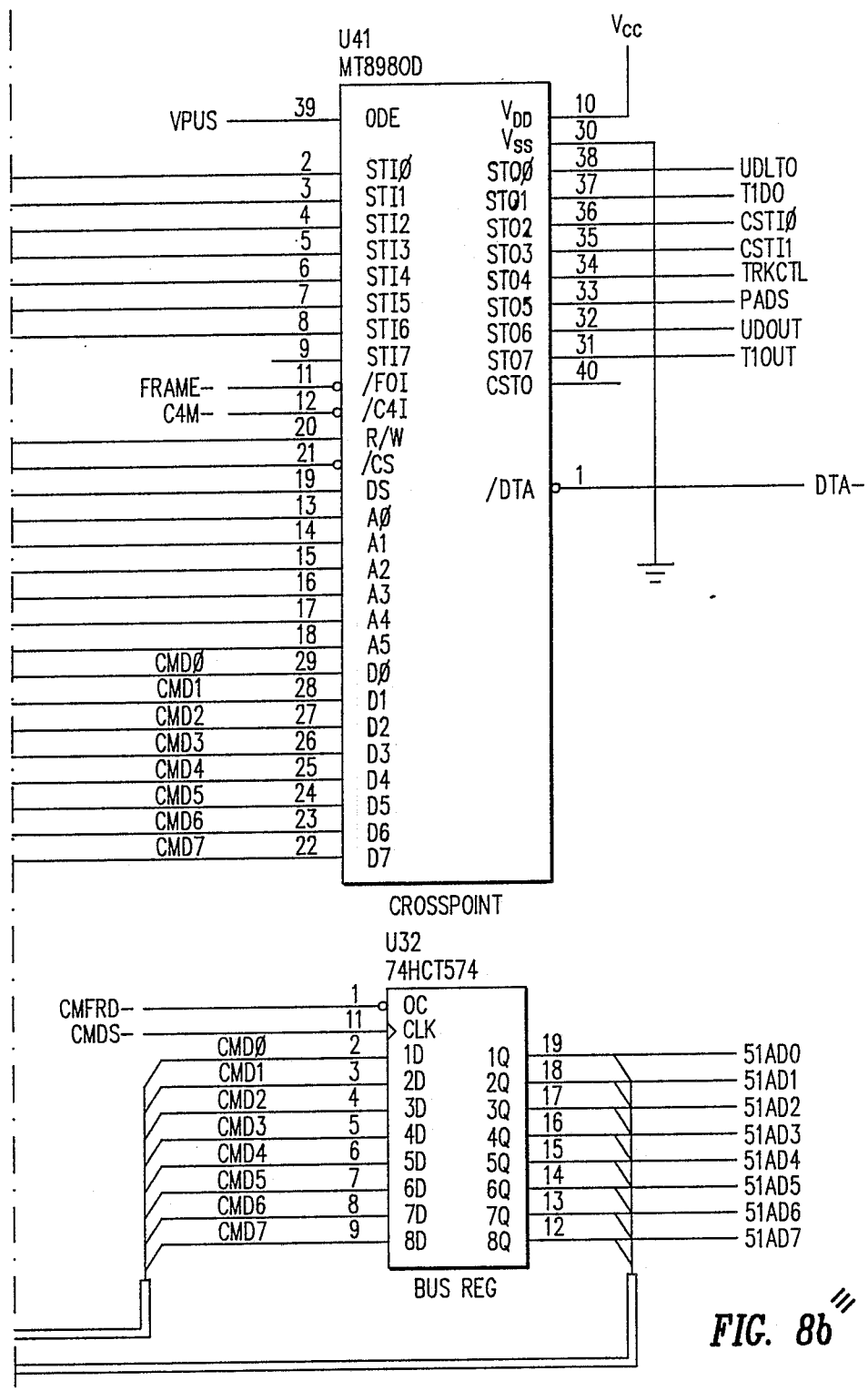

Tone Generator 74 and Crosspoint Switch 76. Switching of PCM (pulse code modulation) (e.g., voice) and access to control and status lines is accomplished via a MITEL MT8980 crosspoint switch. These two blocks 74, 76 are shown in detail schematically together in FIG. 8b. The crosspoint switch 76 has an asynchronous microprocessor interface for control purposes, and provides simultaneous connections for up to 256 65 kbit/s channels. Each of the eight serial inputs and outputs consist of 32 64 kbit/s channels multiplexed to form a 2048 kbit/s serial stream. The microprocessor has the ability to source any output channel from any input channel. In addition the microprocessor can read the data from any input channel as well as source an immediate (static) pattern to any output channel in lieu of a connection. The serial input and output streams to the crosspoint have the following functions:

INPUT STREAM 0 : Tone Stream. Each channel of this input stream contains a unique, solid tone such as dial tone, busy, etc.

INPUT STREAM 1 : Teleset PCM. Channels contain voice PCM from the telesets.

INPUT STREAM 2 : T1 PCM. Channels contain voice PCM from the T-1 span.

INPUT STREAM 3 : T1 PAD. Channels contain PCM from the T-1 span that have received attenuation.

INPUT STREAM 4 : Teleset PAD. Channels contain PCM from the telesets that have received attenuation.

INPUT STREAM 5 : Teleset Status. Contains status information on a channel by channel basis from the trunk boards. Status bits include the valid data indication and hook request status.

INPUT STREAM 6 : T-1 Status. Channels contain status information from the T-1 framing chip, the MITEL MT8976.

OUTPUT STREAM 0 : Teleset PCM. Channels contain voice PCM destined for the telesets.

OUTPUT STREAM 1 : T-1 PCM. Channels contain voice PCM for the T-1 span.

OUTPUT STREAM 2,3 : T-1 Control. Channels contain control information for the T-1 framing chip.

OUTPUT STREAM 4 : Teleset Control. Channels contain control information for the teleset ports. Control bits include loopback for the UDLT, power enable for the hybrid, and inputs for the UDLT signalling channels.

OUTPUT STREAM 5 : PADS. This stream contains the attenuation values on a channel by channel basis for streams 5 and 6.

OUTPUT STREAM 6 : Teleset to PAD. This stream contains voice data from the telesets that is to be subject to PAD. The data having been subject to PAD will arrive back at the crosspoint in input stream 4.

OUTPUT STREAM 7 : T-1 to PAD. This stream contains T-1 voice data that is to be subject to PAD. The data having been subject to PAD will arrive back at the crosspoint in input stream 3.

Tones are generated in tone generator 74 using an 8K x 8 EPROM. Each Tone is stored as 512 digital samples and there is room in the EPROM for up to 16 unique tones. Each frame a unique sample for each tone is serialized and output during a static channel time. This serial stream becomes input stream 0 to the crosspoint switch. Tones may be accessed by making a cross connection between this input stream and any of the output streams.

Figure 8C:
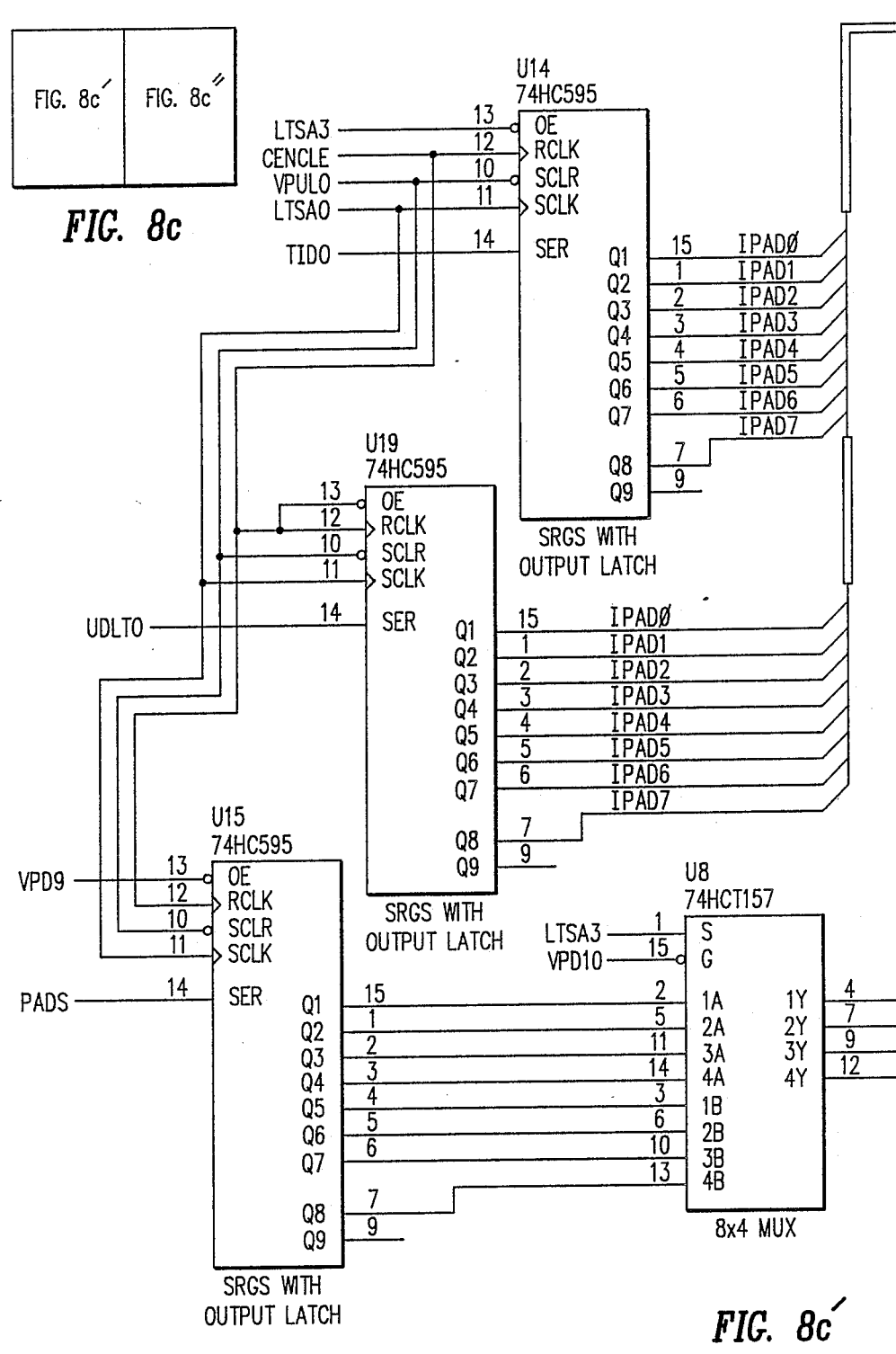

PAD Logic 78. The function of PAD logic 78 (shown schematically in detail in FIG. 8c) is to supply programmable digital attenuation on a channel by channel 38 basis. Attenuation values between 0 (no attenuation) and 15 db are possible. Input to the PAD logic is three input output streams from the crosspoint switch. Data to be attenuated arrives in 2 serial streams T1DO and UDLTO. The attenuated versions of these streams are T1PADD and UDPADD which are then routed back into the crosspoint switch. The stream PADS contains the pad values for the two input streams.

T1 Interface 80. Interface to the T-1 span is implemented with this logic circuitry 80 (shown schematically in detail in FIG. 8d). The T-1 framing function is done by the MITEL MT8976. Features of this chip include D3/D4 or ESF framing, insertion and detection of A, B, C, D bits, 2 frame elastic buffer to name a few. Control of this chip occurs via the two input serial streams, CSTI0 and CSTI1. These streams are output from the crosspoint switch and are controlled by the microprocessor.

The actual physical interface to the T-1 span is accomplished using the Crystal Semiconductor CS61574. Functions provided by this chip include a line driver, data and clock recovery and jitter attenuation. This chip was designed to meet all applicable interconnect specifications. The double pole, double throw relay terminates the T-1 span to this interface when bypass is enabled, otherwise the bypass unit connects the span to the ACD.

Microprocessor 82. This block 82 (shown schematically in FIG. 8c) includes the microcontroller. The microcontroller is an INTEL 8031 (CMOS) running at 12 MHz. It has an 8 bit data bus and a 15 bit address bus. Program memory is stored in EPROM and is jumper selectable to be either 32K x 8 or 64K x 8 depending on the size of the program. Static ram is 32K x 8 and is battery backed up for a minimum of 5 years. This feature enables the unit to retain its configuration data base in the event that power is removed. Internal features of the microcontroller that are utilized include the timers and a UART for the serial interface. RS232 levels for the serial interface are achieved using a ±5V single supply transmitter/receiver that uses charge pump technology.

The microcontroller also has read/write control of 8 bits, the PORT1 bits. These bits are labeled P1.0→P1.7 and have the following functions.

P1.0 : Input : BYP- : Request to the processor for bypass operation when active.

P1.1 : Input : INBYP : Conditioned bypass signal. It is active when BYP- is active except if overridden by the front panel switch.

P1.2 Output : SPANOK : An output that indicates the T-1 span is operational. When active an LED is lit.

P1.6 : Output : POK- : This signal is activated when the processor has completed self test diagnostics and initialization. Until this signal becomes active bypass operation on the trunk boards is disabled.

P1.7 : Output : PINBYP- : This signal is active when BYP- is active and indicates that the processor recognizes that bypass operation is requested.

Figure 8E:
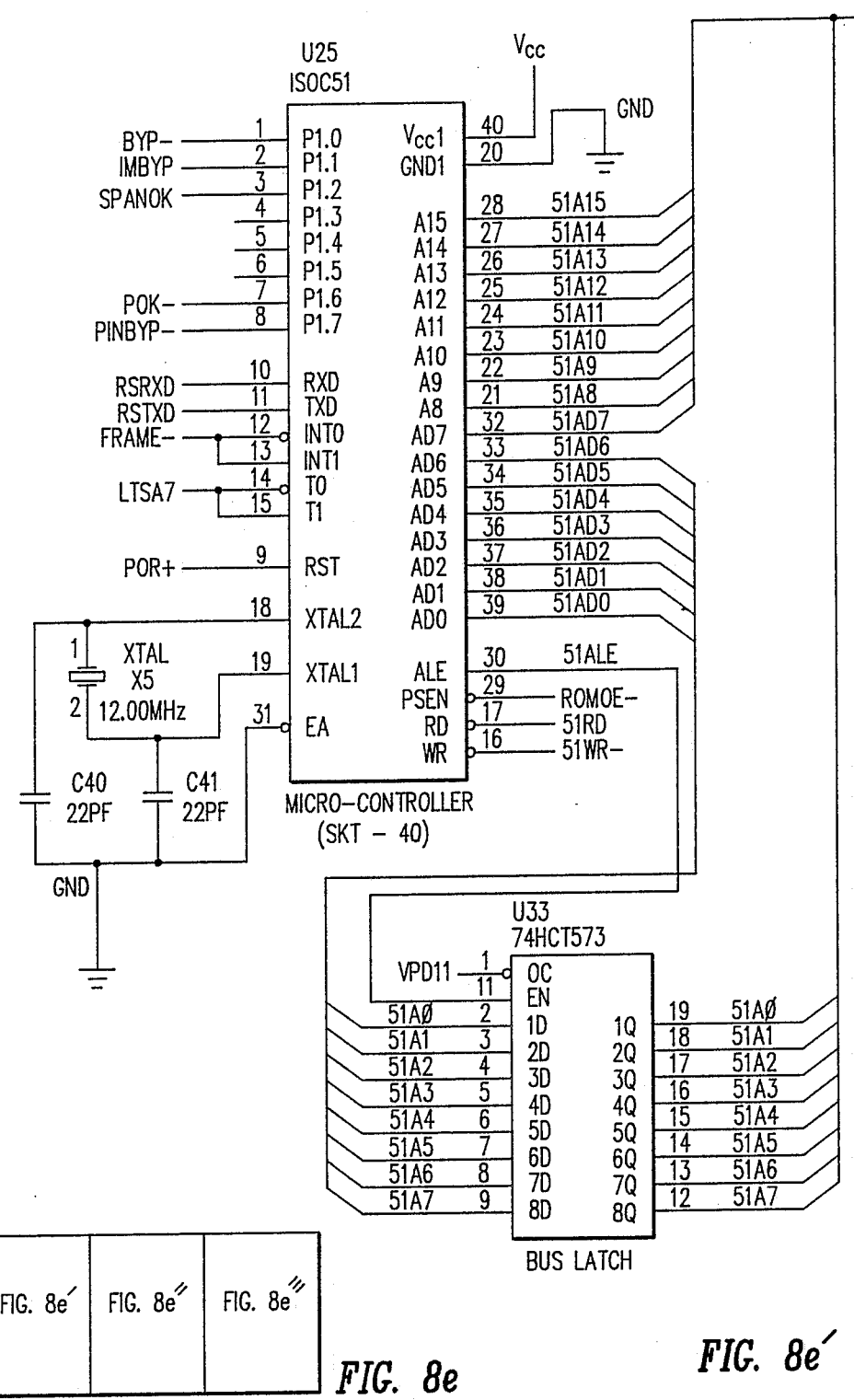
Figure 8E:
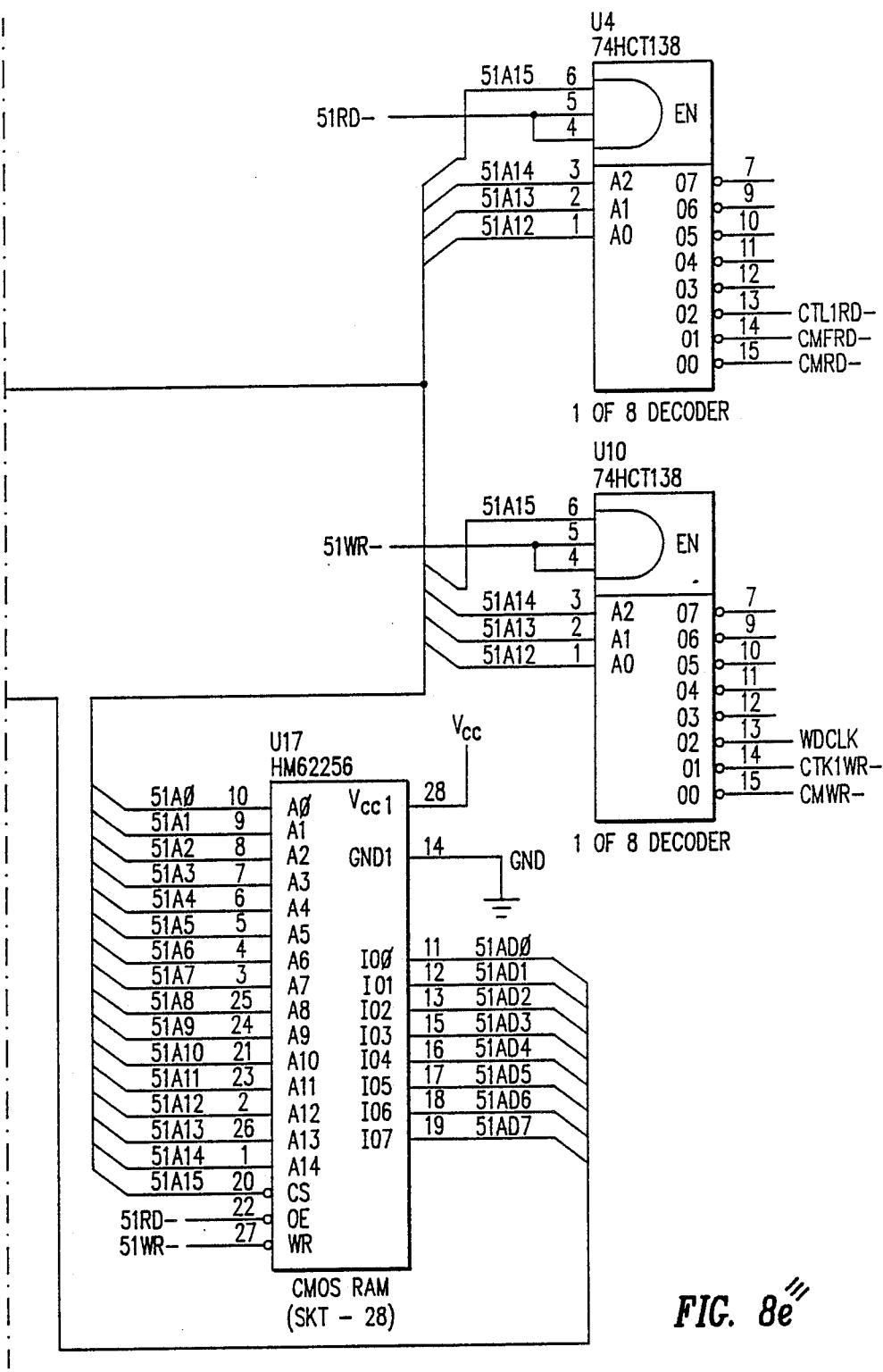

Power Supply and Fault Detection 84. Voltages needed to operate the TIBU include +5V, -15V, and 48V DC. (This block 84 is shown in detail schematically in FIGS. 8g and 8h) The 48V input is supplied by an external power supply or the battery backup system. The other voltages are generated by two DC-DC converters. Both these units are rated at 15 Watts. This signal VFAULT- is used to indicate that there is a problem with the outputs of the DC-DC converters. This signal will not activate unless the outputs of these supplies exceeds the rated voltage by more than ±10%. If the fault signal is active, bypass operation is effectively disabled because the relays will not operate and the microprocessor is held in the reset state.

The signals NBYPSEC, NBYPPRI are inputs from the primary and secondary (if the system is redundant) system controllers. If either signal is active then the bypass request signal BYP- to the processor will stay inactive. A bypass request will be in effect only if both these signals are inactive or disconnected.

Each T-1 Bypass Trunk Board shown in block diagram form in FIG. 7 can bypass up to 12 digital telesets in conjunction with a T-1 Bypass Control Board (see FIG. 6). The physical interface 86 between the Control Board (FIG. 6) and Trunk Board (FIG. 7) is at the interface of the circuitry shown schematically in FIG. 8i (the Control Board side) and FIG. 8o (the Trunk Board side).

Clock Generation and Timing 88. This circuitry 88 (shown in detail schematically in FIG. 8f) generates the derived timing for the T-1 Trunk Board. All timing is referenced to the 4 MHz clock (C4BUS+) and 8 kHz frame signal (FOBUS+) supplied by the Control Board. Signals generated include the following.

C2MA, C2MB—These are 2 MHz clocks and are used as the master clocks for the Motorola UDLT (Universal Data Link Transceiver) chips.

LTSA0-LTSA9—These bits form a 512 statecounter that is synchronized to the frame. This statecounter is used to subdivide the timing during a frame. Each teleset interface has control and data lines that are time divisioned multiplexed and the LTSA bits are used to delineate each port's access interval.

UDLT Signalling 90. The port control signals that are derived from the clocks and LTSA bits are generated via this circuitry 90 (shown in detail schematically in FIG. 8k). Most of the signals are generated at U3 which is a PLD (Programmable Logic Device). Following is a brief description of these signals:

TRAN—Transmit Enable—The transmit enable signal signifies the start of valid control and pcm for this board. This signal is further subdivided TREN1—TREN12 to generate an enable signal for each port. TRENX is the enable for a UDLT to receive and transmit serial pcm data. This is necessary because the pcm data bus is shared by all twelve ports.

SE1-SE12—Signalling Enable (1-12)—This signal controls the input and output of control (signalling channel inputs) and status (signalling channel outputs) for the UDLT chips. It is generated when valid data is present on the bussed control lines SI1B, SI2B, LPBK for that particular port. On the input side it acts as a latch and on the output side as a tristate enable so that all UDLTs may share the same serial status lines.

TRKSTT—The serial status line TRKSTT contains two bits of information per port, valid data status VD and the output of signalling channel 1 SOIB. VD and SOIB are inputs to PAL U3 and TRKSTT is the resultant output. VD and SOIB are valid for a port with its SE(x) bit is active.

UDLT1—Tristate version of INDATA (PCM from teleset to T-1). This signal is tristated because up to two trunk boards may be installed and both use this same line, but at different times during a frame.

Figure 8F:
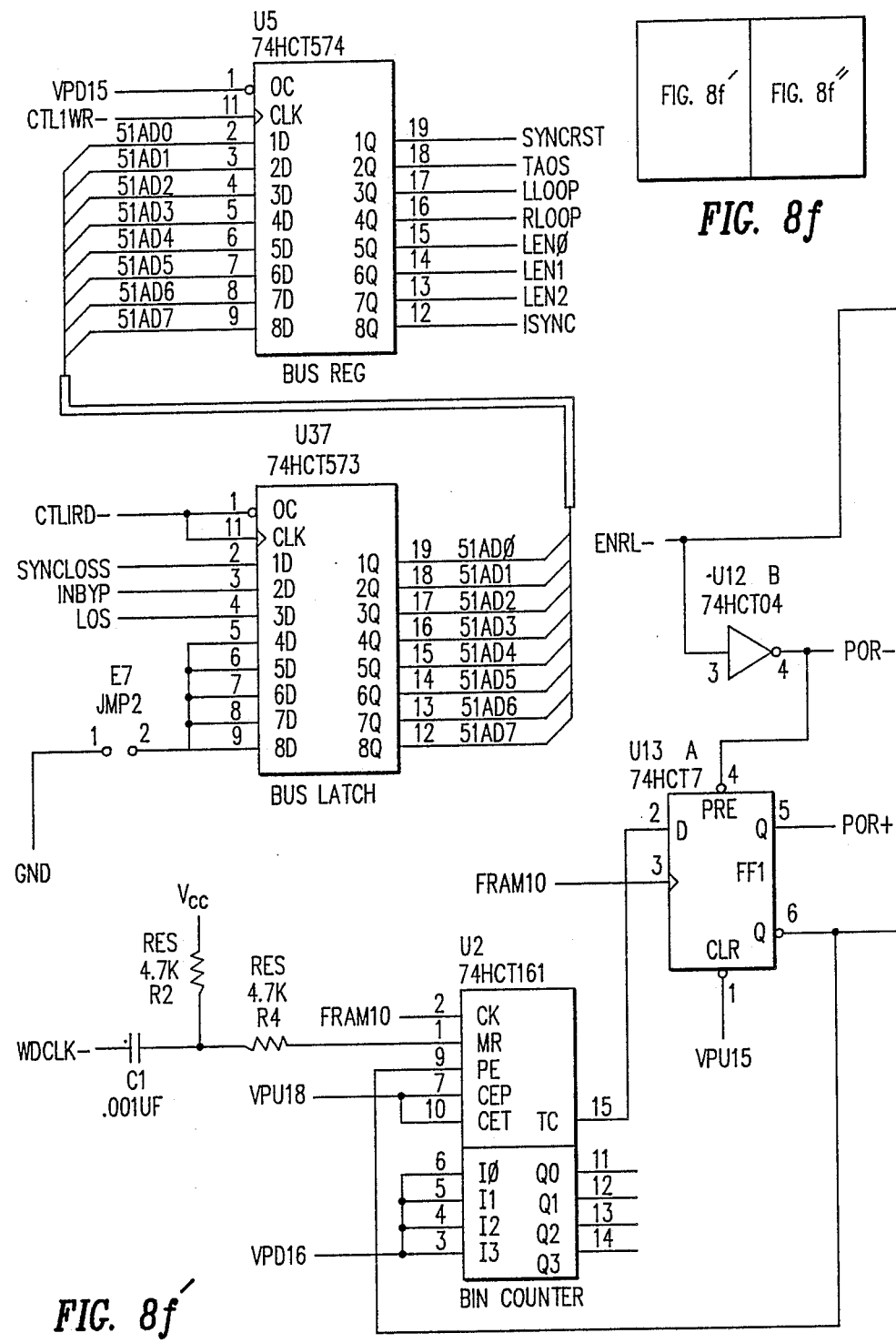
Figure 8G:
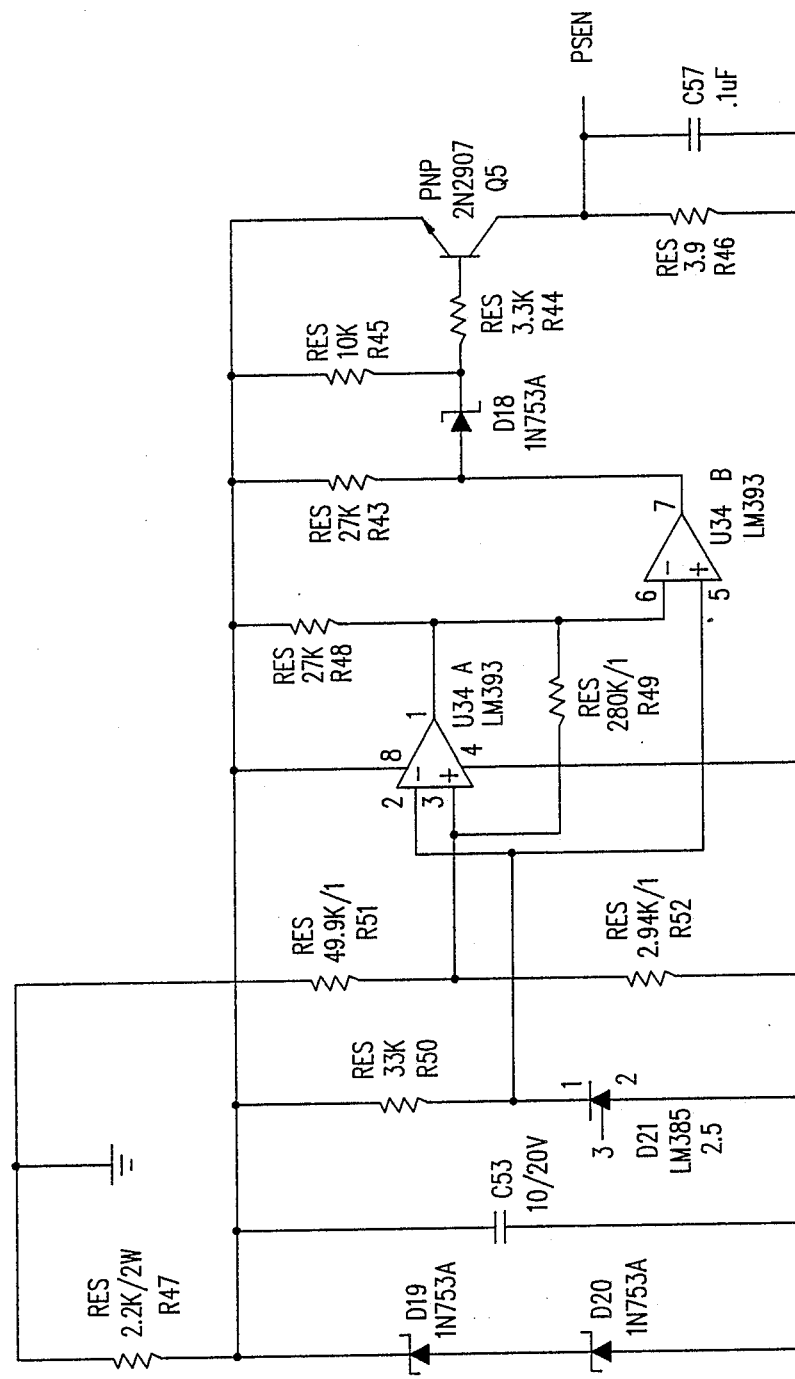
Figure 8H:
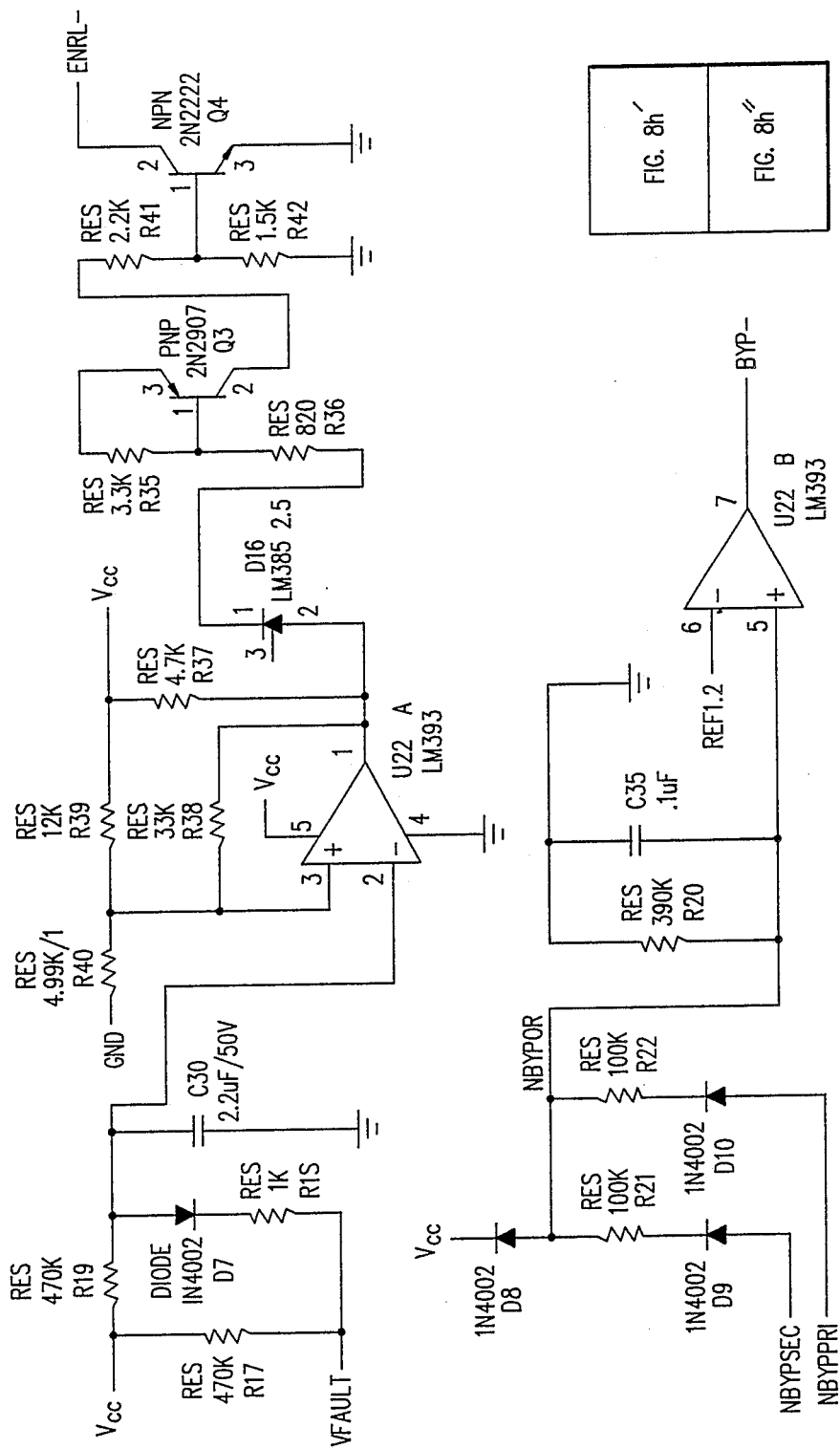
Figure 8I:
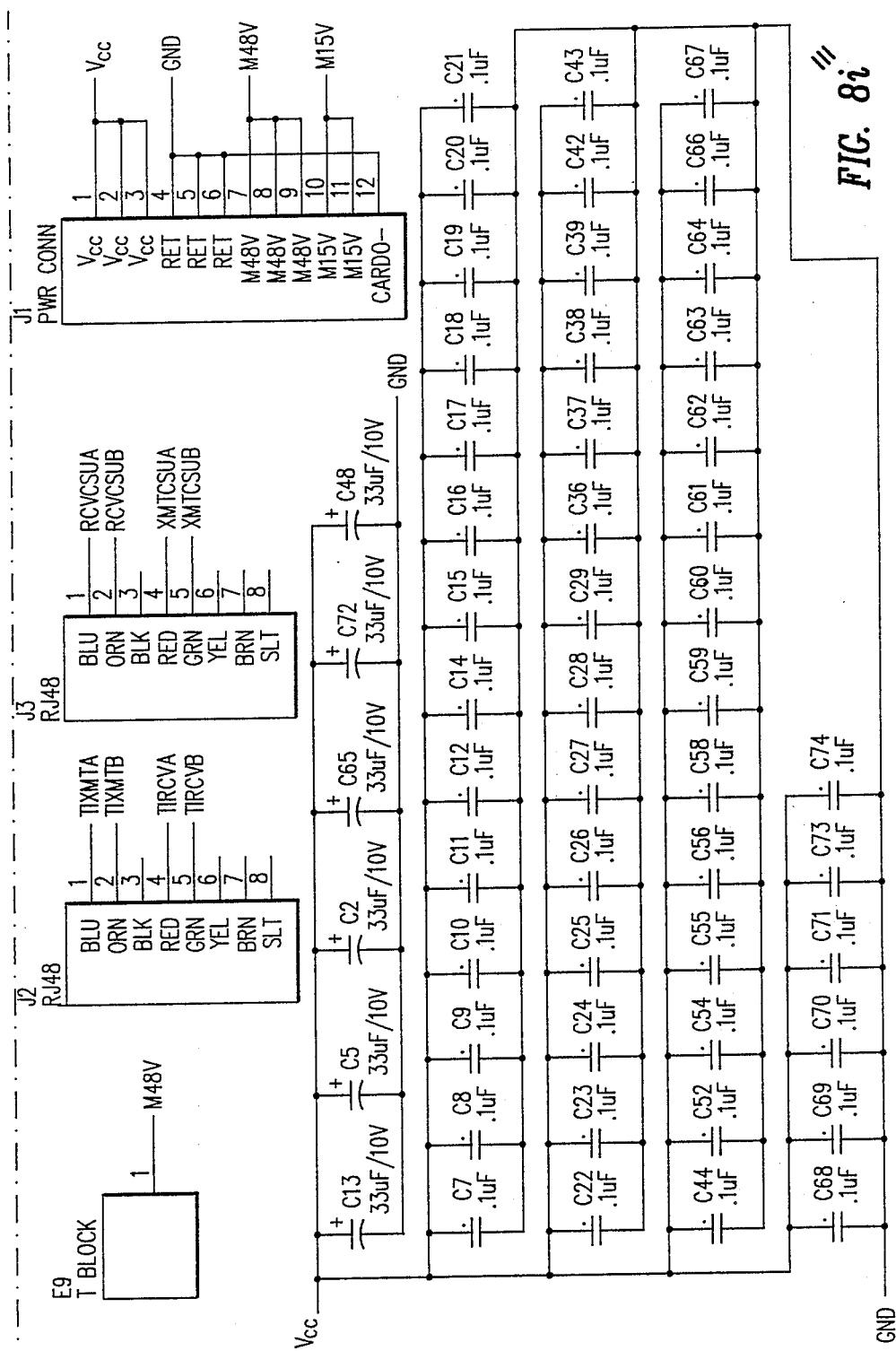
Figure 8J:
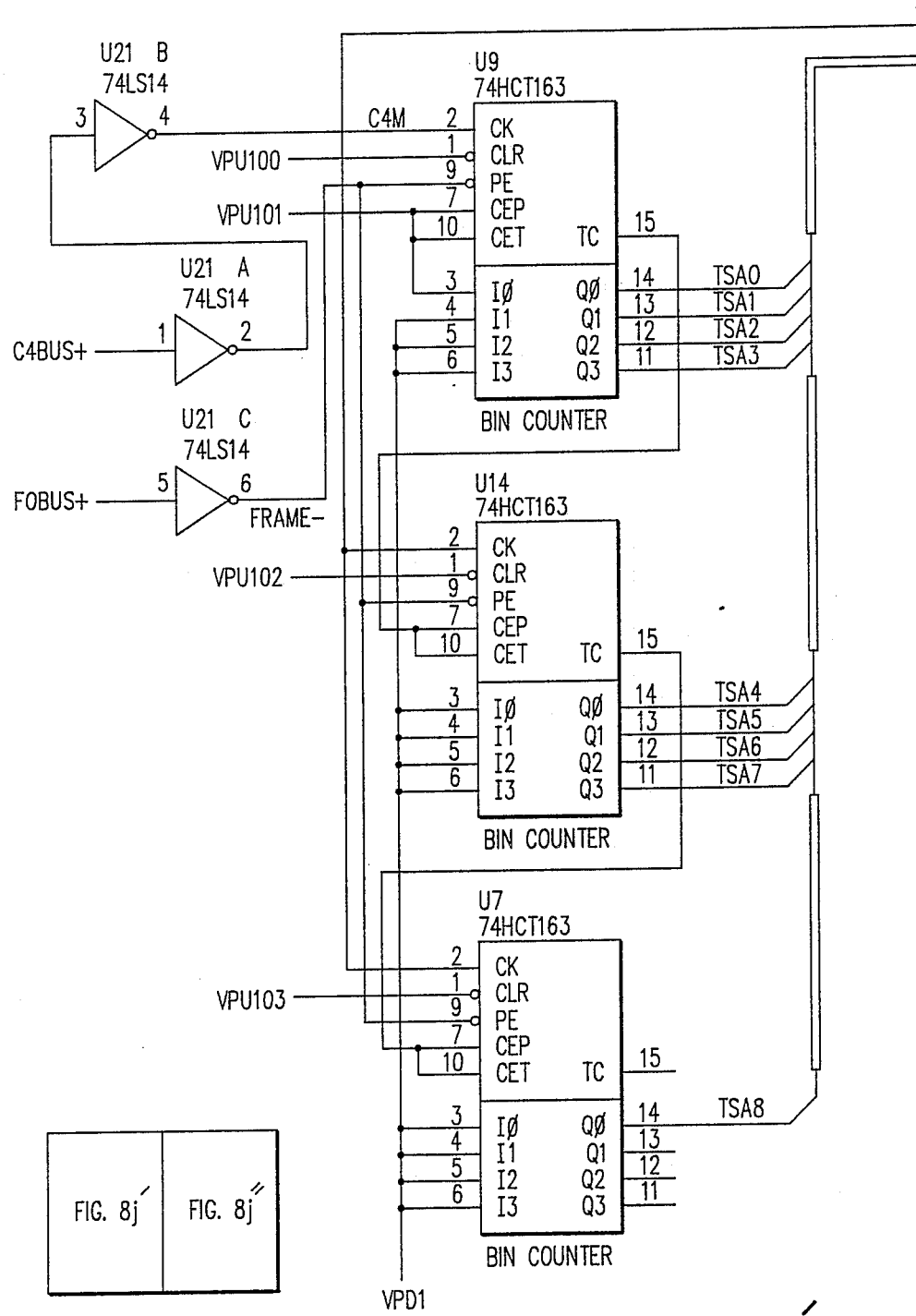
Figure 8K:
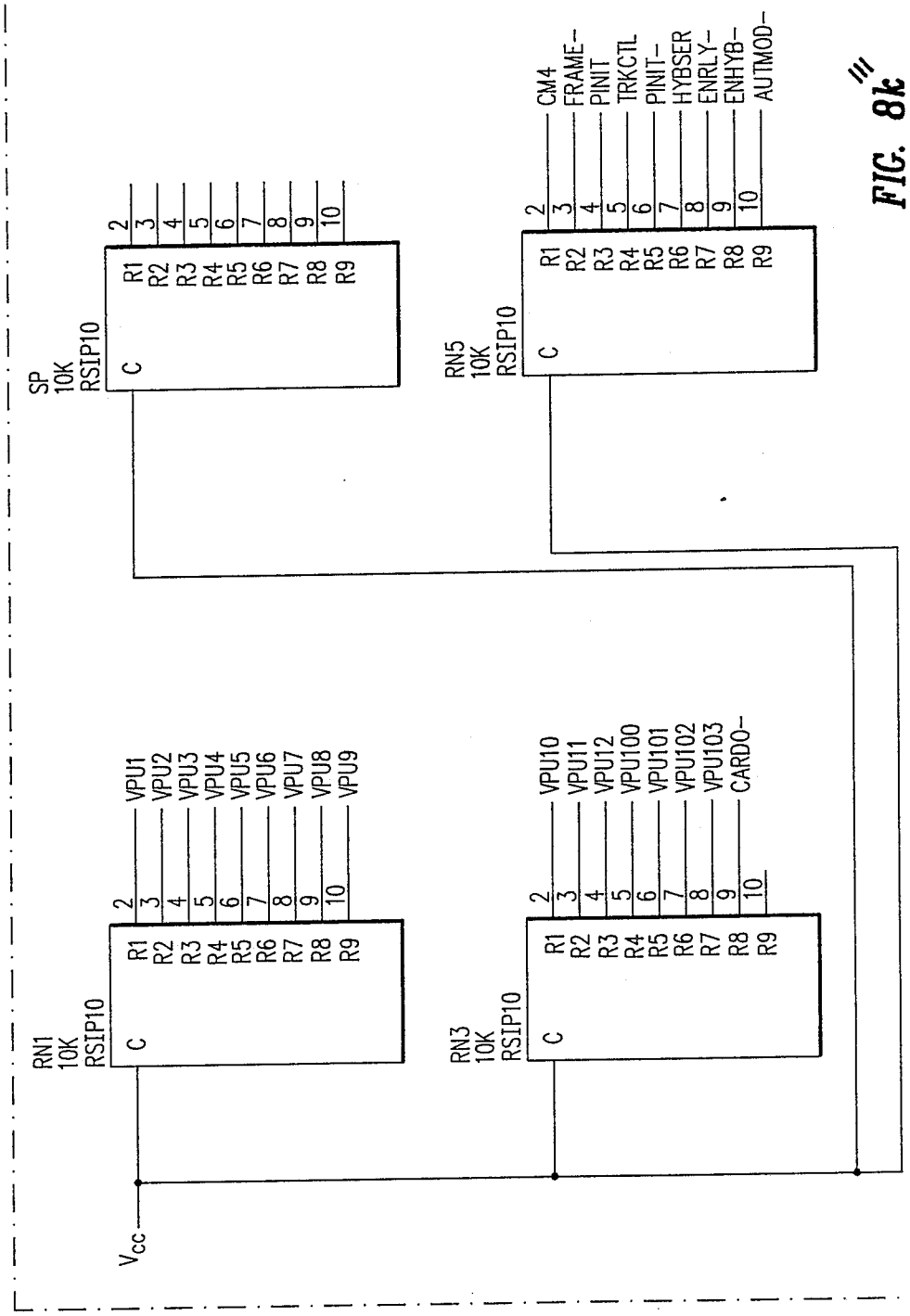
Figure 8L:
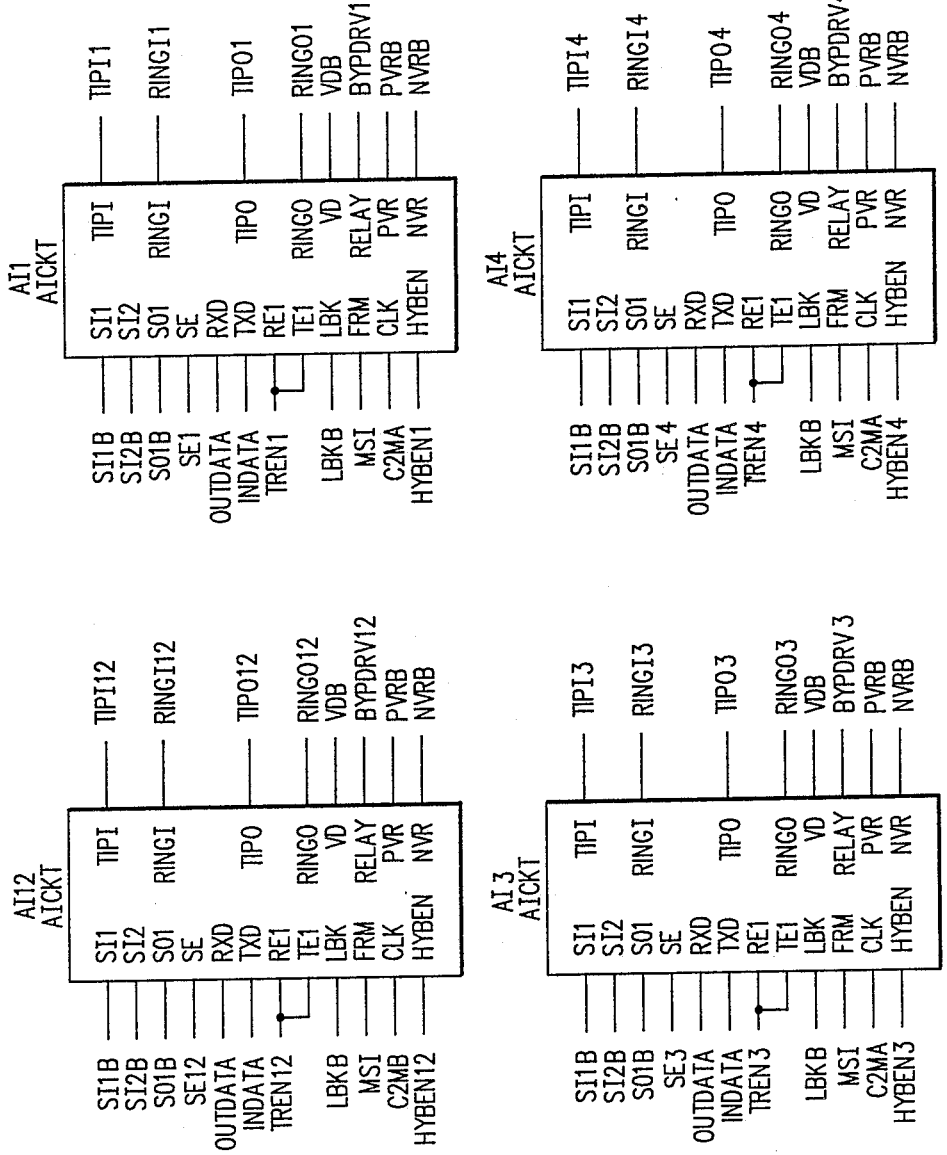
Figure 18:
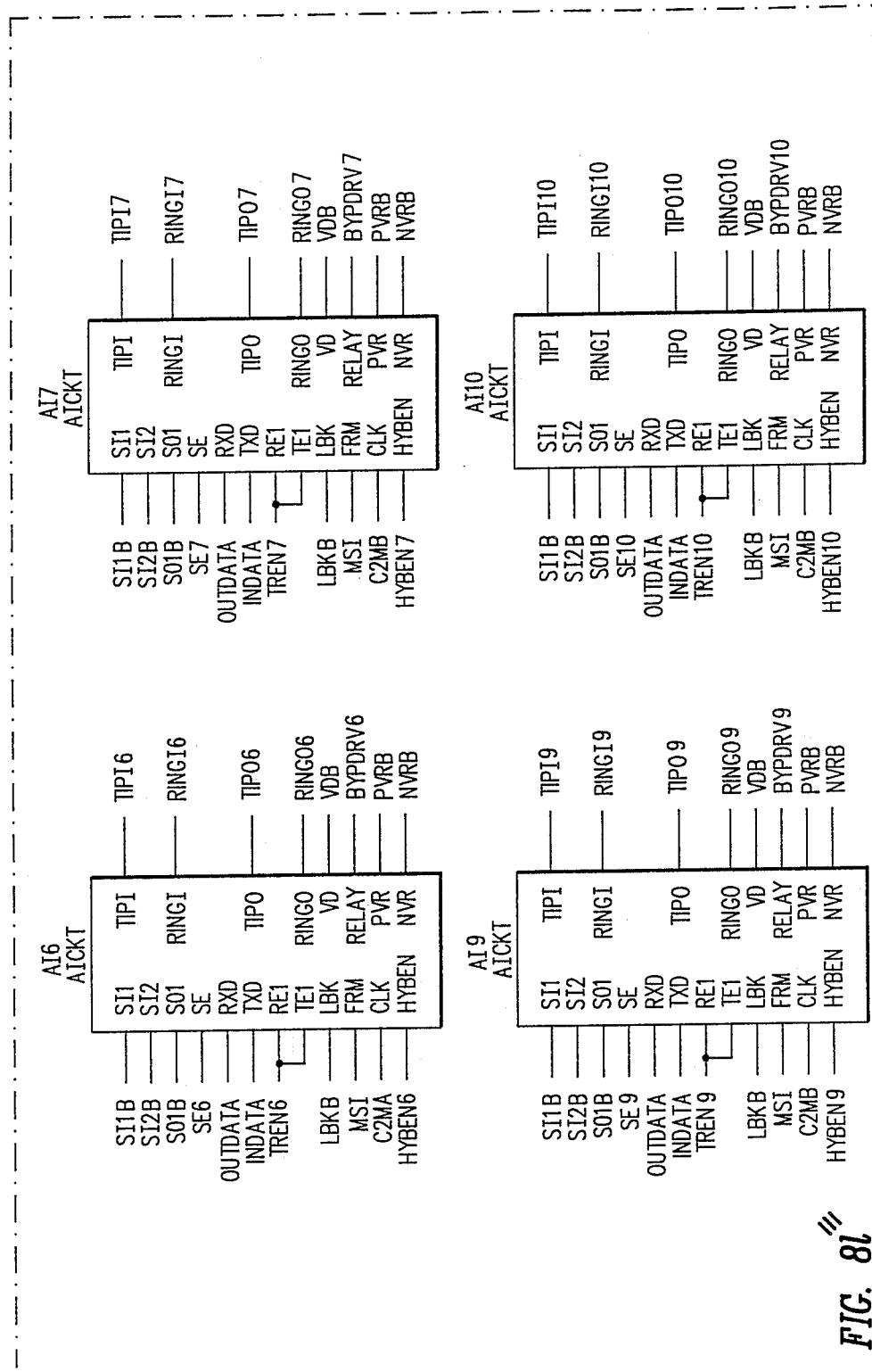
Figure 8M:
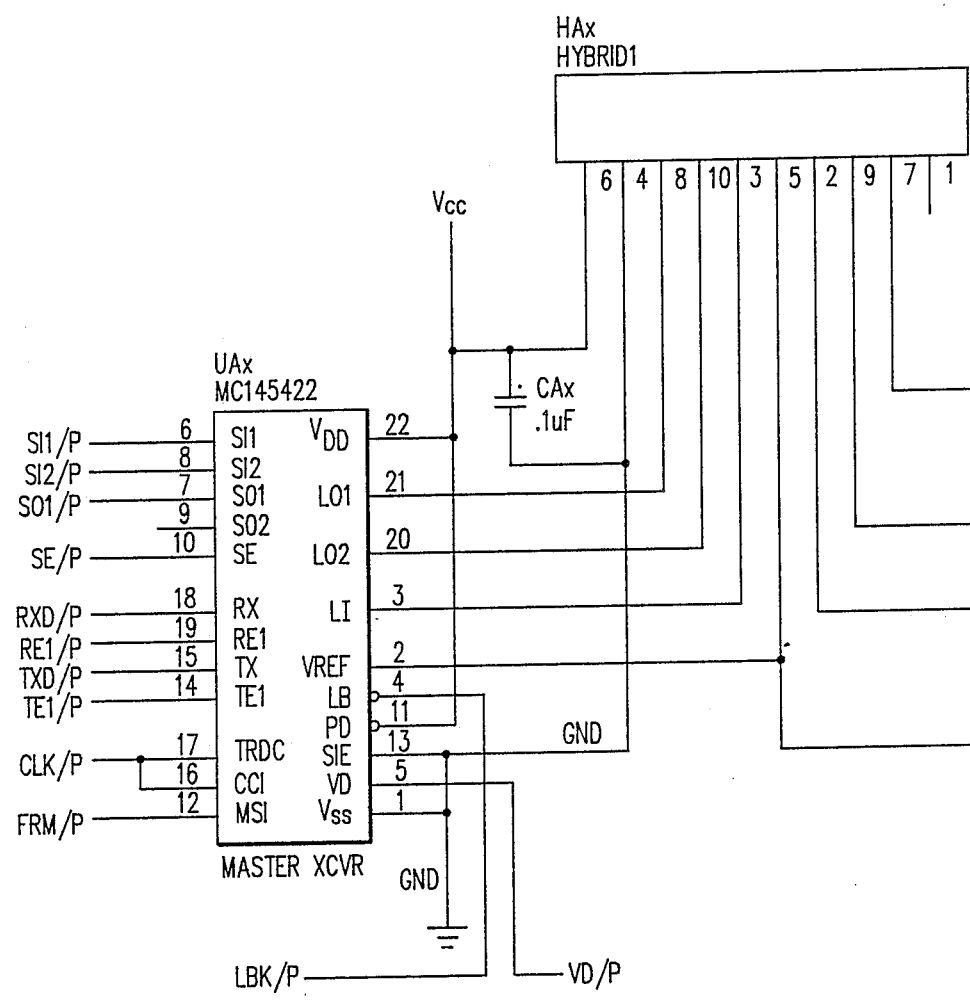
Figure 8M:
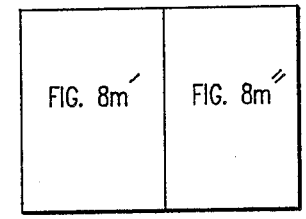
Figure 8M:
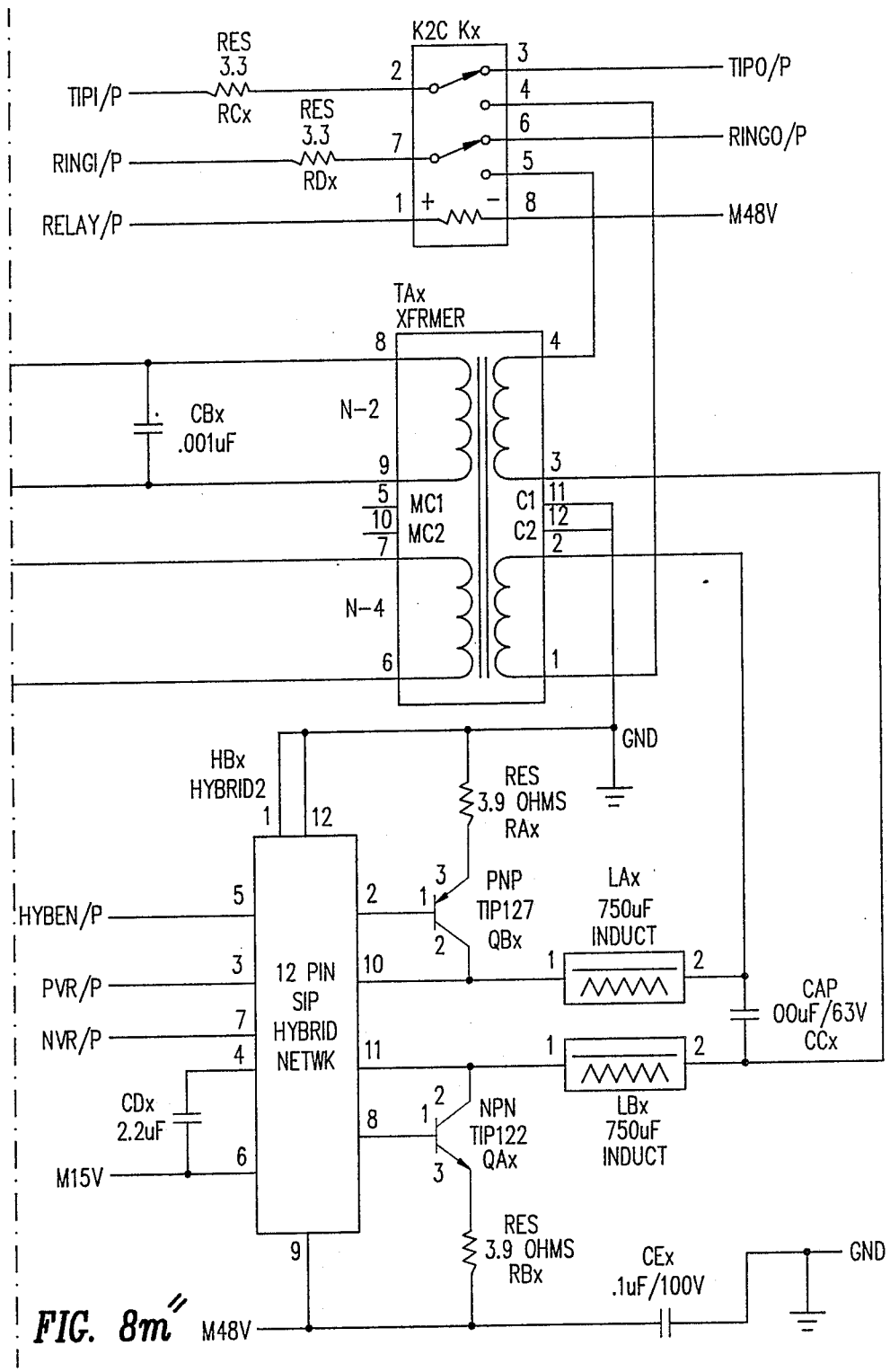

Teleset Interface Digital Line Circuits 92-1, . . .,92-k. This circuitry directly controls the digital link to each teleset. Primary functions of this circuit include power feed and digital transmission and reception of voice (pcm) and control/status to the teleset. This circuit is duplicated 12 times, one for each teleset interface. Duplication of this section is shown in FIG. 8l, where each block (AICKT) represents one instance of the circuitry of FIG. 8m. The signals located inside each block of AICKT are those signals that are global to the rest of the schematic. These signals are shown in FIG. 8m as signals of the same name followed by the suffix /P.

UA(x)—Motorola Master UDLT Digital Transcei chip controls the digital interface to the teleset. It utilizes a ping-pong transmission scheme operating at an 8 kHz frame rate. This chip supports a full duplex 65 Kbit/sec link (pcm - voice) as well as two 8 Kbit/sec full duplex signalling channels. The signalling channels are used to convey control and receive status information from the teleset.

K(x)—Relay—This relay either directs the teleset interface to the ACD (when powered off or not in bypass) terminates the teleset at the T-1 Bypass Unit (bypass activated).

TA(x)—Transformer—Used to couple the digital signals to the teleset and supply battery (power feed) to the teleset HA(x)—Custom Hybrid—Used to terminate the digital line to the correct impedance.

HB(x)—Custom Hybrid—This hybrid controls the power feed to the teleset. Power turned on and off to the teleset via the signal HYBEN, hybrid enable. In addition, this chip can detect over current conditions on the line, i.e. a short circuit and will automatically disable power feed for 10 seconds After this time it will reenable itself and attempt to supply power again.

Figure 8N:
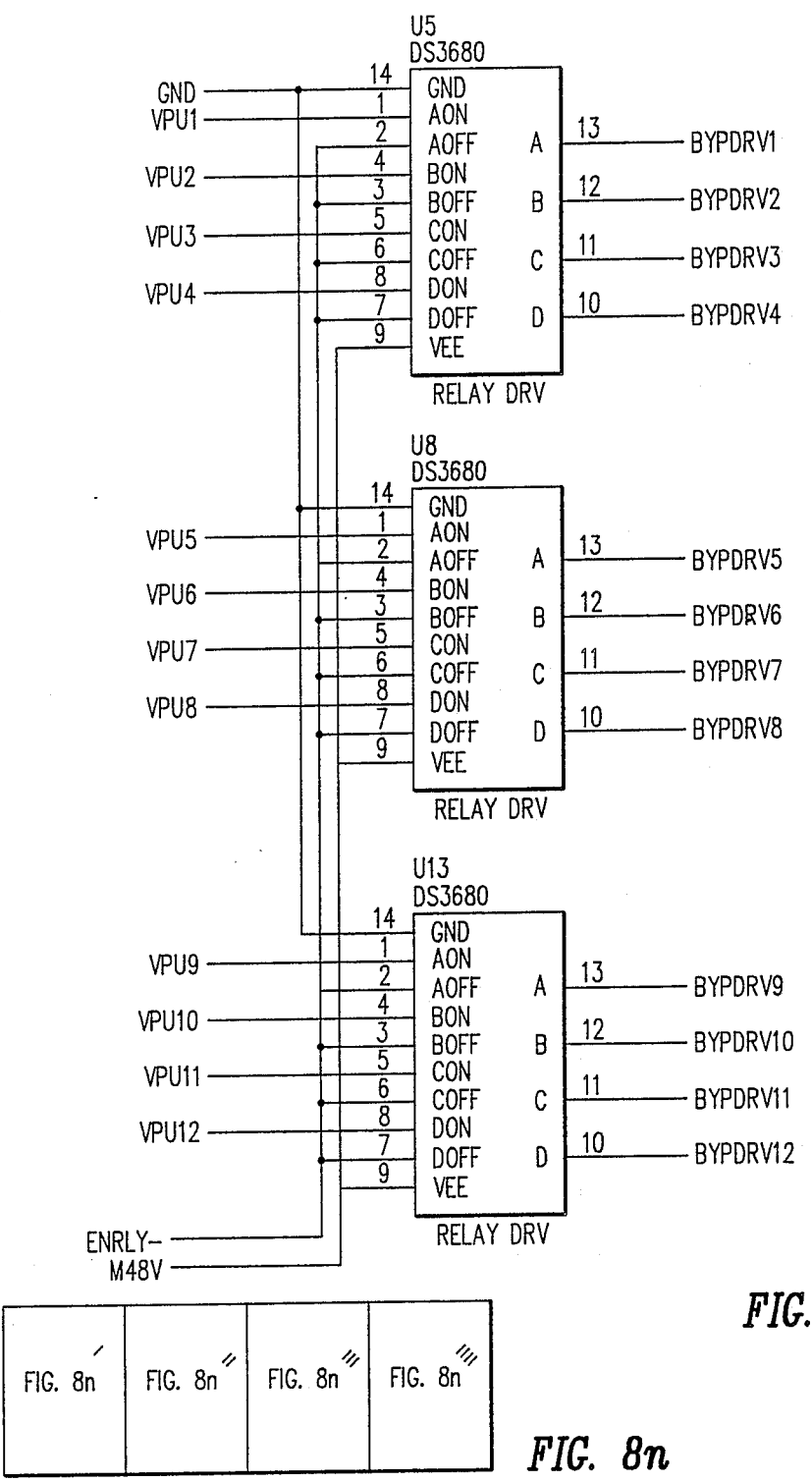
Figure 8N:
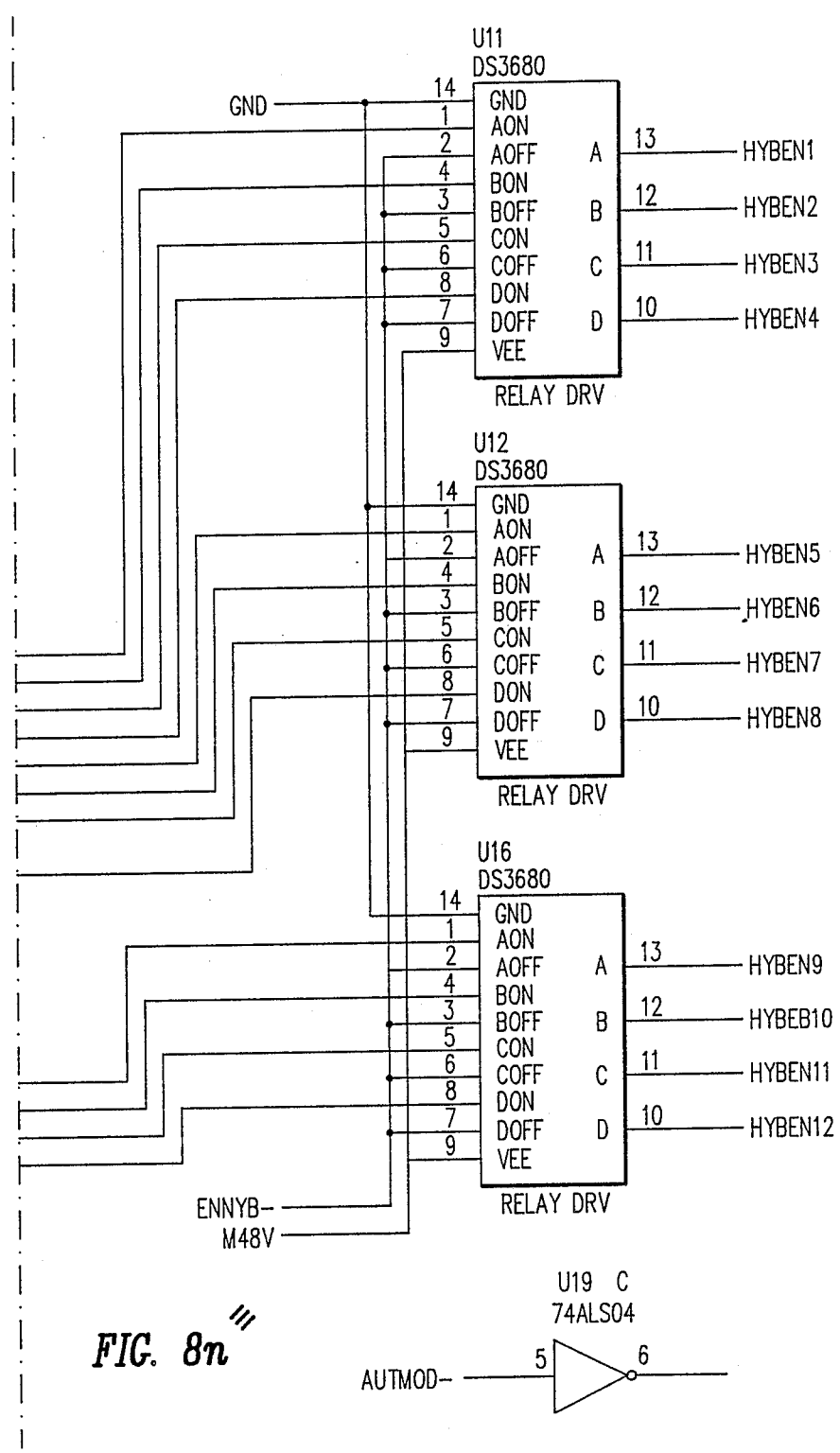
Figure 8N:
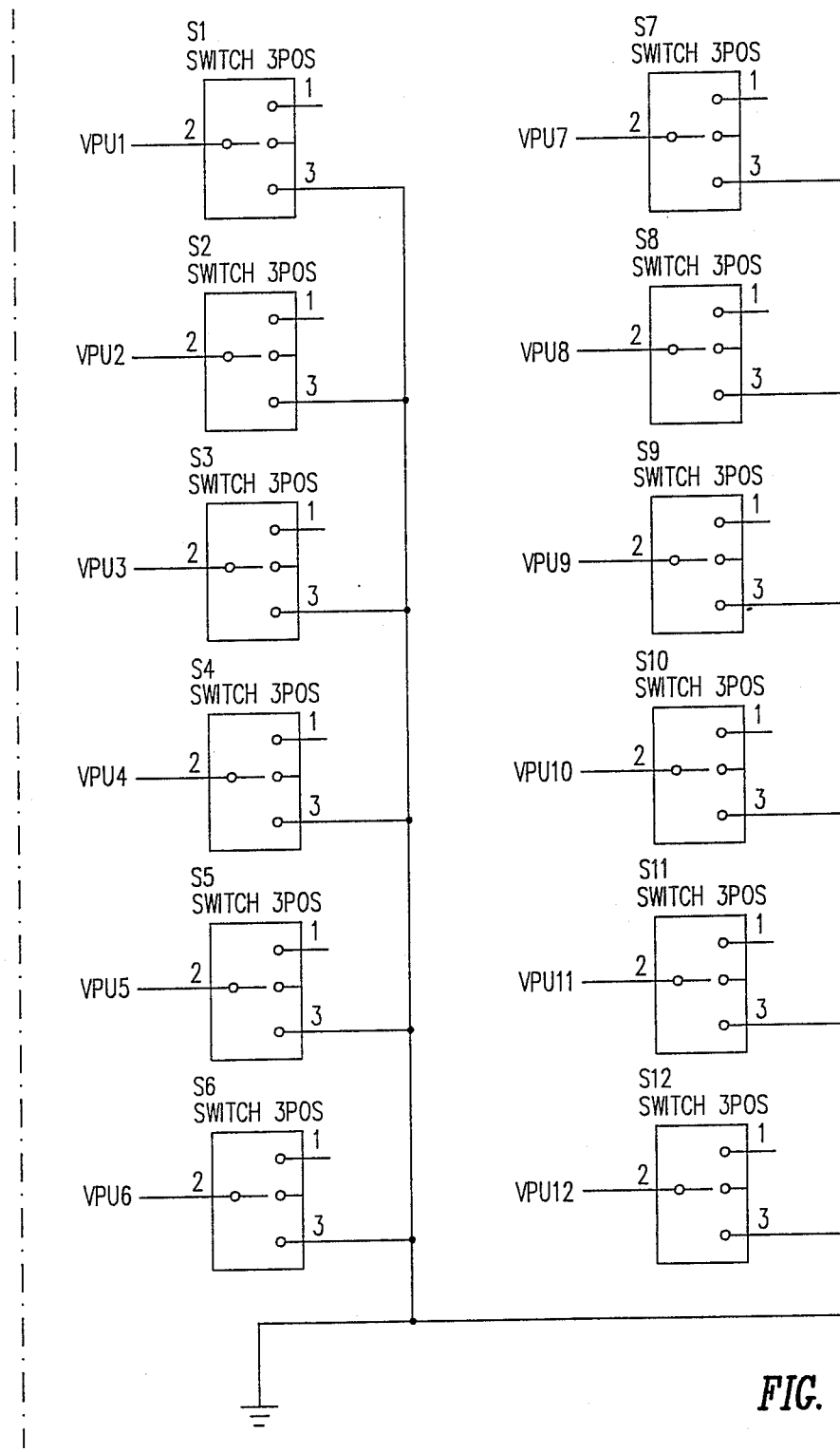

Control Demultiplexer/Status Multiplexer 94. This interface logic circuitry 94 (shown in detail schematically in FIG. 8n) takes the serial stream of control signals generated on the control board and distributes them to each of the line circuits. There are four control signals for each port. These signals can be located at the output of the shift register U20.

LBKB—Loopback—This is a loopback signal for the Motorola UDLT chip. It causes the UDLT to loopback the 64 Kbit pcm channel. This is used for diagnostic purposes. In addition, turning loopback on will cause the teleset to reset.

SI1—Signalling Channel 1—This is the input to the first of the 8 Kbit signalling channels. The state of this signal determines if the teleset is in ring mode.

SI2—Signalling Channel 2—This is the input to the second of the 8 Kbit signalling channels. The state of this bit determines if the teleset is in bypass.

HYBSER—Hybrid Enable—This signal is used to control the hybrid enable function of the HB(x) allowing the control board to selectively power on or off any of the telesets.

U5,U8,U13—Relay Drivers—These chips are used to supply the current that turns on the bypass relays. The relays are activated only if the control board asserts the signal ENBRLY- (FIG. 8f). Individual telesets may still be taken out of bypass by activating any of the relays S1 to S12.

Interface 86. This block of the Trunk Board (shown in detail schematically in FIG. 8o) includes the physical interface between the Trunk Board (FIG. 7) and the Control Board (FIG. 6). Connector J1 (FIG. 8o) is the power connector. Voltages necessary to operate the Trunk Board are distributed via this connector. These voltages are +5V, -15V and -48V. The signal CARD0- also terminates on this connector. This signal is used to indicate to the Trunk Board whether it controls ports 1-12 or ports 13-24. This is necessary because up to two Trunk boards can be controlled via a single Control board. If the signal is low ports 1-12 are active, if open or high ports 13-24 are active.

Connector J3 distributes the digital control signals between the Control and Trunk Boards. These are the signals of primary interest:

C4BUS+: 4 MHz Clock—Master clock signal. All other timing is derived from this clock.

FOBUS+: Frame Signal—This signal is used to indicate the start of each 8 kHz frame.

OUTDATA- : PCM—65 Kbit pcm, 8 bits per channel per frame from telesets to T-1 span.

TRKCTL- : Trunk Control—Serial control line that conveys control information to each of the 12 ports. Refer to section 8n.

TRKSTT : Trunk Status—Serial status information from each of the 12 ports. There are two bits of status information for each port. One bit is the valid data indication from the UDLT. This indicates if a teleset is present and is transmitting properly. The other bit represents the state of the first UDLT control line from the teleset. On and off hook requests are conveyed from the teleset via this signal.

The Microfiche Appendix shows a computer program in the C language and the Intel 8031 assembly language. This computer program is installed in read only memory (an EPROM) as shown in FIG. 8e associated with the bypass unit microcontroller, which is preferably an Intel 80C31 8 bit microcontroller.

The following describes the computer program shown in the microfiche appendix, for implementing bypass in accordance with the invention.

1. Main Tasks

Figure 9:
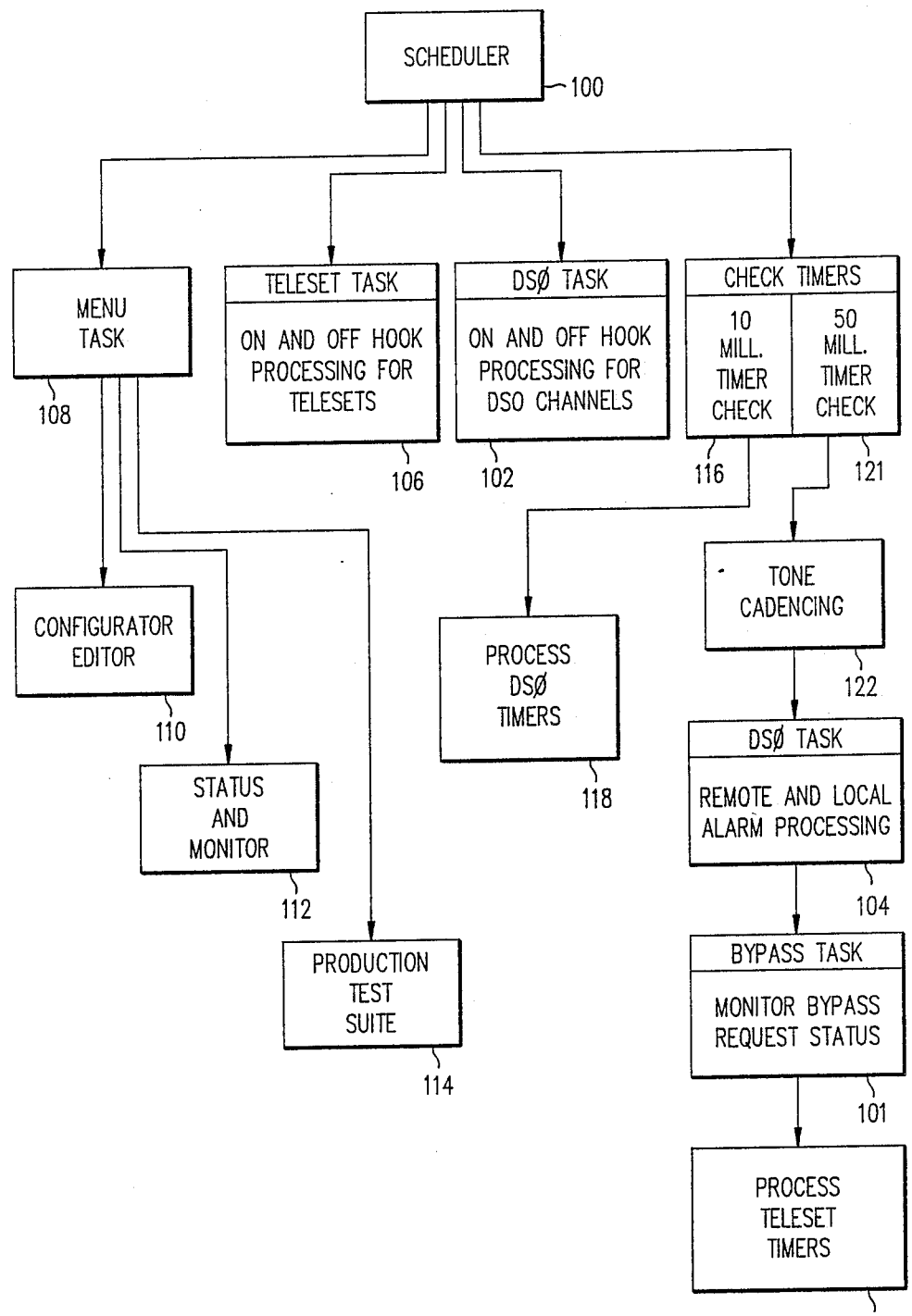
FIG. 9 shows a flow diagram of a computer program in accordance with the invention.

The following describes (with reference to FIG. 9) the functionality of the main software tasks used to control the T1 Bypass Unit. Scheduling of the tasks occurs in the main processing loop by the Scheduler 100.

1.1 Bypass Task
MODULE=byptask.c

The bypass task 101 is responsible for monitoring the state of the external bypass request signal from the system. A signal called PINBYP- is set to reflect the state of the external bypass request. This signal is then possibly modified by the front panel switch which has the ability to override the bypass state. The resulting signal INBYP is read by the processor and ultimately determines if bypass operation is in effect or not. If bypass is disabled, all hardware connections (T1 span and telesets) terminate at the ACD. When bypass is enabled, the T1 span terminates on the T1 Bypass Control Board and the teleset connections terminate on a T1 Bypass Trunk Board. Scheduling of this task 101 occurs at a 50 millisecond rate (controlled by check timers task 121) and runs to completion. 4

1.2 DS1 Task
MODULE=dsltask.c

DS1 task 104 performs the monitoring and alarm functions for the physical layer of the T1 interface. Monitoring functions include detecting loss of T1 framing, bipolar violations, and slips. In the event of loss of framing (i.e., synch loss) DS1 task 104 will start a 2 second timer. If the synch loss event is present for a full two seconds then the DS1 task 104 will enter the RED ALARM state and send a YELLOW alarm to the far end. A yellow alarm is a specific bit pattern on the T1 span that indicates to the far end that synchronization has been lost. Upon entering the red alarm state any calls that were active will be broken down. The span is out of service at this point and no outgoing calls will be allowed. Service is restored when the T1 span achieves 10 consecutive seconds of frame synchronization. If a yellow alarm is received this indicates that the far end has lost synchronization. This will also cause any active calls to be broken down and the span to be declared out of service until cessation of the alarm condition. This task is scheduled at a 50 millisecond rate and runs to completion.

1.3 DSO Task—Teleset Task

The DSO task 102 and Teleset task 106 are the state machines that drive the inbound and outbound call processing functions. These tasks are loosely coupled and in general operate independently of each other. The coupling occurs when an outgoing call request must be completed or an incoming call request must be answered.

1.3.1 DSO Task
MODULE=dsotask.c

DSO Task 102 is the state machine that handles the individual DSO channels of the T1 span. There are 24 of these DSO channels on a T1 span. The DSO channels also are referred to as trunks. Depending on how the services are provided, each trunk may have different signalling characteristics as well as restricted modes of operation. Some trunks may allow only incoming calls while others allow only outgoing calls and others may allow two way call establishment. In addition not all trunks may be provisioned, meaning that only a portion of the 24 may be active.

Information relating to trunk configuration is created and maintained by the menu task 108 will be described in detail below. Each trunk has its own control block containing information such as the state of the trunk as well as configuration information. The configuration information is loaded at powerup and any time changes are made via the menu task.

Signalling between the near and far end on a given trunk is accomplished via robbed bit signalling. Robbed bit signalling overwrites voice data (low order bit of each channel) during frames six and twelve. The bits that are inserted are referred to as the A,B signalling bits. DSO task 102 can set these bits for each trunk and read the state of these bits from the far end. Requests for call setup, answer and release are conveyed to the far end by the state of these bits. The signalling mode supported at this time is E&M signalling.

Call requests are initiated by setting both the A,B bits of a particular trunk to 1. The call is answered when the far end responds with the A,B bits set to 1. Either end can initiate (detect) a release condition by setting (detecting A,B→0) the A,B bits to 0. In addition to the E&M signalling, the trunks can assume different start dial modes.

When a call is initiated, digits usually have to be dialed for the call to proceed. The different start dial modes are a means of handshaking by the receiver to let the originator of the call know when to proceed with the dialed digits. Three different start dial modes are supported in both the outbound and inbound direction. They are wink start, dial tone start and immediate start. Dial tone start implies that the receiver will wait for dial tone before proceeding to dial the digits. Wink start operation looks for a momentary (100-250 millisecond) pulse of the A,B bits before outpulsing digits. Immediate start implies that if any digits are to be dialed they can be outpulsed immediately and need not wait for any far end supervision.

Unless an outbound call is requested, DSO task 102 constantly monitors all channels looking for transitions of the signalling bits. The transitions of the A,B signalling bits have different meanings depending on the state of that particular trunk. For example if the trunk is in the idle state and the A,B bits transition to 1 then this will be interpreted as an incoming call request. This will cause the task to try and find an available (online) teleset and instruct the teleset task to initiate ringing to that teleset. Audible ringback will be supplied to the far end and will continue until either the far end releases the call, or the call is answered at the teleset. If the call is answered a two way talk path is established and supervision (A,B→1) is returned to the far end.

This task 102 is scheduled by Scheduler 100 in each pass through the main software loop. During each execution only one trunk is processed. When processing is completed the data structures are set up so that the next trunk will be processed when the task 102 executes again.

1.3.2 Teleset Task
MODULE=dsettask.c

Teleset Task 106 is the state machine that handles the processing of the digital telesets connected to the T1 Bypass Unit. These are the same digital telephone sets used with the ACD. Up to 24 telesets can be supported by the T1 Bypass Unit. Configuration is not an issue because the software determines where, if any, active connections exist. The digital interface between the teleset and the T1 Bypass Unit supports 64K bit full duplex data (voice), and two 8 Kbit signalling channels. One signalling channel is used to indicate to the teleset that bypass operation is in effect. This channel is not bidirectional. The other signalling channel is used for call processing. As a control bit the teleset uses this signal to indicate either a call request or a call answer. This varies depending on the state of the teleset at that time. The T1 Bypass Unit uses the bit to ring the teleset and alert the user that an incoming call has arrived.

As in the DSO state machine, there is a port control block for each channel. This control block contains information relevant to the state of the teleset. The teleset task 106 performs two major functions, maintenance and call processing.

Because of the digital interface to the teleset it is possible to determine if a teleset is connected even if it is not currently engaged in a call. A bit indicating valid data is being received from a particular teleset interface is available to the processor. In this way it is possible to find all active and inactive interfaces. This task 106 is constantly scanning all ports to make sure that the telesets currently online stay that way and poll the inactive ports in case a new teleset comes online. When bypass is activated it is not necessary for all telesets to be present as they can be added or moved at any time without disturbing normal bypass operation.

In addition to the maintenance function the call processing function is always scanning idle (but online) telesets for outgoing call requests.

This task 106 is scheduled each pass through the main loop. During each execution only one teleset is processed. When processing is completed the data structure are set up so that the next teleset will be processed when the task executes again.

1.4 Menu Task

The menu task 108 controls the RS232 port interface to the T1 Bypass Unit. The menu function 108 allow the user to select three different functions. These are the configuration editor 110, Status and monitor function 112 and production test suite 114.

The production test suite 114 is used in the manufacture and assembly of the bypass unit and allow the user access to diagnostics. These diagnostics can be used to test the Control Board or the Trunk Board(s).

For use in the field, the configuration editor 110 will be the primary function selected. Selecting the configuration editor 110 option lets the user either modify or view all field selectable options. Following is a list of parameters that can be changed.

Framing Type (SPAN) —
D4 or ESF.
Zero Code Suppression (SPAN) —
Enabled or disabled.
Suppression Mode (SPAN) —
B8ZS or Stuffed Bit.
DSO Channel Direction (DSO):
Inbound Only, Outbound Only, Two Way, Not In Use.
Start Dial Mode—Inbound and Outbound (DSO):
Wink Start, Immediate Start, Dial Tone.
Queueing Threshold:
Any value allowed.
PAD value—Inbound and Outbound:
Range=0→15 and specifies the amount of attenuation in the talk path for that direction. Inbound and outbound can have different values. The range is no attenuation 0, to maximum of 15 db of attenuation.

Changes made via the configuration editor 110 are stored in battery backed-up RAM. In the event that the bypass unit is powered off, the changes will stay in effect for up to five years. Any changes made are also acted upon immediately, so the bypass unit does not have to be reset or power cycled. The Menu task is called from the main loop whenever the condition that suspended it has been satisfied. Usually this task is waiting on user input in the form of a input string. This task 110 does not run to completion but must suspend itself waiting for user input, for example.

1.5 DSO Timer Task

MODULE=tmrds0.s

This timer task 116 is scheduled every 10 milliseconds and keeps track of a group of 24, 16 bit timers 118 dedicated to DSO state processing. Each DSO channel is dedicated one of these timers 118. A timer is started by clearing its timeout flag and writing the initial timer value to a location reserved for this channel in the timer control block. Each execution of the task 116 will cause the timer count to decrement. When the count has decremented to zero a timeout flag is set. This flag can be accessed via service calls via a C access routine. All timer routines have been written in assembler to speed execution.

1.6 Teleset Timer Task

MODULE=tmrtel.s

This timer task 120 is scheduled every 50 milliseconds at check timers task 121 and keeps track of a group of 24, 16 bit timers dedicated to teleset state processing. Each teleset channel is dedicated one of these timers. A timer is started by clearing its timeout flag and writing the initial timer value to a location reserved for this channel in the timer control block. Each execution of the task 120 will cause the timer count to decrement. When the count has decremented to zero a timeout flag is set. This flag can be accessed via service calls via a C access routine. All timer routines have been written in assembler to speed execution.

1.7 Tone Task

MODULE=tontsk.c

The tone cadencing task 122 is scheduled every 50 milliseconds and is responsible for generating cadenced tones necessary to operate the bypass unit. Specific channels are alternately give solid tone and then silence to create the cadenced affect. The tones that are generated include busy, fast busy, receiver off hook and ringback. These tones can be listened to by either the DSO channels or the telesets with no restrictions. This means that all devices could simultaneously listen any tone.

2. Description of Other Modules

The following describes on a module-by-module basis the functionality of the routines contained therein.

2.1 Connection Logic

MODULE=connect.c

This module contains the access routines that perform setup of audio connections, tone or voice.

2.2 Control Logic

MODULE=control.c

This module contains the routines that control the T1 interface, and the teleset interface.

MODULE=edconf.c

Access to the configuration editor and the online data base is through this module.

2.4 Production Test

MODULE=prodtest.c

Access to production test facilities.

2.5 Queueing Features

MODULE=queue.c

Access routines for the queuing DSO queuing.

The above description of the invention is illustrative and not limiting; other embodiments of the invention will be apparent to one of ordinary skill in the art in the light of the disclosure and appended claims.

We claim:

1. A bypass for a telephone system having a plurality of digital lines and a plurality of digital telephone sets, comprising:
   a switch for connecting each telephone set to each line; and
   a bypass for the switch allowing connection of each of the telephone sets to each of the plurality of digital lines upon a failure of the switch.

2. The device of claim 1, wherein the bypass includes means for queuing incoming calls on the digital lines and distributing the queued calls to each of the telephone sets.

3. The device of claim 1, wherein the bypass includes one relay for each line of the plurality of digital lines, for connecting each of the telephone sets to any one of the plurality of digital lines.

4. The device of claim 1, further including an internal power source for providing power to the bypass.

5. The device of claim 1, further comprising means for automatically enabling the bypass upon detection of the failure of the switch.

6. The device of claim 1, wherein the bypass includes means for establishing a full duplex audio path between each one of the plurality of digital lines and each one of the telephone sets.

7. The device of claim 2, wherein the means for queuing includes means for distributing the incoming calls to a free telephone set.

8. The device of claim 1, wherein the bypass includes means for configuring the bypass for use with any one of a plurality of types of digital lines.

9. A bypass for bypassing a telephone switch comprising:
   a telephone set interface connectable to a plurality of digital telephones;
   a trunk line interface connectable to a plurality of digital telephone lines;
   switching means connected to the telephone set interface and trunk line interface for connecting any one of the digital telephones to any one of the digital telephone lines by a full duplex audio path;
   means for digitally attenuating individually each one of the digital telephone lines; and
   control means for activating the switching means in response to a failure of the telephone switch.

10. The device of claim 9, wherein the switching means comprises a crosspoint switch.

11. The device of claim 9, wherein the control means includes means for sensing the failure.

12. The device of claim 9, wherein the control means further includes means for queuing incoming calls on the digital telephone lines and distributing the queued calls to the telephone sets.

13. The device of claim 9, further comprising means for configuring the bypass for use with any one of a plurality of types of digital telephone lines.

14. A method of bypassing a telephone switch for connecting any one of a plurality of digital lines to any one of a plurality of digital telephone sets, comprising the steps of:
   determining a failure of the switch;
   bypassing the switch upon determination of failure; and
   selectively connecting any one of the telephone sets to any one of the plurality of digital lines upon receipt of an incoming call, and also upon initiation of an outgoing call from any of the telephone sets.

* * * * *

UNITED STATES PATENT AND TRADEMARK OFFICE
CERTIFICATE OF CORRECTION

PATENT NO.   :   4,972,452
DATED        :   November 20, 1990
INVENTOR(S)  :   Michael A. Chack It is certified that error appears in the above-identified patent and that said Letters Patent is hereby corrected as shown below:

Delete Column 1, lines 4-14.

Delete Column 13, lines 63-64.

Column 2, line 6, delete "tak" and insert --to take the--.

Column 11, line 6, delete "±5V" and insert --+5V--.

Column 13, line 65, delete "language. This" and insert --A--.

Column 14, line 1, delete "the" and insert --a--.

Column 14, line 2, delete "shown in the microfiche appendix,".

Signed and Sealed this

First Day of September, 1992

Attest:

DOUGLAS B. COMER

Attesting Officer

Acting Commissioner of Patents and Trademarks